(12) United States Patent
Ozaki

(10) Patent No.: US 8,947,562 B2
(45) Date of Patent: Feb. 3, 2015

(54) ZOOM LENS AND IMAGING DEVICE

(75) Inventor: Yuichi Ozaki, Tokyo (JP)

(73) Assignee: Konica Minolta Opto, inc., Tokyo (JP)

( * ) Notice: Subject to any disclaimer, the term of this patent is extended or adjusted under 35 U.S.C. 154(b) by 24 days.

(21) Appl. No.: 13/499,627

(22) PCT Filed: May 10, 2011

(86) PCT No.: PCT/JP2011/002591
§ 371 (c)(1),
(2), (4) Date: Mar. 30, 2012

(87) PCT Pub. No.: WO2011/145288
PCT Pub. Date: Nov. 24, 2011

(65) Prior Publication Data
US 2012/0188436 A1      Jul. 26, 2012

(30) Foreign Application Priority Data

May 19, 2010    (JP) ................. 2010-114966

(51) Int. Cl.
  *H04N 5/262*       (2006.01)
  *G03B 17/00*       (2006.01)
  *G02B 15/177*      (2006.01)
  *G02B 15/167*      (2006.01)

(52) U.S. Cl.
  CPC ............ *G02B 15/177* (2013.01); *G02B 15/167* (2013.01)
  USPC ................... 348/240.3; 348/240.99; 359/676; 396/72

(58) Field of Classification Search
  USPC .......... 348/240.99, 240.3, 345, 347; 359/676, 359/686; 396/72
  See application file for complete search history.

(56) References Cited

U.S. PATENT DOCUMENTS

| | | | | |
|---|---|---|---|---|
| 6,498,687 | B1* | 12/2002 | Sekita et al. | 359/680 |
| 2001/0006432 | A1* | 7/2001 | Ohtake | 359/686 |
| 2001/0017734 | A1* | 8/2001 | Ori | 359/687 |
| 2002/0067551 | A1* | 6/2002 | Ohtake | 359/687 |
| 2003/0007256 | A1* | 1/2003 | Usui et al. | 359/686 |
| 2004/0169934 | A1* | 9/2004 | Oomura et al. | 359/687 |
| 2004/0184159 | A1* | 9/2004 | Tomioka | 359/687 |
| 2006/0221461 | A1* | 10/2006 | Shibayama | 359/686 |
| 2007/0008626 | A1* | 1/2007 | Arai | 359/676 |
| 2007/0070517 | A1* | 3/2007 | Harada | 359/680 |

(Continued)

FOREIGN PATENT DOCUMENTS

| | | |
|---|---|---|
| JP | 2007-093955 | 4/2007 |
| JP | 2007-232974 | 9/2007 |
| JP | 2009-122682 | 6/2009 |

(Continued)

*Primary Examiner* — Sinh Tran
*Assistant Examiner* — Xi Wang
(74) *Attorney, Agent, or Firm* — Cozen O'Connor

(57) ABSTRACT

A zoom lens has first through fourth lens groups from the object side to the image side, and changes the magnification by changing their intervals. The first and third lens groups and the second and fourth lens groups have negative and positive powers, respectively. When changing the magnification from the wide-angle end to the telescopic end, the interval between the first and the second lens groups is reduced. The first lens group includes a reflective optical element. The second lens group includes at least two lenses, and the lens nearest to the image is a single plastic positive lens. The third lens group is configured by a single plastic negative lens. When the focal length of the single lens nearest to the image in the second lens group is defined as f2L and the focal length of the third lens group is defined as f3, "0.60<|f2L/f3|<1.60" is satisfied.

11 Claims, 78 Drawing Sheets

(56) References Cited

U.S. PATENT DOCUMENTS

| | | | |
|---|---|---|---|
| 2007/0223106 A1* | 9/2007 | Kamo et al. | 359/687 |
| 2007/0242365 A1* | 10/2007 | Kushida et al. | 359/676 |
| 2008/0112060 A1* | 5/2008 | Liao | 359/687 |
| 2008/0310033 A1* | 12/2008 | Miyazawa | 359/687 |

FOREIGN PATENT DOCUMENTS

| | | |
|---|---|---|
| JP | 2010-152144 | 7/2010 |
| JP | 2010-152147 | 7/2010 |
| JP | 2011-59497 | 3/2011 |
| JP | 2011059497 A * | 3/2011 |

* cited by examiner

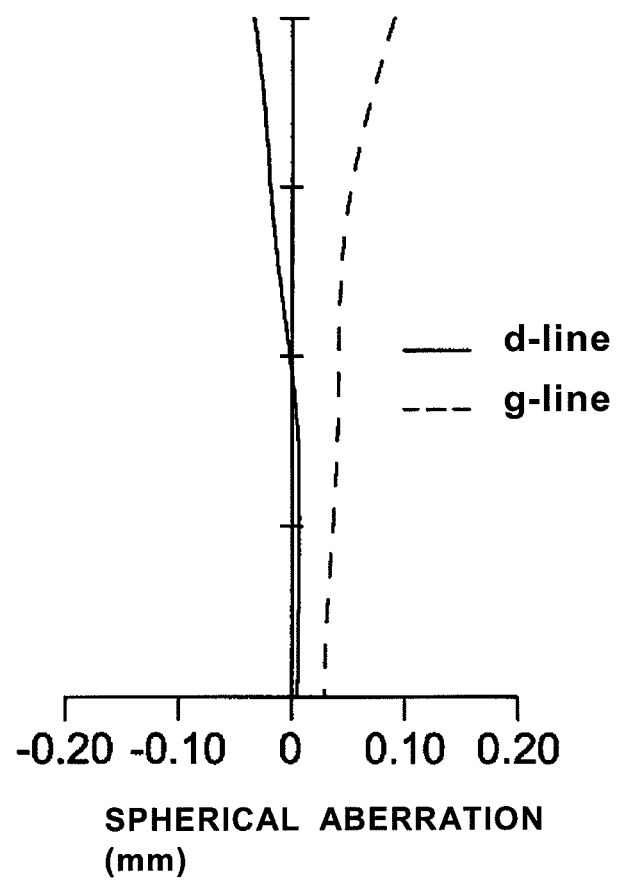

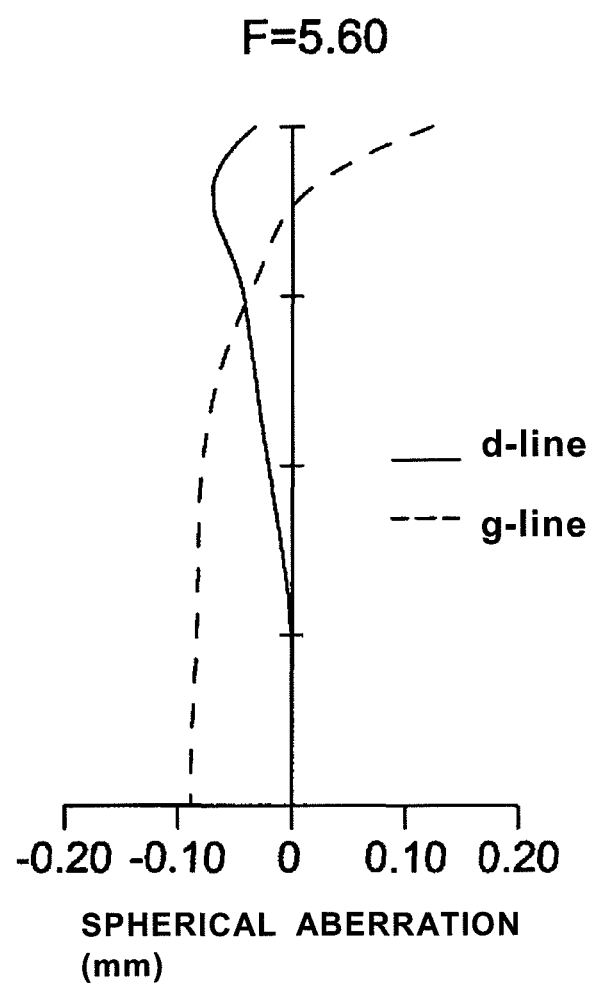

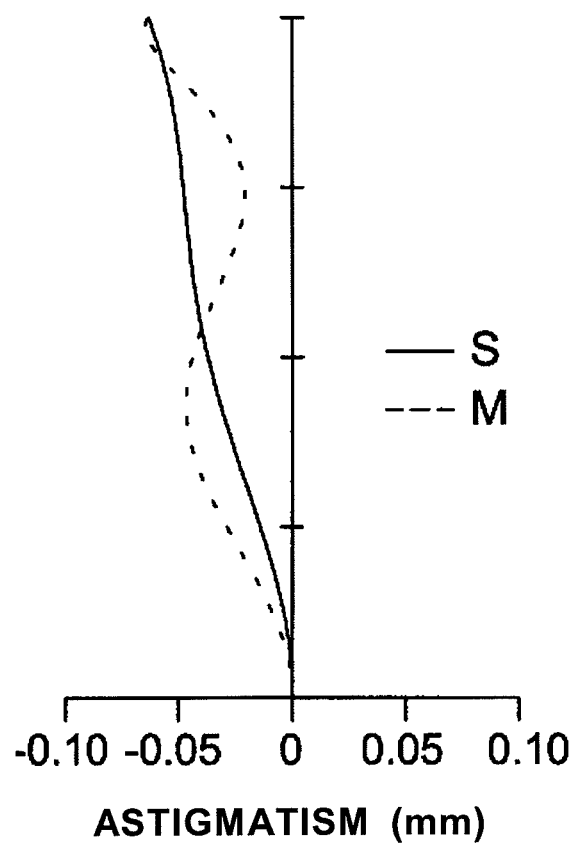

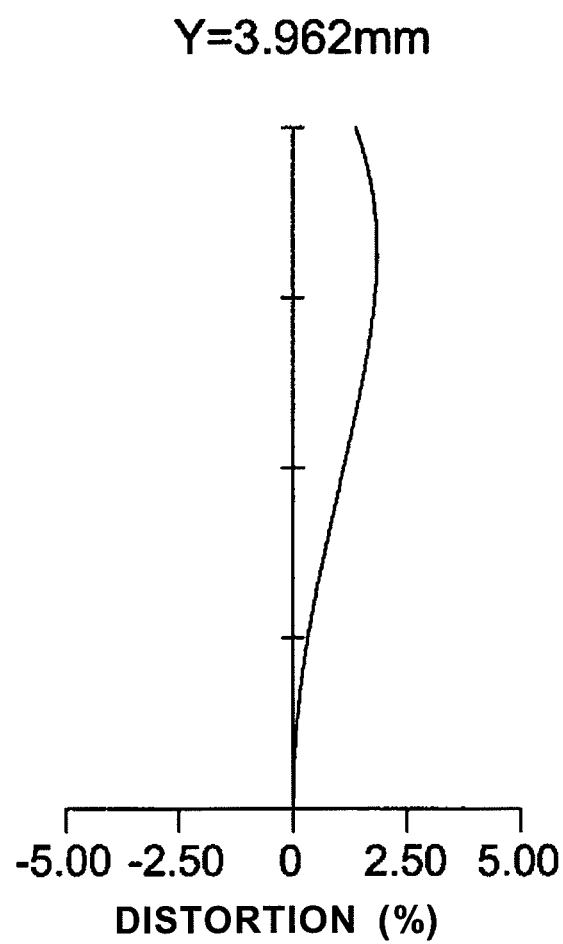

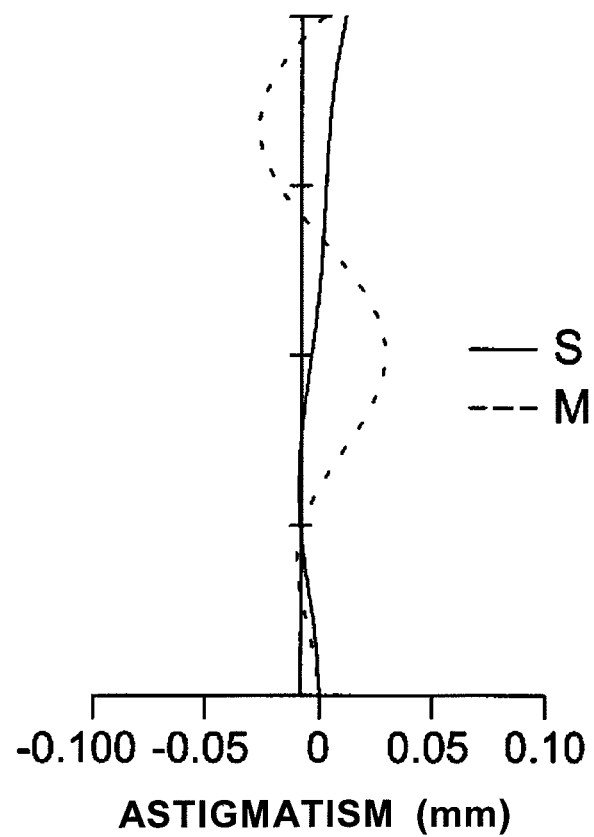

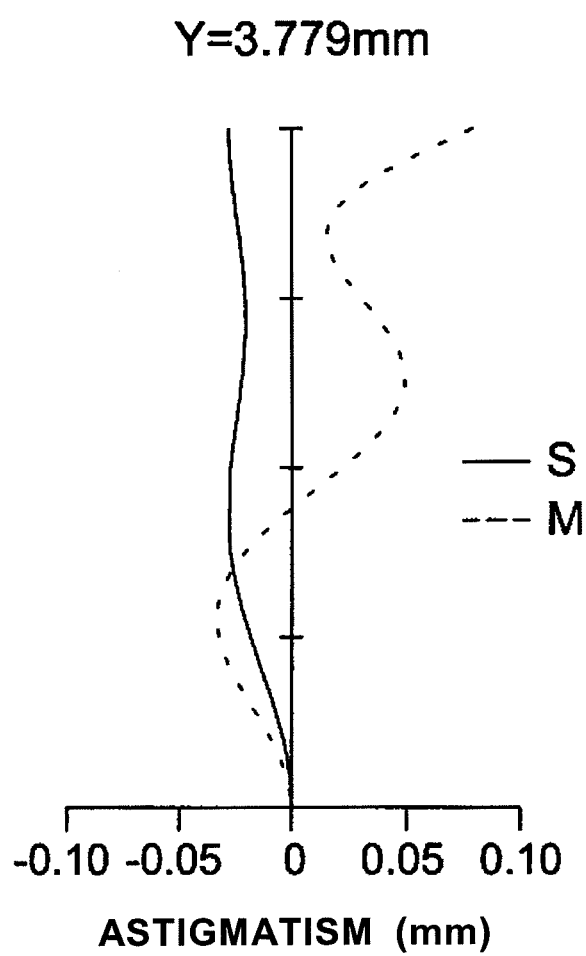

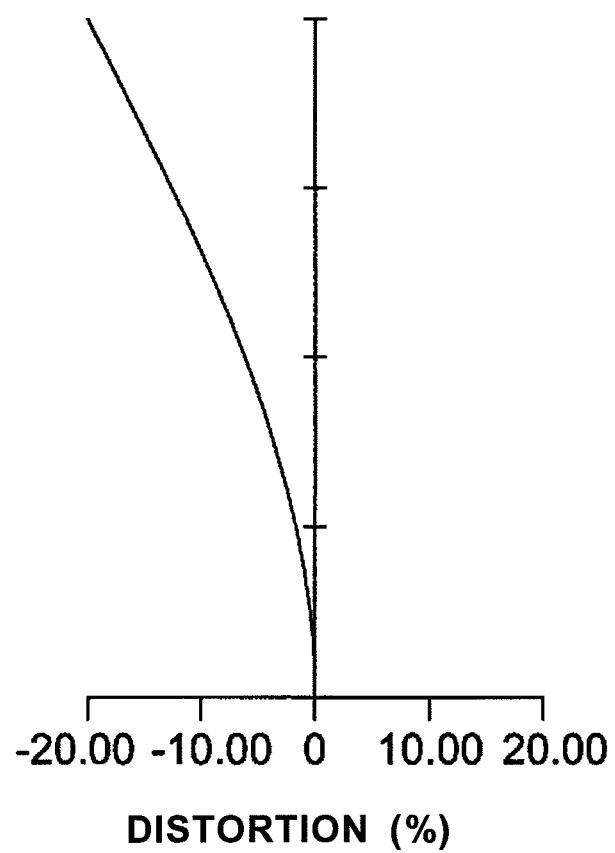

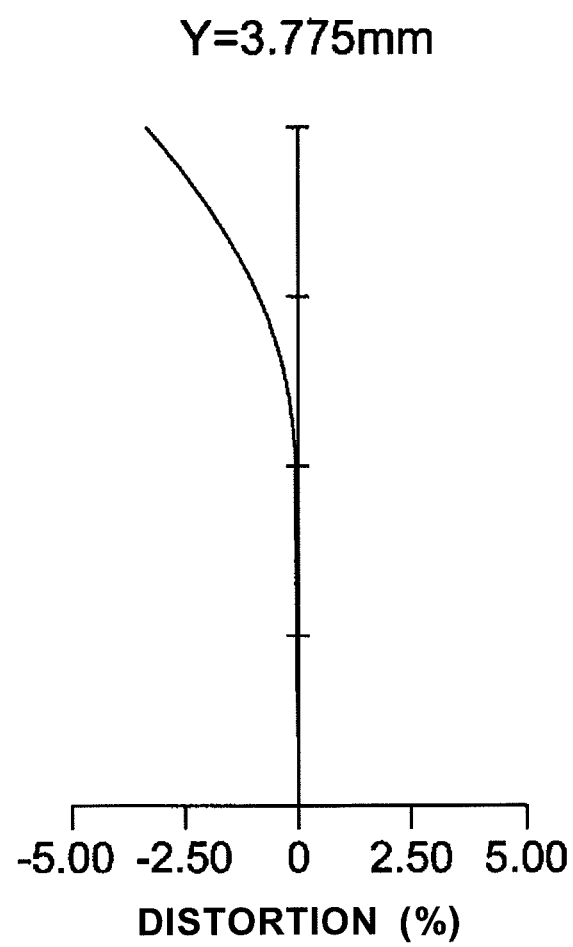

ZOOM LENS AND IMAGING DEVICE

This is a U.S. National Phase Application under 35 USC 371 of International Application PCT/JP2011/002591 filed on May 10, 2011.

This application claims the priority of Japanese Application No. 2010-114966 filed May 19, 2010, the entire content of which is hereby incorporated by reference.

FIELD OF THE INVENTION

The present invention is related to a zoom lens and an imaging device including the same.

BACKGROUND OF THE INVENTION

In recent years, mobile terminals (cell phones, handheld terminals, etc.) with imaging devices are becoming common. Solid-state image sensors are used for imaging devices. Solid-state image sensors include CCD (Charge Coupled Device) image sensors and CMOS (Complementary Metal Oxide Semiconductor) image sensors, etc. Generally, an imaging device used in a mobile terminal includes a small solid-state image sensor at a low pixel count compared to a normal digital camera, etc., and a single-focus optical system composed of around 1 to 4 plastic lenses. Moreover, there are various demands for such imaging devices. For example, there is demand for the ability to support imaging elements with high pixel counts, or the ability to capture images at long and short distances. In particular, to enable image capture at short distances, there is demand for variable-magnification optical systems that are small enough to be mounted on a mobile terminal but also have a wide angle.

In many thin mobile terminals, bending optical systems that use a reflective optical element such as a prism to bend the optical axis 90° are used. Among variable-magnification optical systems including four lens groups that respectively have a negative, positive, negative and positive refractive power in that order from the object side, variable-magnification optical systems designed to be thinner by applying reflective optical elements in the first lens group having a negative refractive power are known (refer to Patent documents 1 and 2).

PRIOR ART DOCUMENTS

Patent Document

[Patent Document 1] Japanese Unexamined Patent Application Publication No. 2007-93955
[Patent Document 2] Japanese Unexamined Patent Application Publication No. 2009-122682

SUMMARY OF THE INVENTION

Problem to be Solved by the Invention

In response to the recent prevalence of mobile terminals, there is demand for the ability to mass produce imaging devices to be equipped in such mobile terminals. Moreover, in response to demand for further miniaturization and price reduction for mobile terminals, there is a need for further miniaturization and cost reduction for imaging devices.

However, in a variable-magnification optical system such as that described in Patent document 1, there is a problem in that the F number in the telescopic end is large. Moreover, although the bending optical system is designed to be thinner, because the overall optical system becomes long, the miniaturization is insufficient in terms of volume.

Moreover, in a variable-magnification optical system such as that described in Patent document 2, because multiple aspheric lenses (presumed to be glass mold lenses) with high refractive indices and variance levels are used, it does not sufficiently satisfy cost-related demands.

Generally, compared to glass lenses manufactured through polishing processing, plastic lenses manufactured through injection molding have the advantage that they can be mass produced at low cost. Moreover, compared to glass mold lenses, plastic lenses can be formed at a low press temperature. Consequently, the friction of the mold is suppressed, and as a result, it is possible to reduce the frequency of replacement and maintenance for the mold. Therefore, the application of plastic lenses is very effective for reducing the cost of imaging devices.

On the other hand, compared to glass lenses, plastic lenses undergo large changes in refractive index and volume in response to temperature changes, and this has a large effect on optical performance. Therefore, for zoom lenses, plastic lenses are often used for lenses (e.g., the final lens) where the effect on the overall refractive power caused by temperature changes is low.

The present invention has been devised based on considerations of these problems, and the objective is to provide: a zoom lens that enables cost reduction, is able to suppress effects caused by temperature changes, and is able to properly correct aberrations; and an imaging device that includes this zoom lens.

Means of Solving the Problem

The above objective is met by the invention described below.

The zoom lens of the first mode of the present invention has first through fourth lens groups in that order from the object side to the image side, and changes the magnification by changing the intervals thereof. The first and third lens groups have a negative refractive power, and the second and fourth lens groups have a positive refractive power. When changing the magnification from the wide-angle end to the telescopic end, the interval between the first lens group and the second lens group is reduced. The first lens group includes a reflective optical element that changes the direction of travel of a light ray. The second lens group includes at least two lenses, and the lens nearest to the image side is a single lens composed of plastic that has a positive refractive power. The third lens group is configured by a single negative lens composed of plastic. Furthermore, when the focal length of the single lens positioned nearest to the image side in the second lens group is defined as f2L and the focal length of the third lens group is defined as f3, the conditional expression "$0.60<|f2L/f3|<1.60$" is satisfied.

The zoom lens of the second mode of the present invention modifies the above first mode and performs focusing by causing the third lens group to move.

The zoom lens of the third mode of the present invention modifies the above first mode (and is also applicable to the second mode), and when the focal length of the single lens positioned nearest to the image side in the second lens group is defined as f2L and the focal length of the second lens group is f2, the conditional expression "$0.80<f2L/f2<1.50$" is satisfied.

The zoom lens of the fourth mode of the present invention modifies the above first mode (and is also applicable to the second or third mode), and the fourth lens group is composed of plastic, and at least one surface thereof is an aspheric surface.

The zoom lens of the fifth mode of the present invention modifies the above first mode (and is also applicable to any of the second through fourth modes), and the fourth lens mode is made movable within a plane perpendicular to the direction of the optical axis. Furthermore, when the lateral magnification in the telescopic end of the fourth lens group is defined as m4T, the conditional expression "0.4<m4T<0.7" is satisfied.

The zoom lens of the sixth mode of the present invention modifies the above first mode (and is also applicable to any of the second through fifth modes), and when the lateral magnification in the telescopic end of the second lens group is defined as m2T and the lateral magnification in the wide-angle end of the second lens group is defined as m2W, the conditional expression "2.0<m2T/m2W<5.0" is satisfied.

The zoom lens of the seventh mode of the present invention modifies the above first mode (and is also applicable to any of the second through sixth modes), and the lens positioned nearest to the object side in the first lens group has a negative refractive power. Furthermore, when the focal length of this lens is defined as f1a and the focal length of the overall system in the wide-angle end is defined as fW, the conditional expression "2.0<|f1a/fW|<9.0" is satisfied.

The zoom lens of the eighth mode of the present invention modifies the above first mode (and is also applicable to any of the second through seventh modes), and at least one surface of the single lens positioned nearest to the image side in the second lens group is an aspheric surface.

The zoom lens of the ninth mode of the present invention modifies the above first mode (and is also applicable to any of the second through eighth modes), and at least one surface of the negative lens of the third lens group is an aspheric surface.

The zoom lens of the tenth mode of the present invention modifies the above first mode (and is also applicable to any of the second through ninth modes), and during changes in magnification and during focusing, the position of the fourth lens group is fixed.

The imaging device of the present invention is equipped with the zoom lens described in any one of the first through tenth modes.

Effects of the Invention

[Effects of the Zoom Lens of the First Mode]

In the zoom lens of the first mode, by making the first lens group a negative configuration, it is possible to reduce the angle of incoming light rays entering at a large angle from the object side. This configuration is useful for making the front lens diameter compact.

Moreover, by providing a reflective optical element within the first lens group, it is possible to reduce the size of the imaging device in the depth direction.

Moreover, this zoom lens is configured so that, when the magnification is changed from the wide-angle end to the telescopic end, the interval between the first lens group and the second lens group is reduced. This is realized by, for example, causing the second lens group to move. Consequently, the interval between the first lens group and the second lens group is greatest in the wide-angle end. In addition, because the second lens group has a positive refractive power, the arrangement of power between the first lens group and the second lens group produces a retrofocus design. Consequently, this zoom lens keeps the overall length short and secures a relatively long back focus. As a result, it is possible to secure a space for arranging a desired optical element between the most image-side surface of the zoom lens and the solid-state image sensor. Examples of this optical element include an optical low-pass filter or an infrared cut filter.

At the same time, in this zoom lens, because the interval between the first lens group and the second lens group becomes narrow over the shift from the wide-angle end to the telescopic end, the composite power of these two lens groups becomes a positive power. Moreover, the third lens group has a negative refractive power. Consequently, the arrangement of power between the above composite power and the negative refractive power of the third lens group becomes "positive, negative". This is the telephoto arrangement. According to this type of zoom lens, it is possible to secure a relatively long focal length and also shorten the overall length of the optical system.

Moreover, the fourth lens group has a positive refractive power. Consequently, with regard to the luminous flux that forms images in the surrounding areas of the imaging area of the solid-state image sensor, the angle of incidence of the principal ray (the angle between the principal ray and the optical axis) can be kept small. As a result, it becomes possible to secure telecentricity.

Generally, plastic lenses manufactured through injection molding have the advantage that they can be mass produced at lower cost than glass lenses manufactured through polishing processing. On the other hand, plastic lenses have the disadvantage that temperature changes have a great effect on optical performance. In contrast, in this zoom lens, a plastic lens with a positive refractive power is arranged nearest to the image in the second lens group. As a result, it is possible to make the luminous flux passing through the lens fine, and to suppress effects caused by temperature changes. Furthermore, by configuring the third lens group with a single negative lens composed of plastic, the refractive power of the second lens group and the refractive power of the third lens group forms a combination of "positive, negative". Consequently, the directions of movements of focus caused by temperature changes cancel one another out. Therefore, it becomes possible to further suppress effects caused by temperature changes.

Moreover, by making the third lens group a single lens, it is possible to suppress the size of the third lens group. Consequently, it is possible to secure space for changing the magnification and to further suppress cost. Furthermore, because it is possible to reduce the overall weight of the third lens group, it is possible to suppress the load on the actuator during changes in magnification.

The conditional expression described in the first mode establishes the range of ratios between the respective focal lengths of the most image-side single lens in the second lens group and the third lens group. By setting the value of this ratio to exceed the lower limit of this conditional expression, the refractive power of the most image-side single lens in the second lens group is suppressed to an appropriate degree. As a result, it is possible to suppress effects caused by temperature changes. On the other hand, by setting the value of this ratio to be less than the upper limit of this conditional expression, it is possible to suppress the occurrence of aberrations that is caused by increases in the refractive power of the third lens group.

Moreover, by using a design that satisfies the following conditional expression instead of the conditional expression described in the first mode, it is possible to obtain a more desirable zoom lens.

$$0.80<|f2L/f3|<1.60$$

Moreover, by using a configuration that satisfies the following conditional expression, a more desirable zoom lens may be obtained.

$$0.85 < |f2L/f3| < 1.60$$

[Effects of the Zoom Lens of the Second Mode]

The zoom lens of the second mode performs focusing by causing the third lens group to move. As a result, it is possible to obtain sharp images even for objects at short distances without increasing the overall length of the lens through extension and without increasing the lens diameter of the front lens.

Moreover, even when a combination of the most image-side single lens in the second lens group and the third lens group is used, there are cases in which the effects of temperature changes cannot be cancelled out effectively. Considering the fact that the refraction action of a lens is greater in the surrounding areas rather than on the axis, when the focus moves due to temperature changes, the luminous flux is greater off the axis compared to on the axis. Therefore, as with variations in object distance, in response to movements in focus caused by temperature changes, focusing is performed using the third lens group. At this time, even for movements in focus caused by movement of the third lens group, the luminous flux is greater off the axis than on the axis. By using this type of focusing the third lens group, it becomes possible to cancel out movements in focus caused by temperature changes and to suppress movements in the image plane of the off-axis luminous flux caused by temperature changes.

[Effects of the Zoom Lens of the Third Mode]

The conditional expression described in the third mode establishes the range of ratios between the respective focal lengths of the most image-side single lens in the second lens group and the second lens group. By setting the value of this ratio to exceed the lower limit of the conditional expression, the refractive power of the most image-side single lens in the second lens group is suppressed to an appropriate degree. As a result, it is possible to suppress effects caused by temperature changes. At the same time, by setting the value of this ratio to be less than the upper limit of the conditional expression, it is possible to move the principal point of the second lens group toward the image and to widen the interval between this principal point and the principal point of the first lens group. As a result, even when a high variable magnification ratio is applied, it becomes possible to suppress the overall length of the optical system.

[Effects of the Zoom Lens of the Fourth Mode]

In the fourth mode, the lenses included in the fourth lens group are plastic lenses, and at least one surface thereof is formed as an aspheric surface. The fourth lens group is the lens arranged nearest to the image. Consequently, the luminous flux passing through the fourth lens group is finer than the luminous flux passing through the other lens groups. As a result, according to the fourth mode, it is possible to suppress effects on optical performance caused by temperature changes.

Moreover, because the lenses included in the fourth lens group are plastic lenses, they can be manufactured through injection molding. Consequently, it is possible to easily form an aspheric surface. By applying an aspheric lens for the fourth lens group, it is possible to effectively correct field curvatures and distortions.

[Effects of the Zoom Lens of the Fifth Mode]

As described above, because the luminous flux passing through the fourth lens group is fine, the aberration (eccentric aberration) generated when the lens is moved perpendicular to the optical axis is small, and variations in the image plane of the off-axis luminous flux are also small. Consequently, by moving the fourth lens group within a plane that is perpendicular to the direction of the optical axis, it is possible to correct blurs in the image formation in the image plane. As a result, it becomes possible to perform corrections of blurring while suppressing variations in the image plane of the off-axis luminous flux.

Moreover, the conditional expression described in the fifth mode establishes the lateral magnification in the telescopic end of the fourth lens group. Generally, if the most image-side lens moves perpendicularly to the optical axis, the amount of movement of the on-axis light ray in the image plane can be obtained with the following formula. Here, "m" is the lateral magnification of the most image-side lens, and "Δ" is the amount of movement of the most image-side lens.

$$(1-m) \times \Delta$$

Consequently, by setting the value of the lateral magnification to be less than the upper limit of the conditional expression described in the fifth mode, it becomes possible to perform corrections of blurring while suppressing the amount of movement of the fourth lens group. At the same time, by setting the value of the lateral magnification to exceed the lower limit of the conditional expression, it is possible to suppress occurrences of aberrations caused by increases in the refractive power of the fourth lens group.

Furthermore, by applying the following conditional expression instead of the conditional expression described in the fifth mode, it is possible to obtain a more desirable zoom lens.

$$0.45 < m4T < 0.65$$

[Effects of the Zoom Lens of the Sixth Mode]

The conditional expression described in the sixth mode establishes the ratio between the lateral magnification of the second lens group in the telescopic end and the lateral magnification of the second lens group in the wide-angle end. By setting the value of this ratio to exceed the lower limit of this conditional expression, it is possible to secure sufficient variable magnification effects of the second lens group. As a result, it is possible to suppress occurrences of aberrations (astigmatism, etc.) caused by increases in the refractive power of the third lens group. At the same time, by setting the value of this ratio to be less than the upper limit of this conditional expression, it is possible to prevent excessive variable magnification effects of the second lens group. As a result, it is possible to prevent occurrences of spherical aberrations and comatic aberrations caused by increases in the refractive power of the second lens group. Moreover, it is possible to suppress increases in the overall length of the optical system that accompany increases in the amount of movement of the second lens group.

Furthermore, by applying the following conditional expression instead of the conditional expression described in the sixth mode, it is possible to obtain a more desirable zoom lens.

$$2.5 < m2T/m2W < 4.0$$

[Effects of the Zoom Lens of the Seventh Mode]

The conditional expression described in the seventh mode establishes the ratio between the focal length of the most object-side lens in the first lens group and the focal length of the overall system in the wide-angle end. By setting the value of this ratio to be less than the upper limit of this conditional expression, the lens has an appropriate negative refractive power, and it is possible to secure a wide angle of view in the wide-angle end. At the same time, by setting the value of this ratio to exceed the lower limit of this conditional expression, it is possible to suppress occurrences of aberrations caused by increases in the refractive power of the lens.

Furthermore, by applying the following conditional expression instead of the conditional expression described in the seventh mode, it is possible to obtain a more desirable zoom lens.

$$2.5 < |f1a/fW| < 8.5$$

[Effects of the Zoom Lens of the Eighth Mode]

As described above, plastic lenses are useful for manufacturing aspheric lenses. Consequently, it becomes possible to effectively correct aberrations using aspheric surfaces. In particular, by forming the most image-side single lens in the second lens group as an aspheric surface as described in the eighth mode, it becomes possible to efficiently correct spherical aberrations and comatic aberrations.

[Effects of the Zoom Lens of the Ninth Mode]

As with the eighth mode, by forming the third lens group (i.e., the negative lens in the first mode) as an aspheric surface, it becomes possible to efficiently correct astigmatisms.

[Effects of the Zoom Lens of the Tenth Mode]

The tenth mode is one that fixes the position of the fourth lens group during changes in magnification and during focusing. As a result, because the solid-state image sensor can be placed in a sealed state, it is possible to prevent dust from adhering to or becoming mixed with the solid-state image sensor.

[Effects of the Imaging Device of the Present Invention]

The imaging device of the present invention includes the zoom lens of any one of the above first through tenth modes, and therefore has advantages corresponding to the installed zoom lens.

BRIEF DESCRIPTION OF THE DRAWINGS

FIG. 3A is a diagram showing aberrations in the wide-angle end of the zoom lens of Embodiment 1.

FIG. 5A is a diagram of aberrations in the telescopic end of the zoom lens of Embodiment 1.

FIG. 5B is a diagram of aberrations in the telescopic end of the zoom lens of Embodiment 1.

FIG. 5C is a diagram of aberrations in the telescopic end of the zoom lens of Embodiment 1.

FIG. 7B is a diagram showing aberrations in the wide-angle end of the zoom lens of Embodiment 2.

FIG. 20B is a diagram of aberrations in the intermediate focal length of the zoom lens of Embodiment 5.

FIG. 23C is a diagram of aberrations in the wide-angle end of the zoom lens of Embodiment 6.

FIG. 24C is a diagram of aberrations in the intermediate focal length of the zoom lens of Embodiment 6.

DETAILED DESCRIPTION OF THE INVENTION

Figure 1:
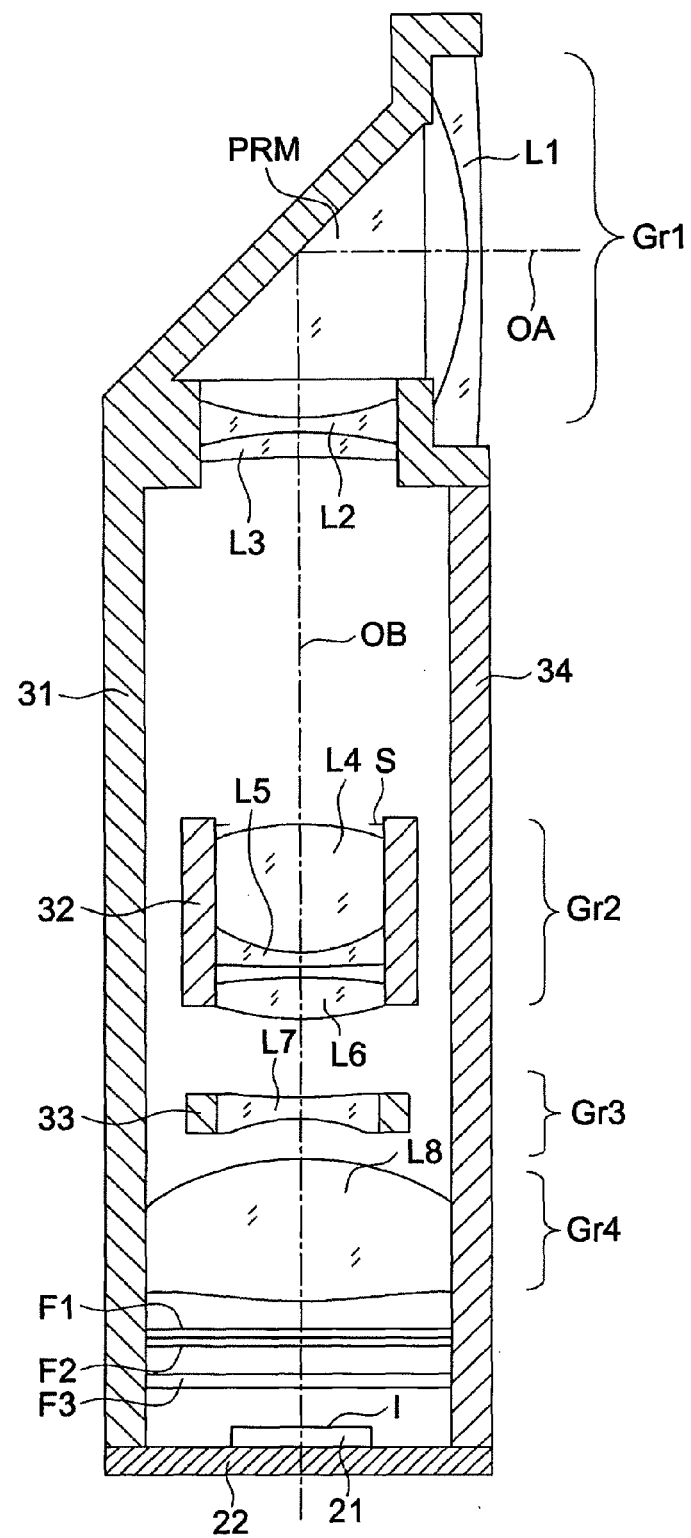
FIG. 1 is a cross-sectional diagram of an imaging device including a zoom lens.

The imaging device shown in FIG. 1 is built into a mobile terminal.

The zoom lens included in this imaging device includes a first lens group Gr1, a second lens group Gr2, a third lens group Gr3, and a fourth lens group Gr4 that are provided sequentially from the object side to the image side.

The first lens group Gr1 includes a first lens L1, a reflective optical element PRM, a second lens L2, and a third lens L3. The first lens group Gr1 has a negative refractive power overall. The reflective optical element PRM is, for example, a right-angle prism.

After passing through the first lens L1, light from the object is reflected in the reflective optical element PRM and is bent at a right angle. Furthermore, this light passes through the second lens L2 and the third lens L3. The second lens and the third lens are cemented lenses. Consequently, the optical axis OA of the first lens L1 and the optical axis OB of the second lens L2 and the third lens L3 are substantially orthogonal to each other. Furthermore, the first lens group Gr1 is fixed to a chassis 31 and does not move.

The second lens group Gr2 includes a fourth lens L4, a fifth lens L5, and a sixth lens L6. The second lens group Gr2 has a positive refractive power overall. The second lens group Gr2 is held by a mirror frame 32. When changing the magnification, the mirror frame 32 is driven by a driving means (not illustrated), and as a result, the second lens group Gr2 moves along the optical axis OB. Furthermore, a diaphragm S is arranged before the fourth lens L4.

The third lens group Gr3 is composed of a single seventh lens L7 that has a negative refractive power. The third lens group Gr3 is held by a mirror frame 33. When changing the magnification, the mirror frame 33 is driven by a driving means (not illustrated), and as a result, the third lens group Gr3 moves along the optical axis OB. Moreover, after the change in magnification ends, the third lens group Gr3 is moved along the optical axis OB to perform focusing from the infinity to a finite distance.

The fourth lens group Gr4 is composed of a single eighth lens L8 having a positive refractive power. The fourth lens group Gr4 is fixed to the chassis 31 and does not move.

Parallel plates F1, F2 and F3 are provided behind the fourth lens group Gr4. The parallel plate F1 is an optical low-pass filter. The parallel plate F2 is an IR cut filter. The parallel plate F3 is a seal glass of the solid-state image sensor. An imaging element 21 is provided behind the parallel plate F3. The imaging element 21 is mounted on a printed wiring board 22. The printed wiring board 22 is fixed to the chassis 31.

Using the zoom lens configured by including the first lens group Gr1, the second lens group Gr2, the third lens group Gr3, and the fourth lens group Gr4 as described above, an image of the light from the object is formed in the imaging area I of the imaging element 21.

Furthermore, the imaging device of the present embodiment is manufactured by mounting the above members including the first through fourth lens groups Gr1 through Gr4 on the chassis 31, and then covering these members with a cover member 34.

EMBODIMENTS

The following are embodiments of the zoom lens according to the present illustrative embodiment. The symbols used for each embodiment are as follows.

f: Focal length of the overall system of the zoom lens fB: Back focus (value obtained by air-converting the parallel plate positioned at the rearmost part)

F: F number

2Y: Diagonal length of imaging area of the solid-state image sensor

R: Radius of curvature

D: On-axis surface interval

Nd: Refractive index relative to d-line of lens material

Nd: Abbe number of lens material

2ω: Angle of view

L: Overall lens length

ΔfB(+30° C.): Variation in image point position when temperature increases by +30° C. relative to room temperature (amount of change in back focus)

Table 1 shows changes in the refractive index Nd caused by the temperature of the plastic material. Changes in the refractive index Nd caused by the temperature of the plastic material used for the zoom lens of the present illustrative embodiment are based on Table 1.

TABLE 1

|  | Refractive index at room temperature | Refractive index at room temperature + 30° C. |
|---|---|---|
| Plastic lens | 1.54470 | 1.54140 |

In the following embodiments, lens surfaces for which a "*" is attached after the surface number have an aspherical shape. When the peak of the lens surface is defined as the point of origin, the direction of the optical axis is defined as the X-axis, and the height in the direction perpendicular to the optical axis is defined as "h", this aspheric shape is represented in the following [Formula 1]. Here, Ai is the aspherical coefficient of the ith order, R is the radius of curvature, and K is the constant of the cone.

$$X = \frac{h^2/R}{1+\sqrt{1-(1+K)h^2/R^2}} + \sum A_i h^i \quad \text{[Formula 1]}$$

For the aspherical coefficient, the modular multiplier (exponentiation) of 10 is shown using "E" (e.g., $2.5 \times 10^{-02}$ is shown as 2.5E-02).

Embodiment 1

The parameters of the zoom lens of Embodiment 1 are shown below.

f: 5.01 to 9.5 to 18.77

F: 2.97 to 4.15 to 5.6

Zoom ratio: 3.75

Data on the lens surfaces are shown below.

| Surface no. | R(mm) | D(mm) | Nd | νd | Effective radius (mm) |
|---|---|---|---|---|---|
| 1 | 125.507 | 0.50 | 1.69680 | 55.5 | 6.13 |
| 2 | 13.039 | 1.49 |  |  | 5.48 |
| 3 | ∞ | 9.01 | 1.84670 | 23.8 | 5.37 |
| 4 | ∞ | 1.34 |  |  | 3.59 |
| 5 | −9.350 | 0.50 | 1.49700 | 81.6 | 3.30 |
| 6 | 13.406 | 0.89 | 1.84670 | 23.8 | 3.25 |
| 7 | 39.471 | d1 |  |  | 3.20 |
| 8(diaphragm) | ∞ | 0.00 |  |  | 2.51 |
| 9 | 9.387 | 4.50 | 1.72920 | 54.7 | 2.58 |
| 10 | −5.251 | 0.50 | 1.90370 | 31.3 | 2.54 |
| 11 | −60.050 | 0.40 |  |  | 2.59 |
| 12(*) | 20.278 | 1.45 | 1.54470 | 56.2 | 2.62 |
| 13(*) | −9.298 | d2 |  |  | 2.62 |
| 14(*) | −25.903 | 0.77 | 1.54470 | 56.2 | 2.39 |
| 15(*) | 5.977 | d3 |  |  | 2.40 |
| 16(*) | 11.698 | 5.00 | 1.54470 | 56.2 | 4.68 |
| 17(*) | −16.497 | 1.00 |  |  | 4.48 |
| 18 | ∞ | 0.30 | 1.54880 | 66.9 | 4.33 |
| 19 | ∞ | 0.30 | 1.56100 | 56.1 | 4.30 |
| 20 | ∞ | 1.00 |  |  | 4.28 |
| 21 | ∞ | 0.50 | 1.51680 | 64.2 | 4.17 |
| 22 | ∞ |  |  |  | 4.13 |

The aspherical coefficients are shown below.

Twelfth Surface
K=0.00000E+00, A4=−0.86599E−03, A6=0.15171E−03, A8=−0.36537E−04, A10=0.49249E−05, A12=−0.22742E−06

Thirteenth Surface
K=0.00000E+00, A4=−0.11019E−03, A6=0.14818E−03, A8=−0.35312E−04, A10=0.46553E−05, A12=−0.21086E−06

Fourteenth Surface
K=0.00000E+00, A4=−0.19905E−02, A6=0.15650E−02, A8=−0.70242E−03, A10=0.17873E−03, A12=−0.23029E−04, A14=0.11541E−05

Fifteenth Surface
K=0.00000E+00, A4=−0.27888E−02, A6=0.18431E−02, A8=−0.82443E−03, A10=0.20626E−03, A12=−0.26220E−04, A14=0.13043E−05

Sixteenth Surface
K=0.00000E+00, A4=0.33148E−03, A6=0.27623E−05, A8=−0.47150E−06, A10=0.17740E−07, A12=−0.19000E−09

Seventeenth Surface
K=0.00000E+00, A4=0.98643E−03, A6=−0.13663E−04, A8=0.12407E−06, A10=−0.12598E−07, A12=0.44000E−09

Various data from instances of magnification variation are shown below.

|  | Wide angle | Intermediate | Telephoto |
|---|---|---|---|
| f | 5.01 | 9.50 | 18.78 |
| Fno | 2.97 | 4.15 | 5.60 |
| fB | 1.77 | 1.75 | 1.81 |
| ΔfB(+30° C.) | 0.05 | 0.05 | 0.32 |
| 2ω | 75.9 | 44.7 | 23.5 |
| 2Y | 6.247 | 7.473 | 7.924 |
| L | 48.48 | 48.46 | 48.52 |
| d1 | 13.20 | 6.38 | 0.30 |
| d2 | 2.94 | 3.96 | 7.98 |
| d3 | 1.50 | 7.30 | 9.36 |

Lens group data are shown below.

| Group | Starting surface | Focal length (mm) |
|---|---|---|
| 1 | 1 | −8.71 |
| 2 | 8 | 8.11 |
| 3 | 14 | −8.84 |
| 4 | 16 | 13.40 |

Values corresponding to each conditional expression described above are shown below.

|f2L−f3|=1.347
f2L/f2=1.468
m4T=0.544
m2T/m2W=2.801
|f1a/fW|=4.178

In the zoom lens of Embodiment 1, when changing the magnification from the wide-angle end to the telescopic end, the second lens group Gr2 moves along the direction of the optical axis to the object side, and the third lens group Gr3 moves along the direction of the optical axis. As a result, the intervals of the lens groups Gr1 through Gr4 change, and the magnification is changed. Furthermore, when changing the magnification, the lens groups Gr1 and Gr4 do not move. Moreover, by causing the third lens group Gr3 to move, it is possible to perform focusing from the infinity to a finite distance. Furthermore, the sixth lens L6, the seventh lens L7, and the eighth lens L8 are formed from a plastic material, and the other lenses are polished lenses formed from a glass material.

The fourth lens group Gr4 is configured to be movable in a plane perpendicular to the direction of the optical axis. As a result, it is possible to correct blurs in the image formation in the image plane, and corrections of blurring are realized.

Because the second lens group Gr2 includes the aperture stop S, the luminous flux passing through the second lens group Gr2 is relatively thick. Moreover, when changing the magnification from the wide-angle end to the telescopic end, the second lens group Gr2 moves over a relatively long distance. Taking these factors into consideration, it is necessary to make the eccentric error sensitivity of the second lens group Gr2 as small as possible. Therefore, by aligning the sixth lens L6, it is possible to reduce asymmetric bokeh (asymmetric blur) in the screen (referred to as "kata bokeh (one-sided bokeh)") that occur throughout the overall system. In Embodiment 1, the wide-angle end has a smaller F number than the telescopic end, the depth of focus is shallow, and the effects of kata bokeh are easily seen, and therefore, alignment is performed in the wide-angle end.

Here, "alignment" refers to de-centering the lens relative to the optical axis to cancel and reduce kata bokeh caused by other lenses. Furthermore, when de-centering relative to the optical axis, it is possible to apply parallel de-centering or slanted de-centering. Moreover, the purpose of de-centering is not limited to reducing kata bokeh, and may also be the reduction of on-axis comatic aberrations, etc.

Figure 2A:
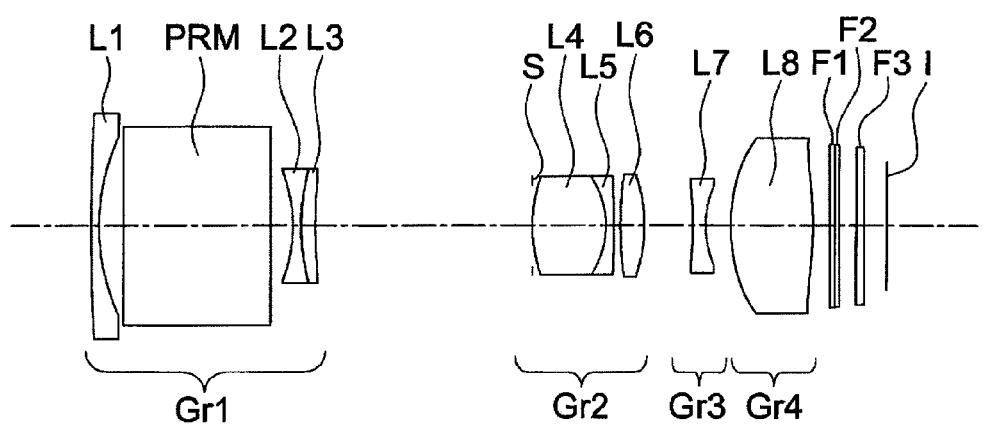
FIG. 2A is a cross-sectional diagram of the zoom lens of Embodiment 1.
Figure 2B:
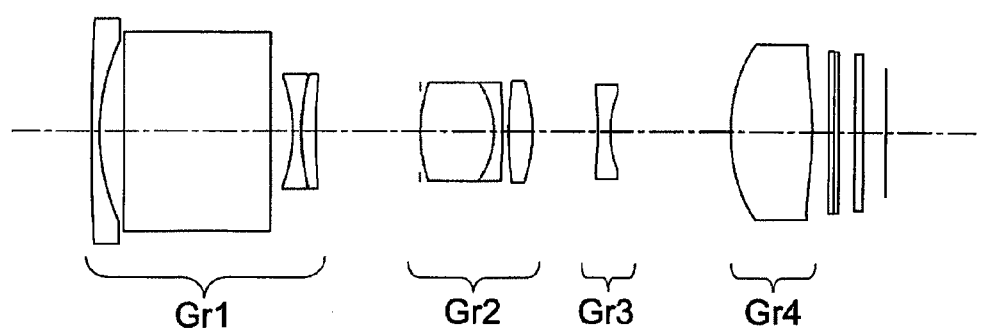
FIG. 2B is a cross-sectional diagram of the zoom lens of Embodiment 1.
Figure 2C:
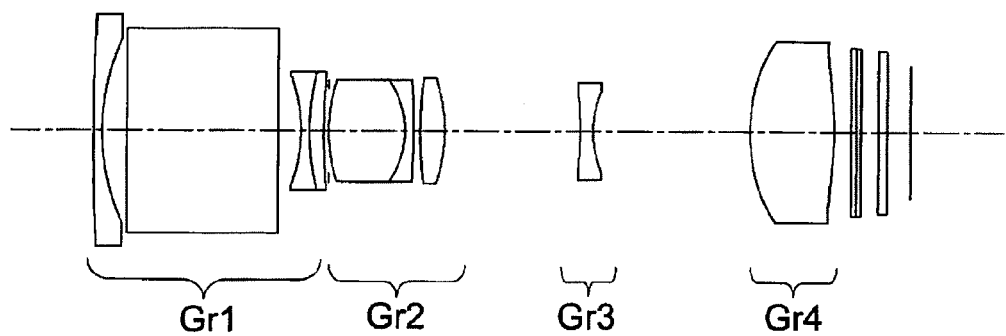
FIG. 2C is a cross-sectional diagram of the zoom lens of Embodiment 1.
Figure 3B:
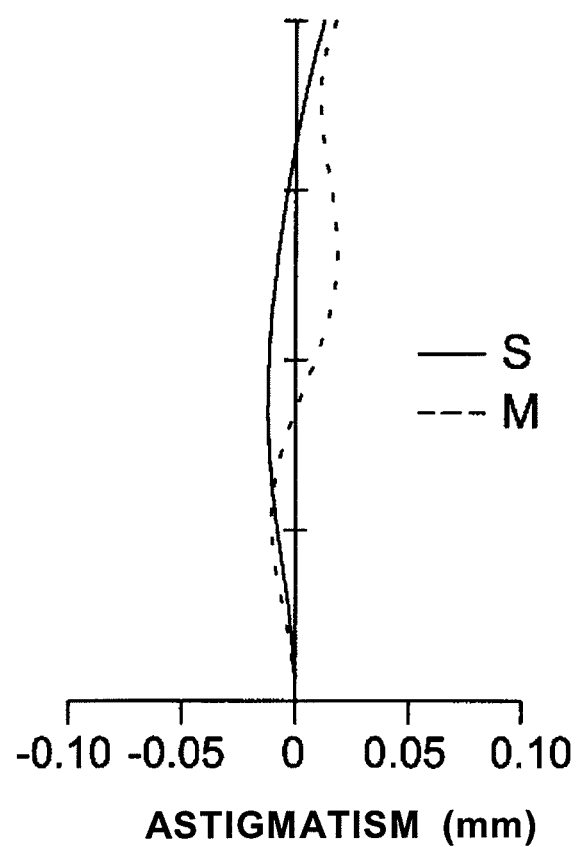
FIG. 3B is a diagram showing aberrations in the wide-angle end of the zoom lens of Embodiment 1.
Figure 3C:
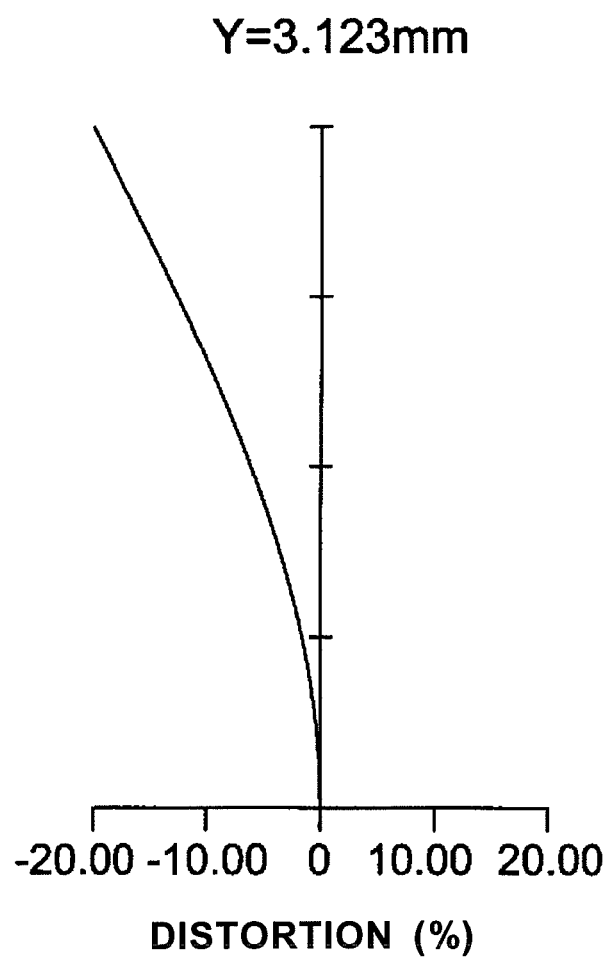
FIG. 3C is a diagram showing aberrations in the wide-angle end of the zoom lens of Embodiment 1.
Figure 4A:
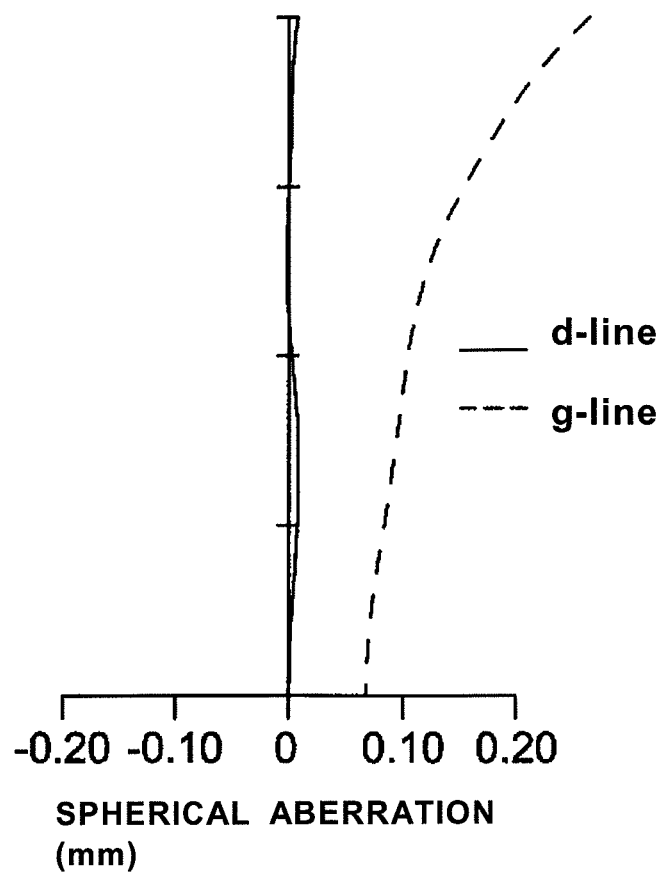
FIG. 4A is a diagram showing aberrations in the intermediate focal length of the zoom lens of Embodiment 1.
Figure 4B:
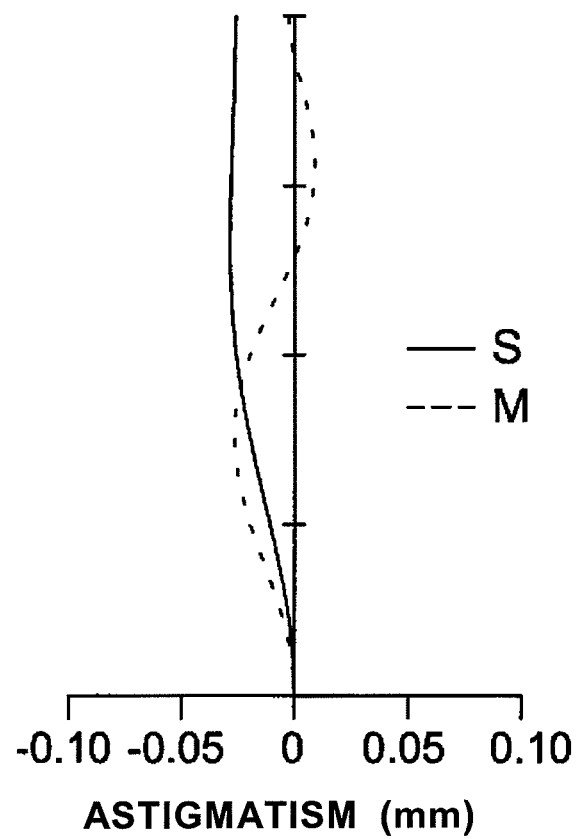
FIG. 4B is a diagram showing aberrations in the intermediate focal length of the zoom lens of Embodiment 1.
Figure 4C:
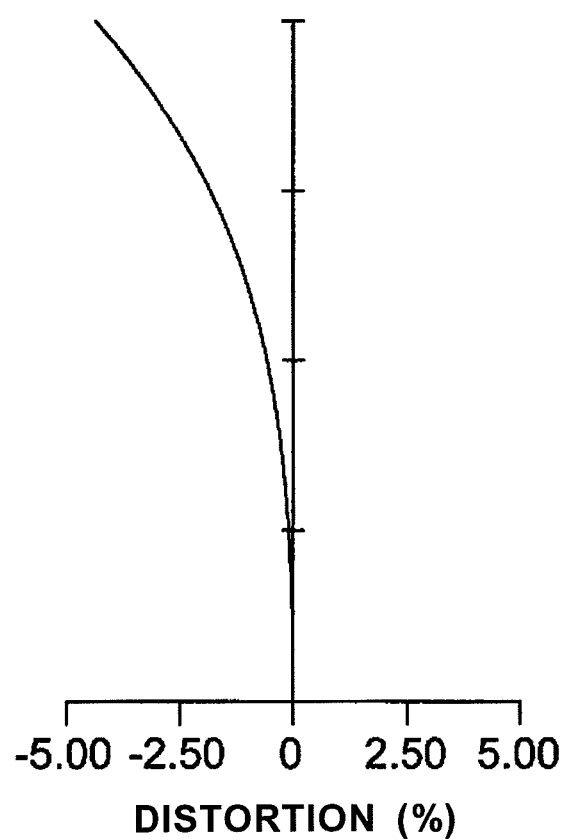
FIG. 4C is a diagram showing aberrations in the intermediate focal length of the zoom lens of Embodiment 1.

Furthermore, FIG. 2A, FIG. 2B and FIG. 2C are cross-sectional diagrams of the zoom lens according to Embodiment 1. FIG. 2A is a cross-sectional diagram of the wide-angle end. FIG. 2B is a cross-sectional diagram of the intermediate focal length. FIG. 2C is a cross-sectional diagram of the telescopic end. FIG. 3A, FIG. 3B and FIG. 3C are diagrams of aberrations in the wide-angle end. FIG. 4A, FIG. 4B and FIG. 4C are diagrams of aberrations in the intermediate focal length. FIG. 5A, FIG. 5B and FIG. 5C are diagrams of aberrations in the telescopic end. Furthermore, in the diagrams of spherical aberrations shown in FIG. 3A, FIG. 4A and FIG. 5A, the solid line represents the d-line and the dotted line represents the g-line. Moreover, in the diagrams of astigmatisms shown in FIG. 3B, FIG. 4B and FIG. 5B, the solid line represents an aberration in the sagittal image plane, and the dotted line represents an aberration in the meridional image plane.

Embodiment 2

The parameters of the zoom lens of Embodiment 2 are shown below.
f: 4.88 to 10.56 to 23.2
F: 3.35 to 4.89 to 6.3
Zoom ratio: 4.75

Lens surface data are shown below.

| Surface no. | R(mm) | D(mm) | Nd | vd | Effective radius (mm) |
|---|---|---|---|---|---|
| 1 | 6708.643 | 0.50 | 1.83480 | 42.7 | 6.35 |
| 2 | 19.442 | 1.09 | | | 5.85 |
| 3 | ∞ | 9.66 | 1.84670 | 23.8 | 5.77 |
| 4 | ∞ | 1.13 | | | 3.77 |
| 5 | −13.628 | 0.50 | 1.72920 | 54.7 | 3.50 |
| 6 | 13.395 | 0.90 | 1.94590 | 18.0 | 3.42 |
| 7 | 35.332 | d1 | | | 3.37 |
| 8(diaphragm) | ∞ | 0.00 | | | 2.64 |
| 9 | 11.070 | 1.09 | 1.60310 | 60.7 | 2.73 |
| 10 | −69.757 | 3.18 | | | 2.76 |
| 11 | 8.555 | 1.60 | 1.49700 | 81.6 | 2.99 |
| 12 | −15.928 | 0.50 | 1.90370 | 31.3 | 2.93 |
| 13 | 19.168 | 1.73 | | | 2.91 |
| 14(*) | 9.672 | 1.68 | 1.54470 | 56.2 | 3.12 |
| 15(*) | −18.927 | d2 | | | 3.08 |
| 16(*) | −7.625 | 0.80 | 1.54470 | 56.2 | 2.30 |
| 17(*) | 10.378 | d3 | | | 2.34 |
| 18(*) | 11.770 | 4.00 | 1.54470 | 56.2 | 4.69 |
| 19(*) | −14.977 | 1.00 | | | 4.59 |
| 20 | ∞ | 0.30 | 1.54880 | 66.9 | 4.44 |
| 21 | ∞ | 0.30 | 1.56100 | 56.1 | 4.42 |
| 22 | ∞ | 1.00 | | | 4.40 |
| 23 | ∞ | 0.50 | 1.51680 | 64.2 | 4.30 |
| 24 | ∞ | | | | 4.26 |

The aspherical coefficients are shown below.
Fourteenth Surface
K=0.00000E+00, A4=−0.46167E−03, A6=0.59894E−04, A8=−0.99710E−05, A10=0.79794E−06, A12=−0.23611E−07
Fifteenth Surface
K=0.00000E+00, A4=0.13481E−03, A6=0.67940E−04, A8=−0.11721E−04, A10=0.95632E−06, A12=−0.28911E−07
Sixteenth Surface
K=0.00000E+00, A4=0.53105E−02, A6=0.66327E−03, A8=−0.63894E−03, A10=0.17796E−03, A12=−0.23029E−04, A14=0.11541E−05
Seventeenth Surface
K=0.00000E+00, A4=0.47875E−02, A6=0.98845E−03, A8=−0.76489E−03, A10=0.20588E−03, A12=−0.26235E−04, A14=0.13043E−05
Eighteenth Surface
K=0.00000E+00, A4=0.42659E−03, A6=0.11667E−04, A8=−0.20549E−05, A10=0.97002E−07, A12=−0.14910E−08
Nineteenth Surface
K=0.00000E+00, A4=0.92985E−03, A6=0.33062E−04, A8=−0.55965E−05, A10=0.25371E−06, A12=−0.39030E−08

Various data from instances of magnification variation are shown below.

|  | Wide angle | Intermediate | Telephoto |
|---|---|---|---|
| f | 4.88 | 10.56 | 23.20 |
| Fno | 3.35 | 4.89 | 6.30 |
| fB | 12.23 | 12.19 | 12.28 |
| ΔfB(+30° C.) | 0.05 | 0.14 | 0.64 |
| 2ω | 77.3 | 40.6 | 19.1 |
| 2Y | 6.249 | 7.552 | 8.048 |
| L | 55.00 | 54.99 | 55.01 |
| d1 | 17.27 | 8.07 | 0.30 |
| d2 | 2.75 | 4.88 | 13.73 |
| d3 | 1.40 | 8.46 | 7.39 |

Lens group data are shown below.

| Group | Starting surface | Focal length (mm) |
|---|---|---|
| 1 | 1 | −7.76 |
| 2 | 8 | 9.76 |
| 3 | 16 | −7.94 |
| 4 | 18 | 12.77 |

Values corresponding to each conditional expression described above are shown below.

|f2L−f3|=1.511 f2L/f2 =1.230 m4T=0.501 m2T/m2W=3.789

|f1a/fW|=4.783

In the zoom lens of Embodiment 2, when changing the magnification from the wide-angle end to the telescopic end, the second lens group Gr2 moves along the direction of the optical axis to the object side, and the third lens group Gr3 moves along the direction of the optical axis. As a result, the intervals of the lens groups Gr1 through Gr4 change, and the magnification is changed. Furthermore, when changing the magnification, the lens groups Gr1 and Gr4 do not move. Moreover, by causing the third lens group Gr3 to move, it is possible to perform focusing from the infinity to finite distance. Furthermore, the seventh lens L7, the eighth lens L8, and the ninth lens L9 are formed from a plastic material, and the other lenses are polished lenses formed from a glass material.

The fourth lens group Gr4 is configured to be movable in a plane perpendicular to the direction of the optical axis. As a result, it is possible to correct blurs in the image formation in the image plane, and corrections of blurring are realized.

Moreover, in Embodiment 2, in the wide-angle end, alignment using the seventh lens L7 is performed.

Figure 6A:
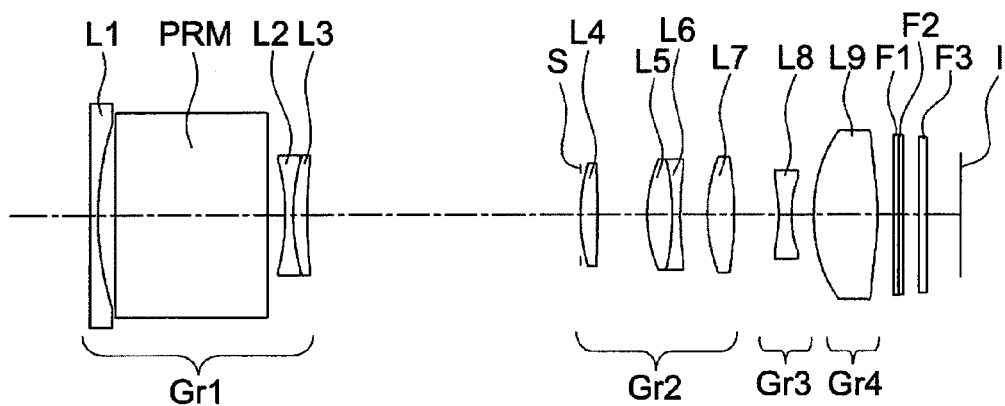
FIG. 6A is a cross-sectional diagram of the zoom lens of Embodiment 2.
Figure 6B:
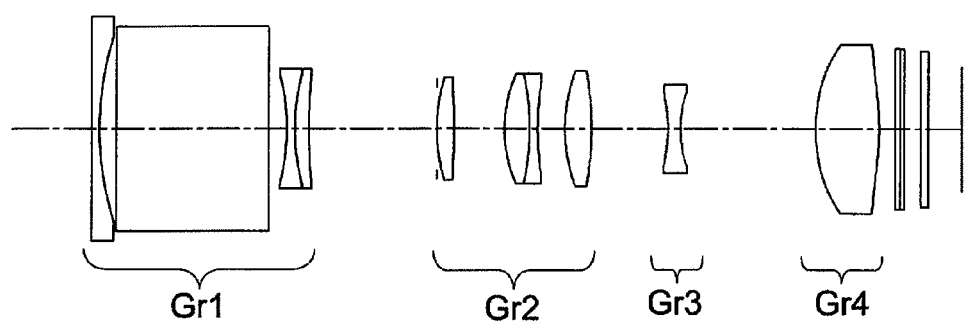
FIG. 6B is a cross-sectional diagram of the zoom lens of Embodiment 2.
Figure 6C:
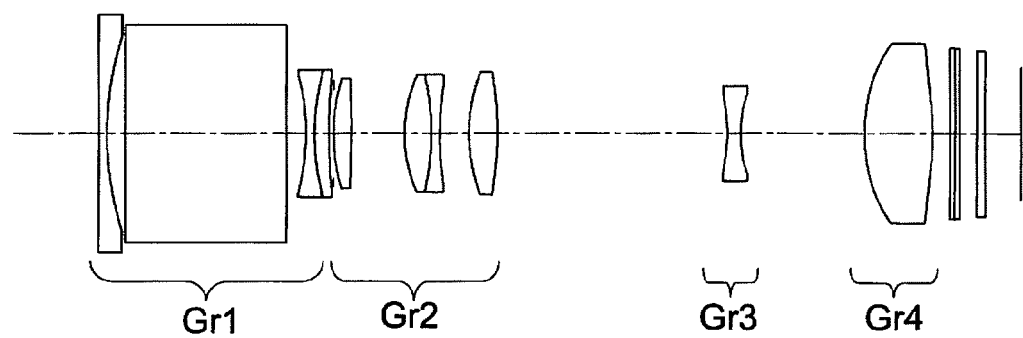
FIG. 6C is a cross-sectional diagram of the zoom lens of Embodiment 2.
Figure 7A:
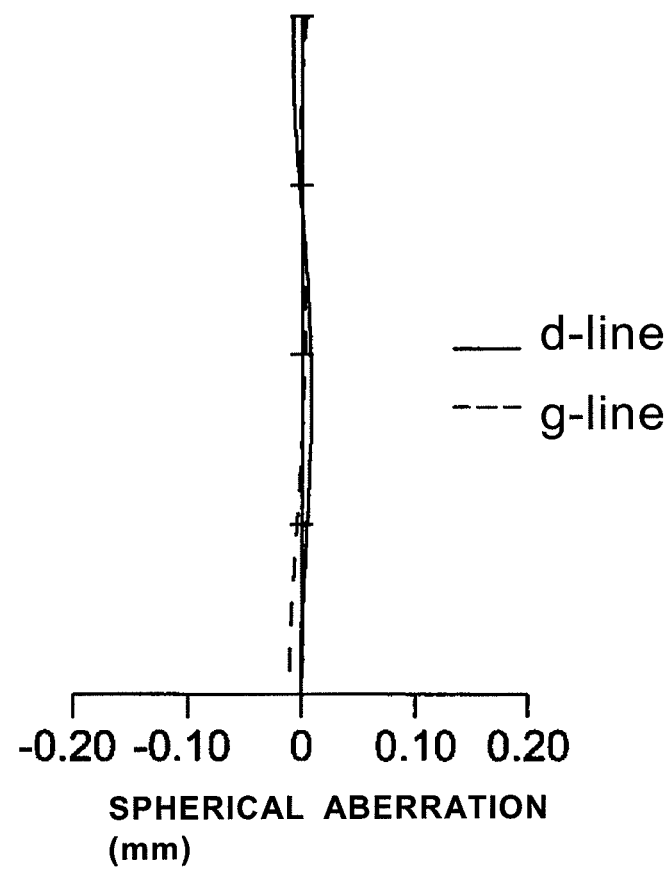
FIG. 7A is a diagram showing aberrations in the wide-angle end of the zoom lens of Embodiment 2.
Figure 7C:
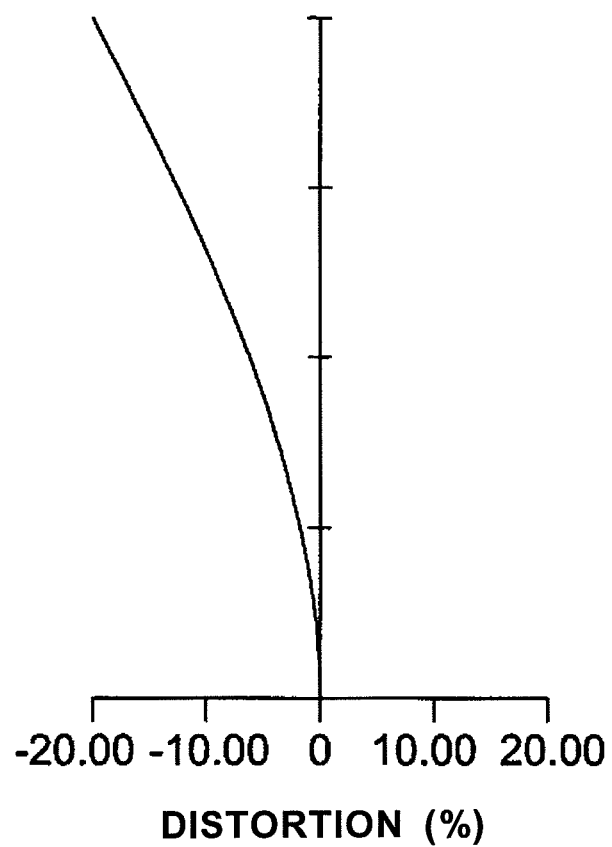
FIG. 7C is a diagram showing aberrations in the wide-angle end of the zoom lens of Embodiment 2.
Figure 8A:
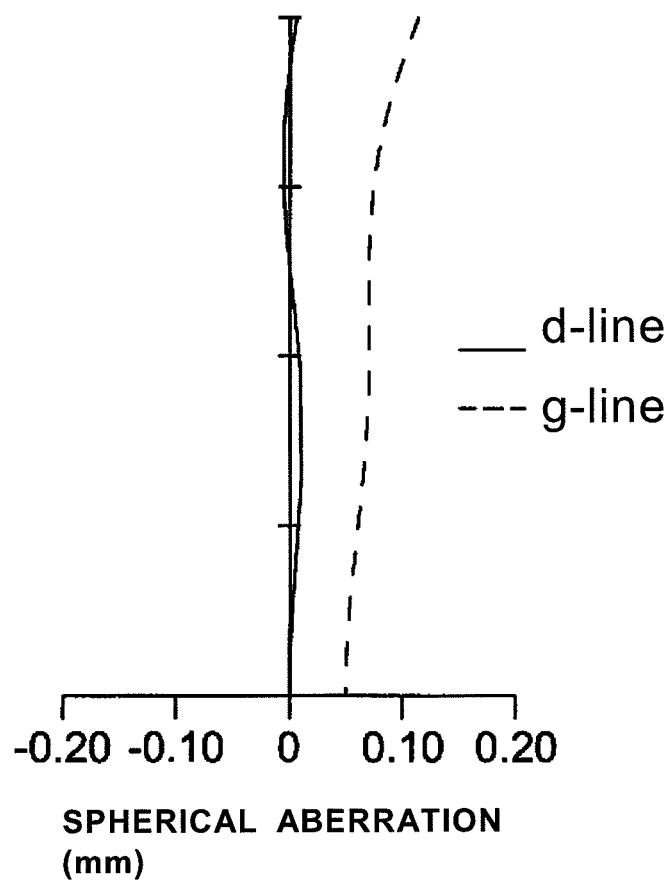
FIG. 8A is a diagram showing aberrations in the intermediate focal length of the zoom lens of Embodiment 2.
Figure 8B:
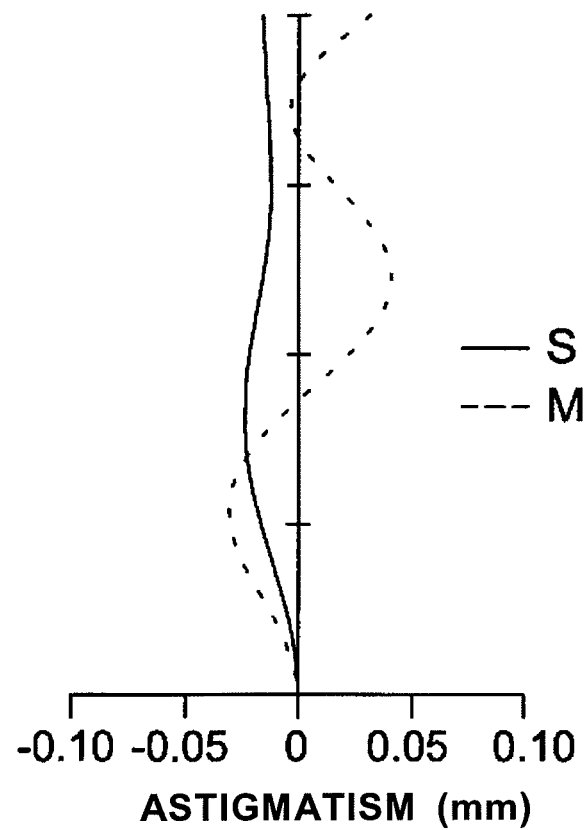
FIG. 8B is a diagram showing aberrations in the intermediate focal length of the zoom lens of Embodiment 2.
Figure 8C:
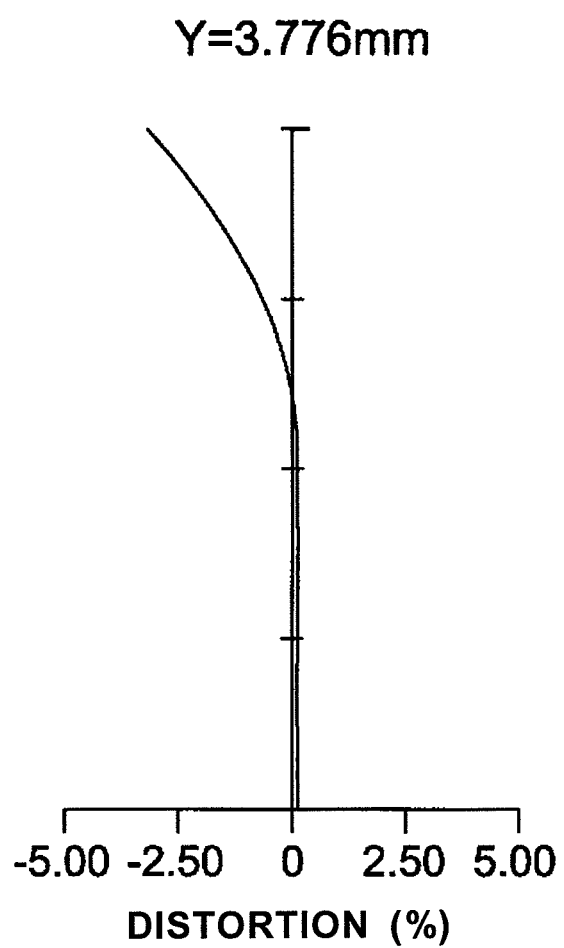
FIG. 8C is a diagram showing aberrations in the intermediate focal length of the zoom lens of Embodiment 2.
Figure 9A:
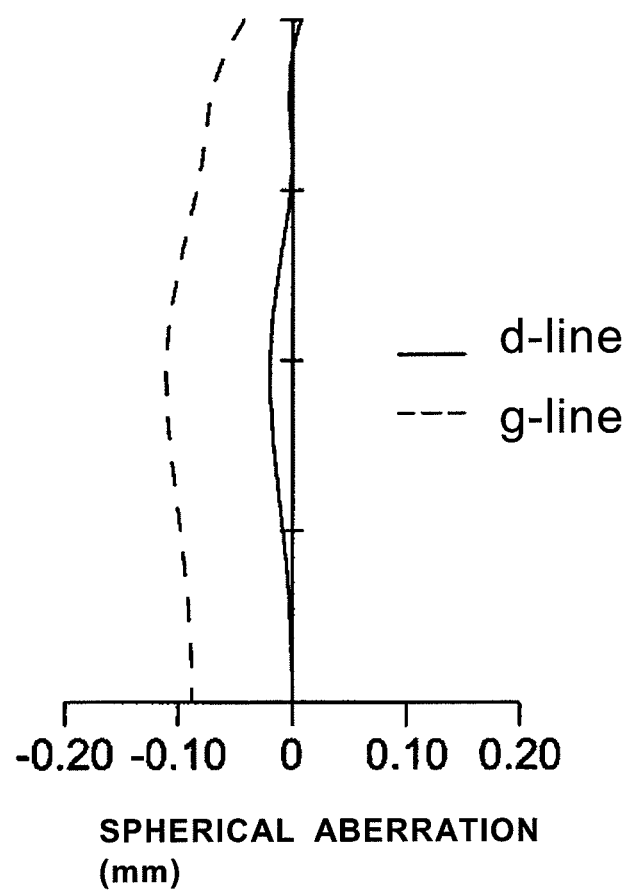
FIG. 9A is a diagram of aberrations in the telescopic end of the zoom lens of Embodiment 2.
Figure 9B:
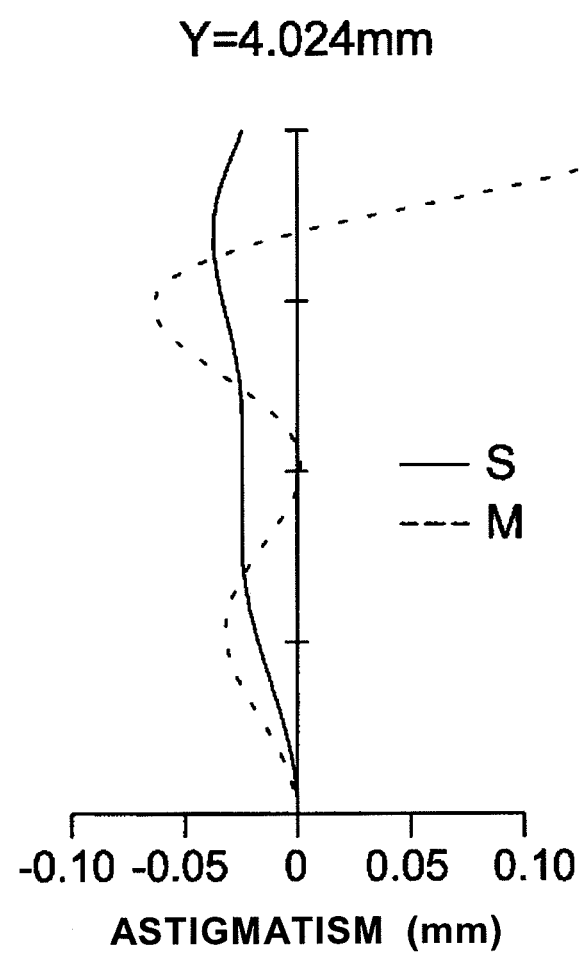
FIG. 9B is a diagram of aberrations in the telescopic end of the zoom lens of Embodiment 2.
Figure 9C:
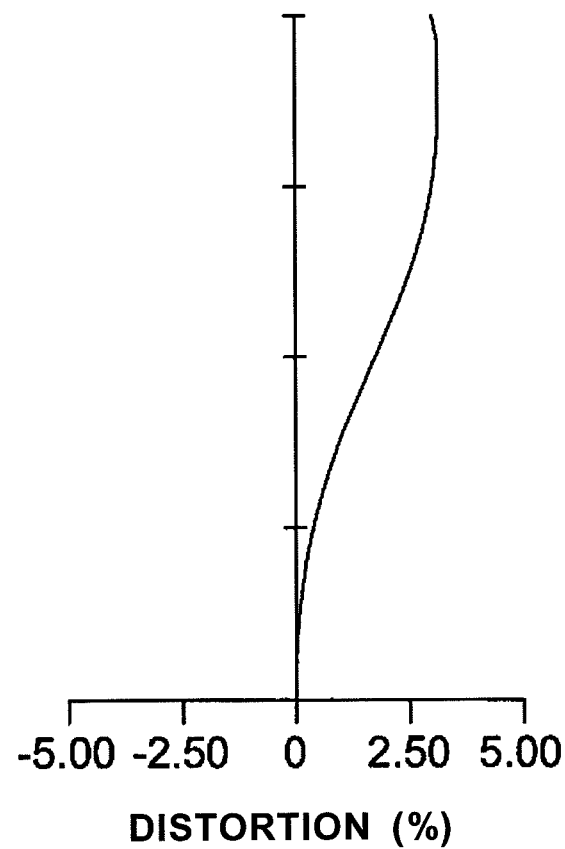
FIG. 9C is a diagram of aberrations in the telescopic end of the zoom lens of Embodiment 2.

Furthermore, FIG. 6A, FIG. 6B and FIG. 6C are cross-sectional diagrams of the zoom lens according to Embodiment 2. FIG. 6A is a cross-sectional diagram of the wide-angle end. FIG. 6B is a cross-sectional diagram of the intermediate focal length. FIG. 6C is a cross-sectional diagram of the telescopic end. FIG. 7A, FIG. 7B and FIG. 7C are diagrams of aberrations in the wide-angle end. FIG. 8A, FIG. 8B and FIG. 8C are diagrams of aberrations in the intermediate focal length. FIG. 9A, FIG. 9B and FIG. 9C are diagrams of aberrations in the telescopic end. Furthermore, in the diagrams of spherical aberrations shown in FIG. 7A, FIG. 8A and FIG. 9A, the solid line represents the d-line and the dotted line represents the g-line. Moreover, in the diagrams of astigmatisms shown in FIG. 7B, FIG. 8B and FIG. 9B, the solid line represents an aberration in the sagittal image plane, and the dotted line represents an aberration in the meridional image plane.

Embodiment 3

The parameters of the zoom lens of Embodiment 3 are shown below.

f: 4.86 to 9.29 to 18.21

F: 3.23 to 4.56 to 6.08

Zoom ratio: 3.75

Lens surface data are shown below.

| Surface no. | R(mm) | D(mm) | Nd | vd | Effective radius (mm) |
|---|---|---|---|---|---|
| 1 | 1492.444 | 0.50 | 1.61800 | 63.4 | 6.10 |
| 2 | 10.085 | 1.85 |  |  | 5.26 |
| 3 | ∞ | 8.65 | 1.84670 | 23.8 | 5.15 |
| 4 | ∞ | 1.16 |  |  | 3.72 |
| 5 | −13.020 | 0.50 | 1.49700 | 81.6 | 3.50 |
| 6 | 22.459 | 0.76 | 1.92290 | 20.9 | 3.46 |
| 7 | 72.922 | d1 |  |  | 3.42 |
| 8(diaphragm) | ∞ | 0.00 |  |  | 2.37 |
| 9 | 7.793 | 3.00 | 1.72920 | 54.7 | 2.44 |
| 10 | −29.710 | 1.17 |  |  | 2.32 |
| 11 | −14.556 | 0.50 | 1.92290 | 20.9 | 2.18 |
| 12 | 54.389 | 1.00 |  |  | 2.19 |
| 13 | ∞ | 1.25 |  |  | 2.25 |
| 14(*) | 8.501 | 1.42 | 1.54470 | 56.2 | 2.55 |
| 15(*) | −26.430 | d2 |  |  | 2.58 |
| 16(*) | −29.232 | 0.62 | 1.54470 | 56.2 | 2.56 |
| 17(*) | 9.140 | d3 |  |  | 2.56 |
| 18(*) | 13.938 | 4.19 | 1.54470 | 56.2 | 4.56 |
| 19(*) | −19.125 | 1.00 |  |  | 4.45 |
| 20 | ∞ | 0.30 | 1.54880 | 66.9 | 4.29 |
| 21 | ∞ | 0.30 | 1.56100 | 56.1 | 4.27 |
| 22 | ∞ | 1.00 |  |  | 4.25 |
| 23 | ∞ | 0.50 | 1.51680 | 64.2 | 4.13 |
| 24 | ∞ |  |  |  | 4.09 |

The aspherical coefficients are shown below.

Fourteenth Surface

K=0.00000E+00, A4=−0.77711E−03, A6=0.82648E−05, A8=−0.13190E−04, A10=0.14343E−05, A12=−0.10190E−06

Fifteenth Surface

K=0.00000E+00, A4=0.10401 E−03, A6=0.40524E−04, A8=−0.22347E−04, A10=0.26484E−05, A12=−0.15916E−06

Sixteenth Surface

K=0.00000E+00, A4=−0.11035E−02, A6=0.13656E−02, A8=−0.69336E−03, A10=0.17990E−03, A12=−0.23029E−04

Seventeenth Surface

K=0.00000E+00, A4=−0.12901E−02, A6=0.16790E−02, A8=−0.83248E−03, A10=0.21122E−03, A12=−0.26506E−04, A14=0.13043E−05

Eighteenth Surface

K=0.00000E+00, A4=0.18356E−03, A6=0.25680E−04, A8=−0.20562E−05, A10=0.59566E−07, A12=−0.48300E−09

Nineteenth Surface

K=0.00000E+00, A4=0.38081E−03, A6=0.25527E−04, A8=−0.14107E−05, A10=−0.11711E−07, A12=0.12680E−08

Various data from instances of magnification variation are shown below.

|   | Wide angle | Intermediate | Telephoto |
|---|---|---|---|
| f | 4.86 | 9.29 | 18.21 |
| Fno | 3.23 | 4.56 | 6.08 |
| fB | 9.84 | 9.77 | 9.92 |
| ΔfB(+30° C.) | 0.04 | 0.04 | 0.30 |
| 2ω | 77.6 | 45.6 | 24.2 |
| 2Y | 6.246 | 7.349 | 7.768 |
| L | 49.81 | 49.79 | 49.84 |
| d1 | 14.86 | 7.21 | 0.30 |
| d2 | 1.96 | 2.81 | 8.00 |
| d3 | 1.46 | 8.26 | 9.98 |

Lens group data are shown below.

| Group | Starting surface | Focal length (mm) |
|---|---|---|
| 1 | 1 | −9.27 |
| 2 | 8 | 9.70 |
| 3 | 16 | −12.71 |
| 4 | 18 | 15.49 |

Values corresponding to each conditional expression described above are shown below.

|f2L−f3|=0.943
f2L/f2=1.236
m4T=0.597
m2T/m2W=2.822
|f1a/fW|=3.384

In the zoom lens of Embodiment 3, when changing the magnification from the wide-angle end to the telescopic end, the second lens group Gr2 moves along the direction of the optical axis to the object side, and the third lens group Gr3 moves along the direction of the optical axis. As a result, the intervals of the lens groups Gr1 through Gr4 change, and the magnification is changed. Furthermore, when changing the magnification, the lens groups Gr1 and Gr4 do not move. Moreover, by causing the third lens group Gr3 to move, it is possible to perform focusing from the infinity to a finite distance. Furthermore, the sixth lens L6, the seventh lens L7 and the eighth lens L8 are formed from a plastic material, and the other lenses are polished lenses formed from a glass material.

The fourth lens group Gr4 is configured to be movable in a plane perpendicular to the direction of the optical axis. As a result, it is possible to correct blurs in the image formation in the image plane, and corrections of blurring are realized.

Moreover, in Embodiment 3, in the wide-angle end, alignment using the sixth lens L6 is performed.

Figure 10A:
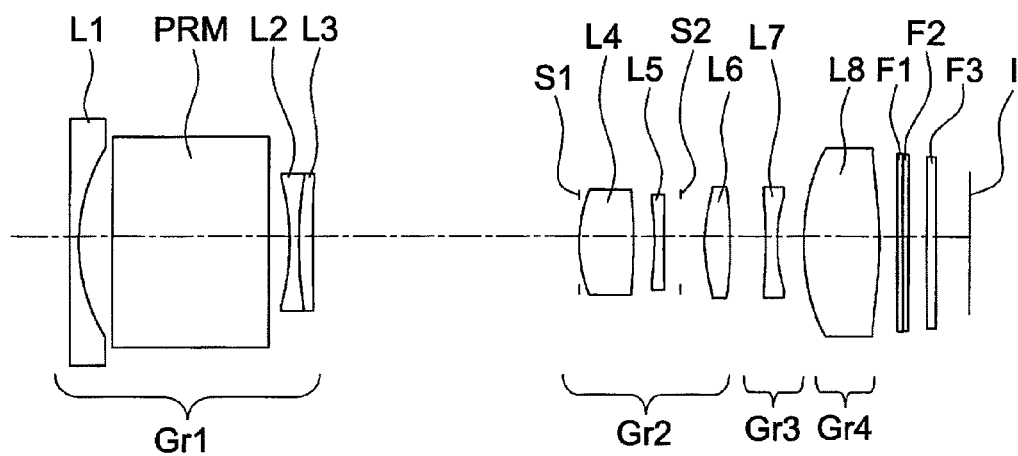
FIG. 10A is a cross-sectional diagram of the zoom lens of Embodiment 3.
Figure 10B:
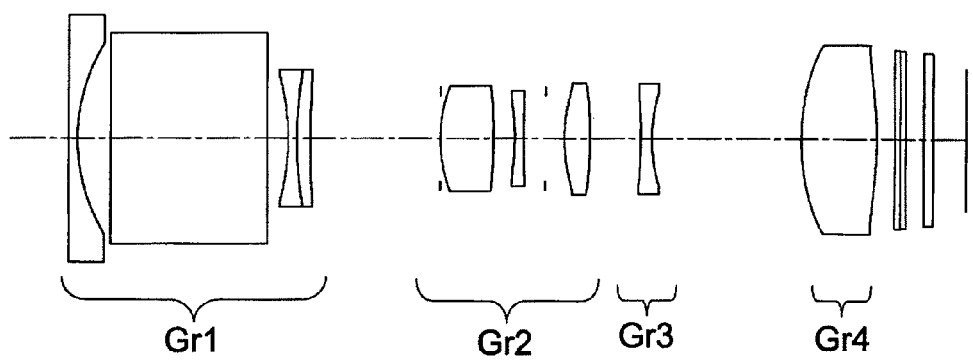
FIG. 10B is a cross-sectional diagram of the zoom lens of Embodiment 3.
Figure 10C:
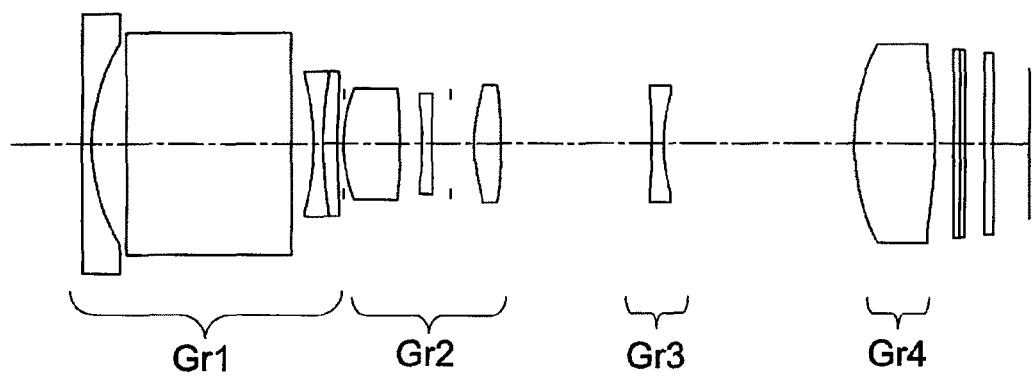
FIG. 10C is a cross-sectional diagram of the zoom lens of Embodiment 3.
Figure 11A:
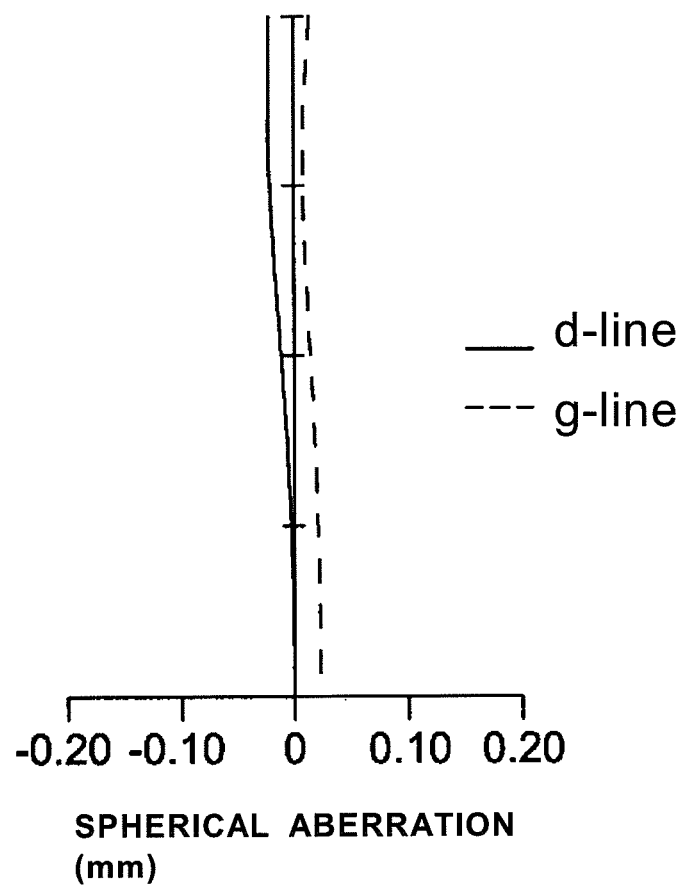
FIG. 11A is a diagram of aberrations in the wide-angle end of the zoom lens of Embodiment 3.
Figure 11B:
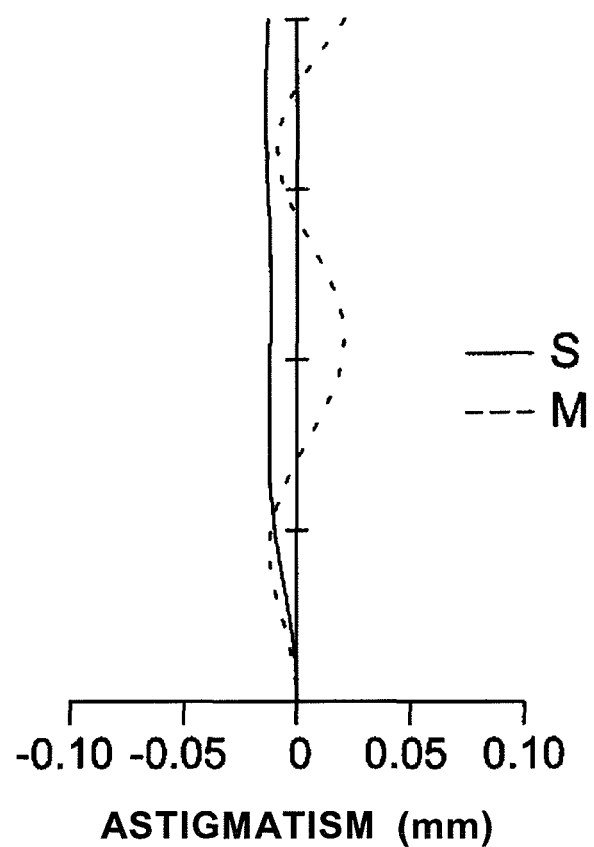
FIG. 11B is a diagram of aberrations in the wide-angle end of the zoom lens of Embodiment 3.
Figure 11C:
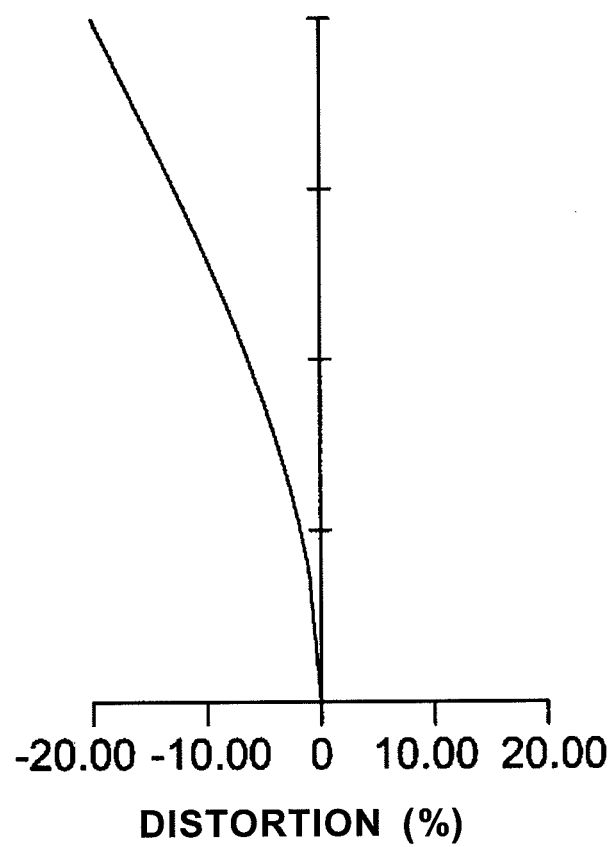
FIG. 11C is a diagram of aberrations in the wide-angle end of the zoom lens of Embodiment 3.
Figure 12A:
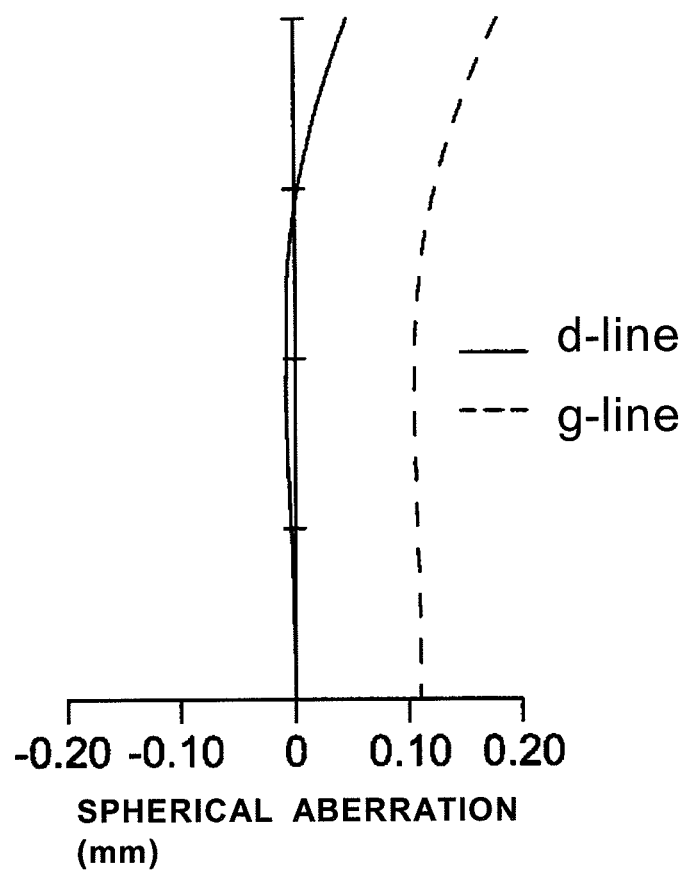
FIG. 12A is a diagram of aberrations in the intermediate focal length of the zoom lens of Embodiment 3.
Figure 12B:
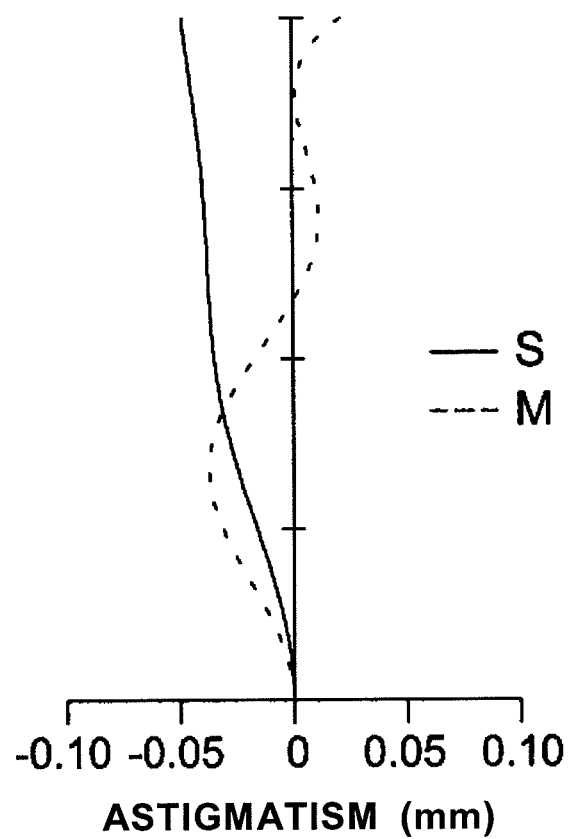
FIG. 12B is a diagram of aberrations in the intermediate focal length of the zoom lens of Embodiment 3.
Figure 12C:
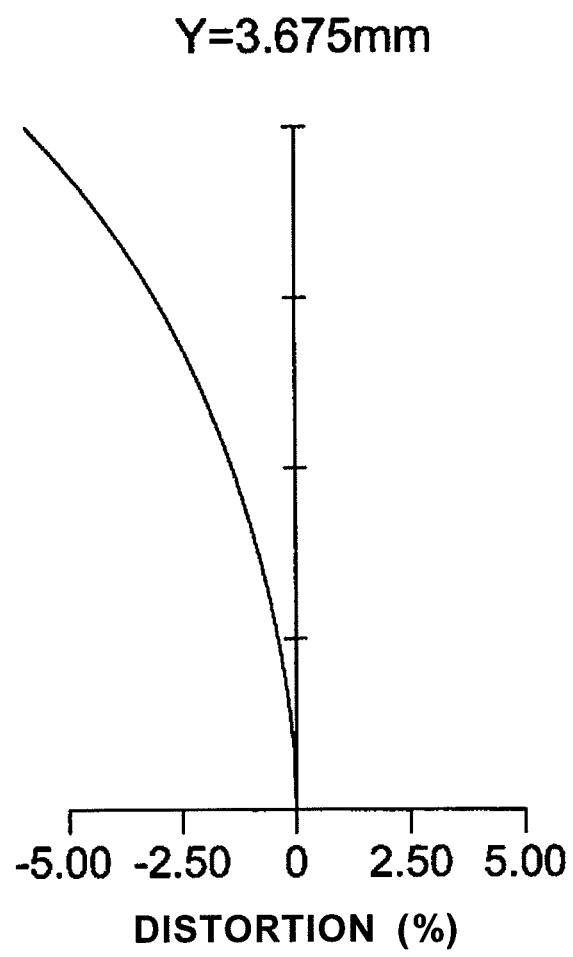
FIG. 12C is a diagram of aberrations in the intermediate focal length of the zoom lens of Embodiment 3.
Figure 13A:
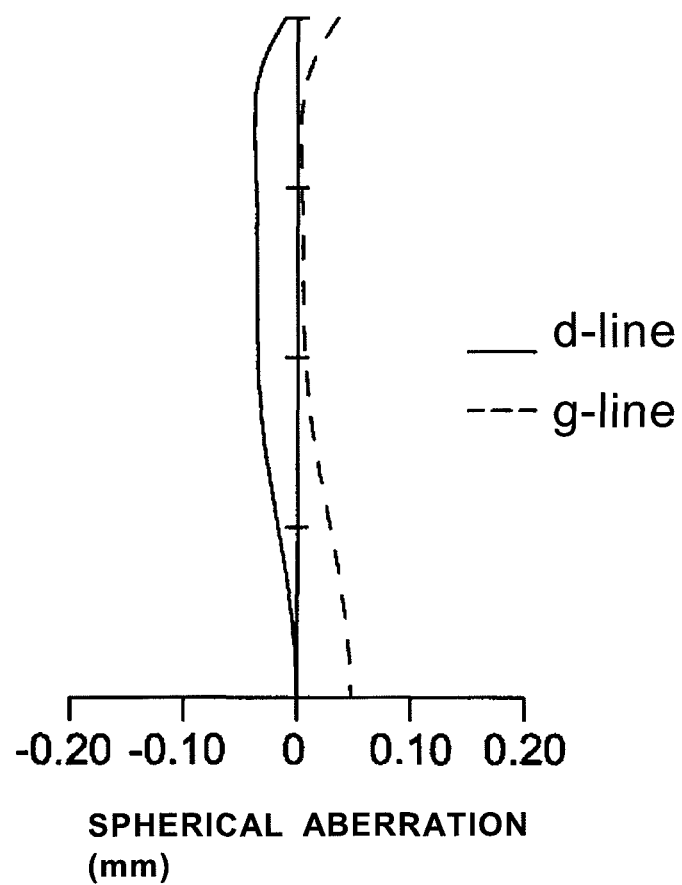
FIG. 13A is a diagram of aberrations in the telescopic end of the zoom lens of Embodiment 3.
Figure 13B:
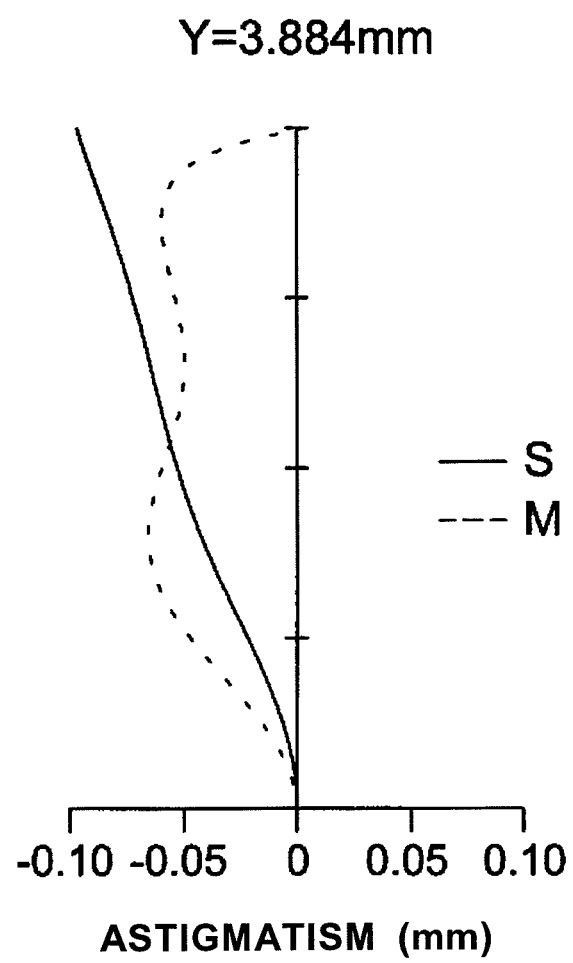
FIG. 13B is a diagram of aberrations in the telescopic end of the zoom lens of Embodiment 3.
Figure 13C:
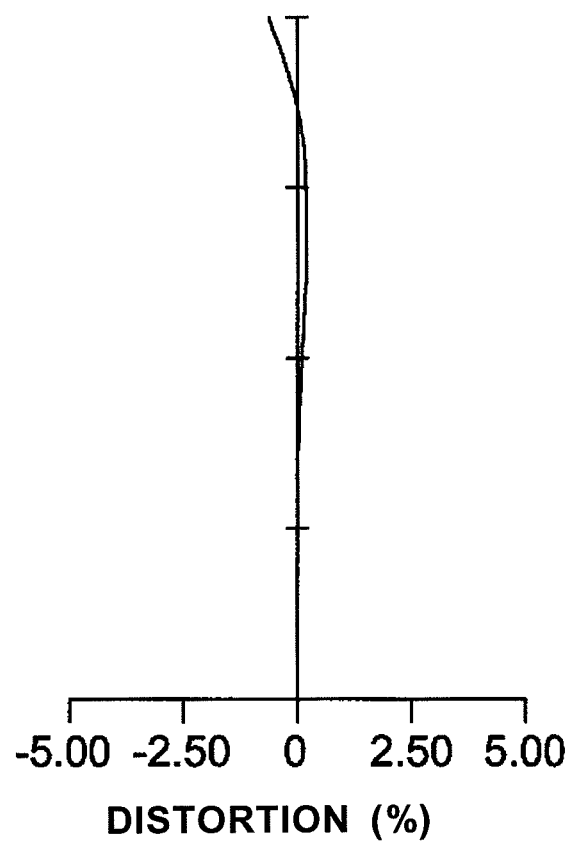
FIG. 13C is a diagram of aberrations in the telescopic end of the zoom lens of Embodiment 3.

Furthermore, FIG. 10A, FIG. 10B and FIG. 10C are cross-sectional diagrams of the zoom lens according to Embodiment 3. FIG. 10A is a cross-sectional diagram of the wide-angle end. FIG. 10B is a cross-sectional diagram of the intermediate focal length. FIG. 10C is a cross-sectional diagram of the telescopic end. FIG. 11A, FIG. 11B and FIG. 11C are diagrams of aberrations in the wide-angle end. FIG. 12A, FIG. 12B and FIG. 12C are diagrams of aberrations in the intermediate focal length. FIG. 13A, FIG. 13B and FIG. 13C are diagrams of aberrations in the telescopic end. Furthermore, in the diagrams of spherical aberrations shown in FIG. 11A, FIG. 12A and FIG. 13A, the solid line represents the d-line and the dotted line represents the g-line. Moreover, in the diagrams of astigmatisms shown in FIG. 11B, FIG. 12B and FIG. 13B, the solid line represents an aberration in the sagittal image plane, and the dotted line represents an aberration in the meridional image plane.

Embodiment 4

The parameters of the zoom lens of Embodiment 4 are shown below.

f: 5.06 to 11.12 to 24.02

F: 3.35 to 4.82 to 6.3

Zoom ratio: 4.75

Lens surface data are shown below.

| Surface no. | R(mm) | D(mm) | Nd | vd | Effective radius (mm) |
|---|---|---|---|---|---|
| 1 | 51.658 | 0.50 | 1.49700 | 81.6 | 8.40 |
| 2 | 14.610 | 2.39 |  |  | 7.43 |
| 3 | ∞ | 12.11 | 1.84670 | 23.8 | 7.25 |
| 4 | ∞ | 1.12 |  |  | 4.23 |
| 5 | −16.822 | 0.50 | 1.88300 | 40.8 | 3.90 |
| 6 | 11.908 | 1.10 | 1.94590 | 18.0 | 3.78 |
| 7 | 38.212 | d1 |  |  | 3.73 |
| 8(diaphragm) | ∞ | 0.00 |  |  | 2.57 |
| 9 | 8.484 | 4.50 | 1.62400 | 35.8 | 2.71 |
| 10 | −4.424 | 0.50 | 1.67270 | 27.1 | 2.86 |
| 11 | 9.805 | 1.19 |  |  | 3.00 |
| 12(*) | 7.914 | 2.68 | 1.54470 | 56.2 | 3.50 |
| 13(*) | −8.503 | d2 |  |  | 3.70 |
| 14(*) | −6.231 | 0.58 | 1.54470 | 56.2 | 2.30 |
| 15(*) | 224.901 | d3 |  |  | 2.31 |
| 16(*) | 11.995 | 1.84 | 1.54470 | 56.2 | 4.33 |
| 17(*) | −593.715 | 1.00 |  |  | 4.29 |
| 18 | ∞ | 0.30 | 1.54880 | 66.9 | 4.23 |
| 19 | ∞ | 0.30 | 1.56100 | 56.1 | 4.22 |
| 20 | ∞ | 1.00 |  |  | 4.21 |
| 21 | ∞ | 0.50 | 1.51680 | 64.2 | 4.15 |
| 22 | ∞ |  |  |  | 4.13 |

The aspherical coefficients are shown below.

Twelfth Surface

K=0.00000E+00, A4=−0.10799E−02, A6=0.13465E−04, A8=−0.54893E−05, A10=0.40348E−06, A12=−0.20960E−07

Thirteenth Surface

K=0.00000E+00, A4=−0.15891E−03, A6=0.23516E−04, A8=−0.65062E−05, A10=0.43378E−06, A12=−0.17735E−07

Fourteenth Surface

K=0.00000E+00, A4=0.12421E−01, A6=−0.32284E−03, A8=−0.57085E−03, A10=0.17693E−03, A12=−0.23032E−04, A14=0.11541E−05

Fifteenth Surface

K=0.00000E+00, A4=0.11380E−01, A6=0.19644E−03, A8=−0.72805E−03, A10=0.20655E−03, A12=−0.26226E−04, A14=0.13043E−05

Sixteenth Surface

K=0.00000E+00, A4=−0.38496E−04, A6=0.10820E−03, A8=−0.14615E−04, A10=0.78211E−06, A12=−0.14900E−07

Seventeenth Surface

K=0.00000E+00, A4=−0.17081E−03, A6=0.12777E−03, A8=−0.17703E−04, A10=0.96053E−06, A12=−0.18485E−07

Various data from instances of magnification variation are shown below.

|  | Wide angle | Intermediate | Telephoto |
|---|---|---|---|
| f | 5.06 | 11.12 | 24.02 |
| Fno | 3.35 | 4.82 | 6.30 |
| fB | 6.24 | 6.25 | 6.29 |
| ΔfB(+30° C.) | 0.15 | 0.34 | 1.05 |
| 2ω | 75.4 | 38.7 | 18.5 |
| 2Y | 6.243 | 7.21 | 7.531 |
| L | 60.03 | 60.04 | 60.08 |
| d1 | 18.08 | 7.85 | 0.30 |
| d2 | 2.75 | 4.50 | 11.60 |
| d3 | 1.24 | 9.72 | 10.16 |

Lens group data are shown below.

| Group | Starting surface | Focal length (mm) |
|---|---|---|
| 1 | 1 | −8.68 |
| 2 | 8 | 9.45 |
| 3 | 14 | −11.12 |
| 4 | 16 | 21.61 |

Values corresponding to each conditional expression described above are shown below.

|f2L−f3|=0.718
f2L/f2=0.845
m4T=0.550
m2T/m2W=3.674
|f1a/fW|=8.143

In the zoom lens of Embodiment 4, when changing the magnification from the wide-angle end to the telescopic end, the second lens group Gr2 moves along the direction of the optical axis to the object side, and the third lens group Gr3 moves along the direction of the optical axis to the object side. As a result, the intervals of the lens groups Gr1 through Gr4 change, and the magnification is changed. Furthermore, when changing the magnification, the lens groups Gr1 and Gr4 do not move. Moreover, by causing the third lens group Gr3 to move, it is possible to perform focusing from the infinity to a finite distance. Furthermore, the sixth lens L6, the seventh lens L7 and the eighth lens L8 are formed from a plastic material, and the other lenses are polished lenses formed from a glass material.

The fourth lens group Gr4 is configured to be movable in a plane perpendicular to the direction of the optical axis. As a result, it is possible to correct blurs in the image formation in the image plane, and corrections of blurring are realized.

Moreover, in Embodiment 4, in the wide-angle end, alignment using the sixth lens L6 is performed.

Figure 14A:
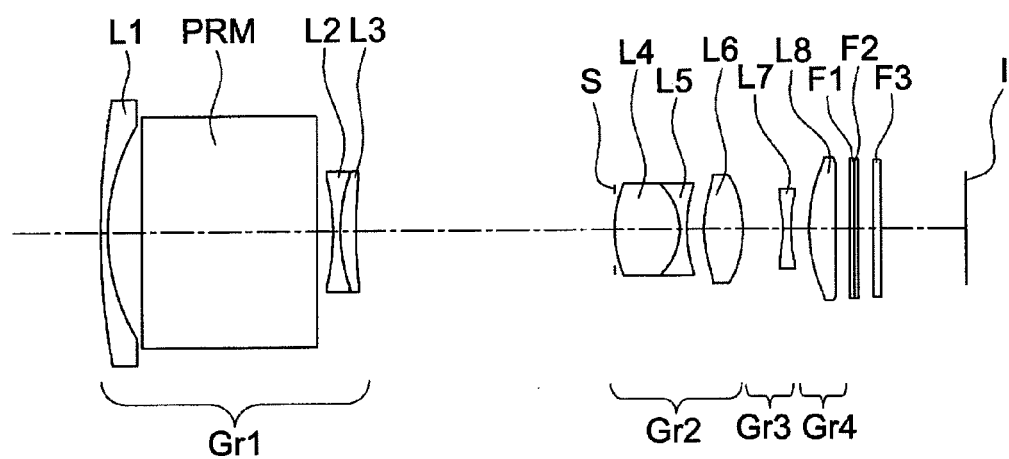
FIG. 14A is a cross-sectional diagram of the zoom lens of Embodiment 4.
Figure 14B:
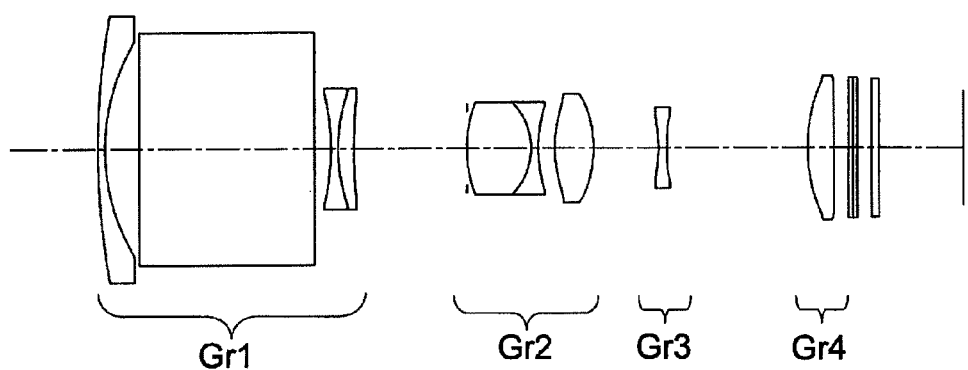
FIG. 14B is a cross-sectional diagram of the zoom lens of Embodiment 4.
Figure 14C:
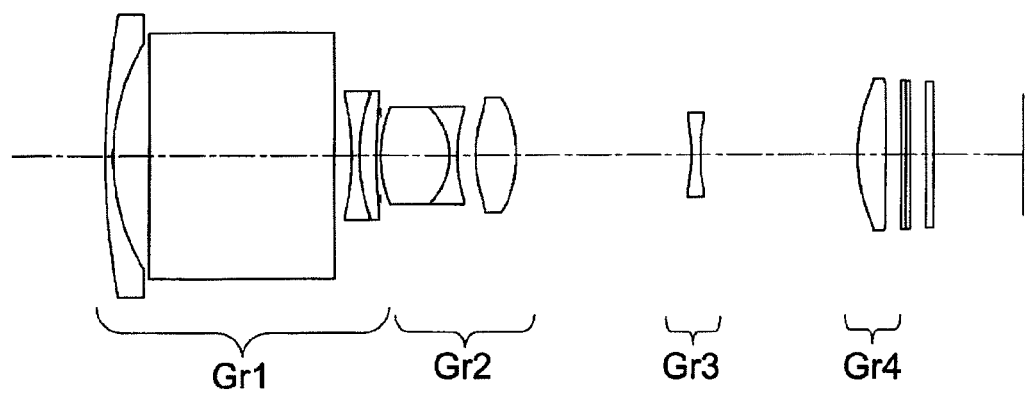
FIG. 14C is a cross-sectional diagram of the zoom lens of Embodiment 4.
Figure 15A:
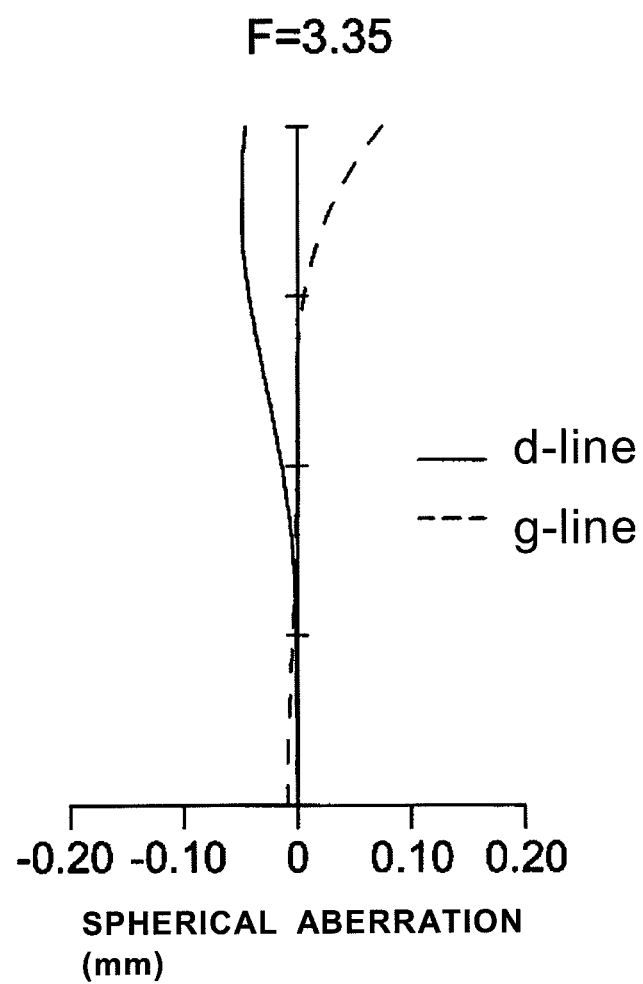
FIG. 15A is a diagram of aberrations in the wide-angle end of the zoom lens of Embodiment 4.
Figure 15B:
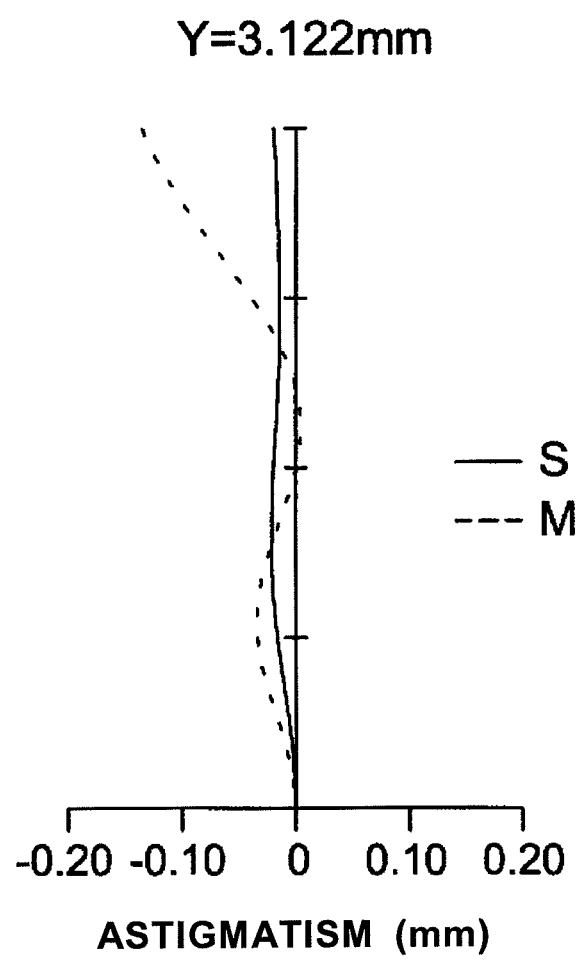
FIG. 15B is a diagram of aberrations in the wide-angle end of the zoom lens of Embodiment 4.
Figure 15C:
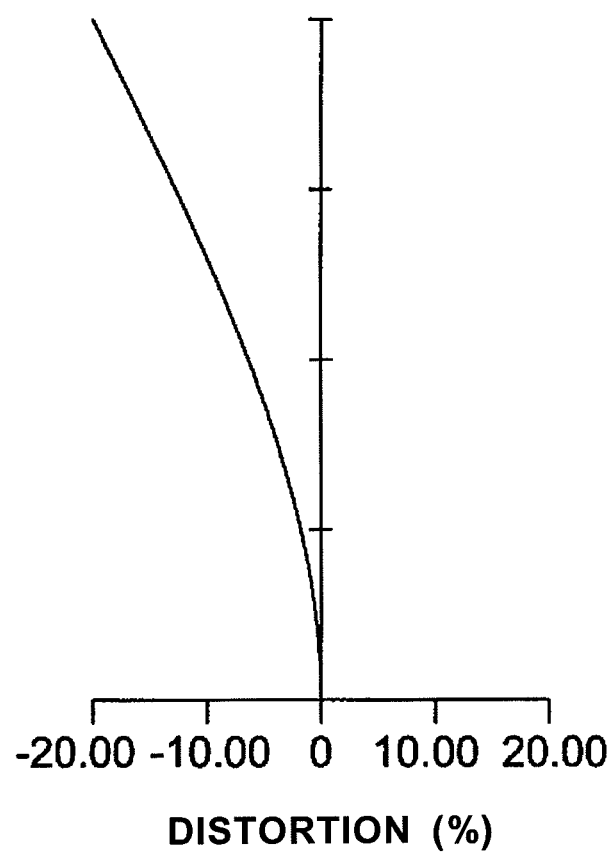
FIG. 15C is a diagram of aberrations in the wide-angle end of the zoom lens of Embodiment 4.
Figure 16A:
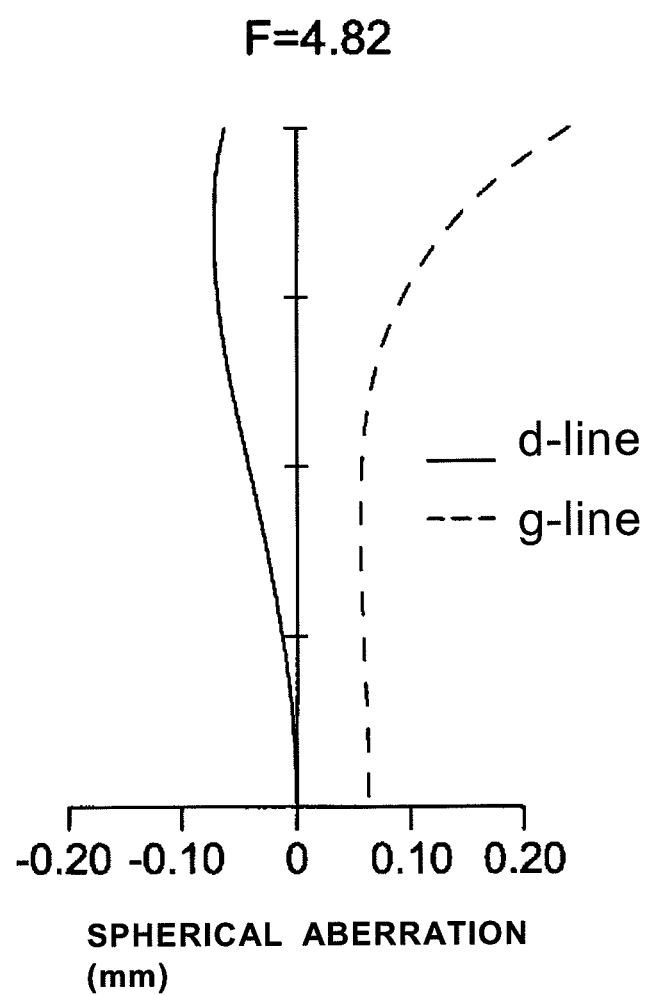
FIG. 16A is a diagram of aberrations in the intermediate focal length of the zoom lens of Embodiment 4.
Figure 16B:
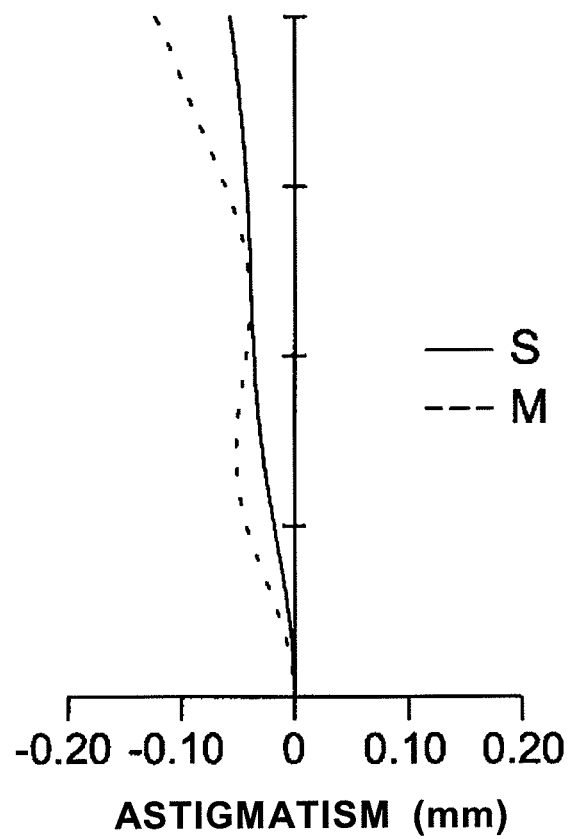
FIG. 16B is a diagram of aberrations in the intermediate focal length of the zoom lens of Embodiment 4.
Figure 16C:
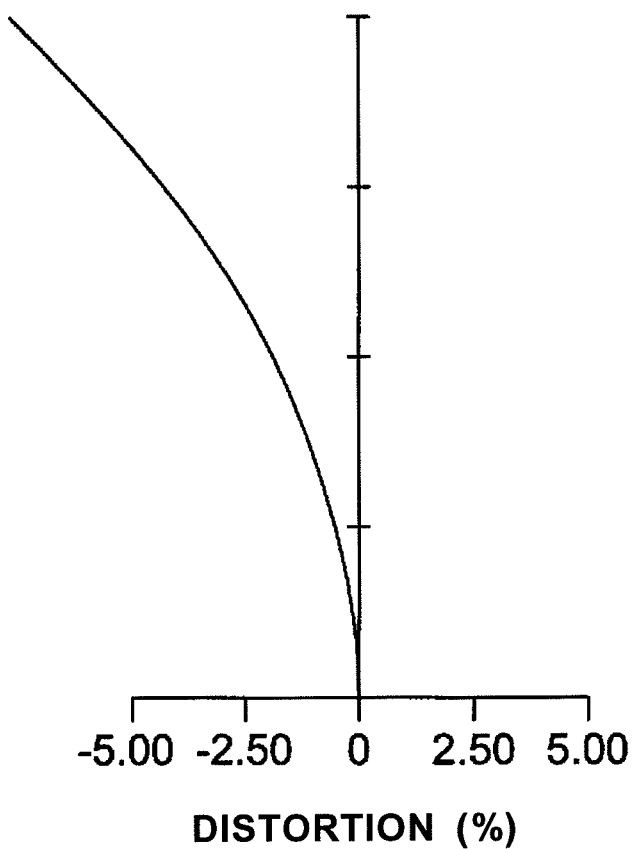
FIG. 16C is a diagram of aberrations in the intermediate focal length of the zoom lens of Embodiment 4.
Figure 17A:
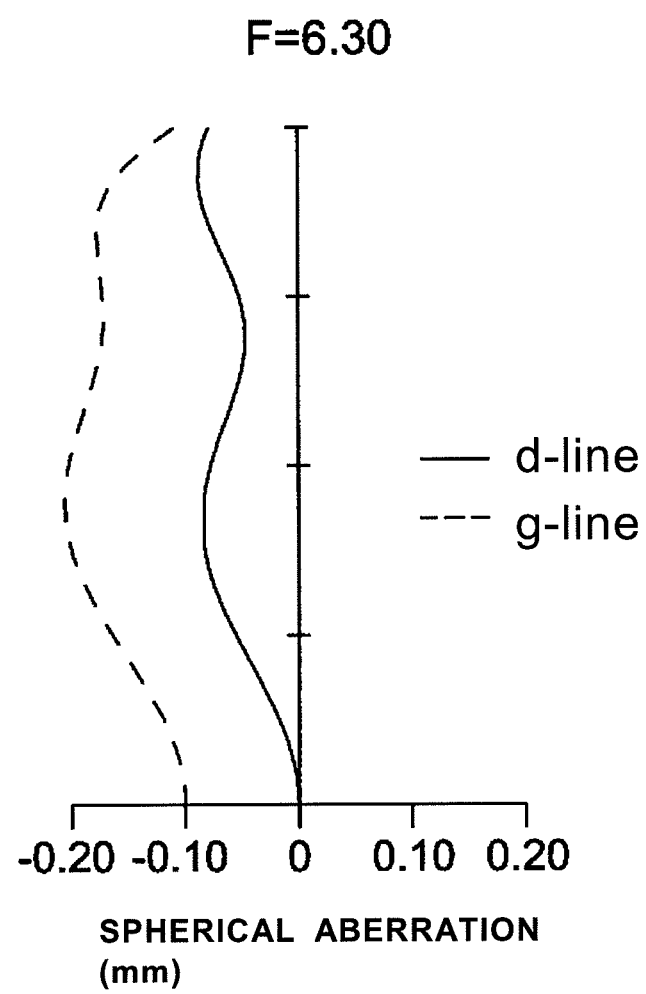
FIG. 17A is a diagram of aberrations in the telescopic end of the zoom lens of Embodiment 4.
Figure 17B:
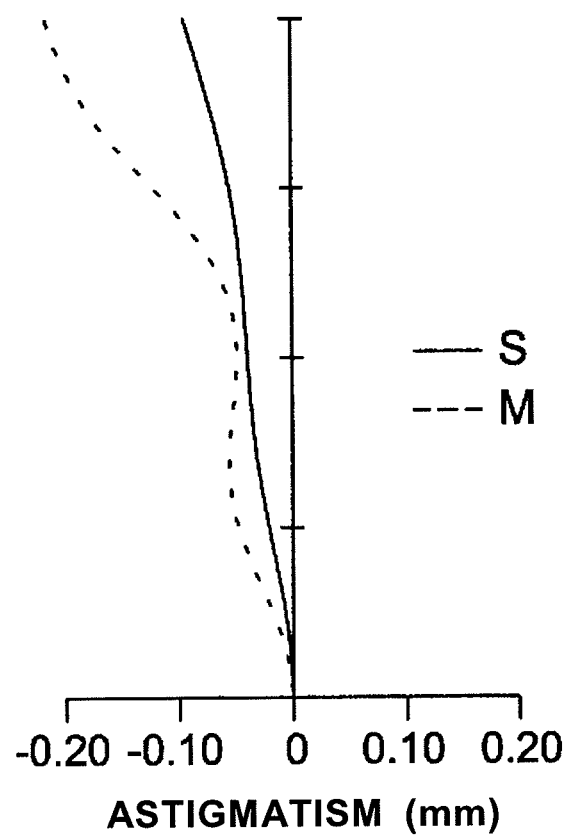
FIG. 17B is a diagram of aberrations in the telescopic end of the zoom lens of Embodiment 4.
Figure 17C:
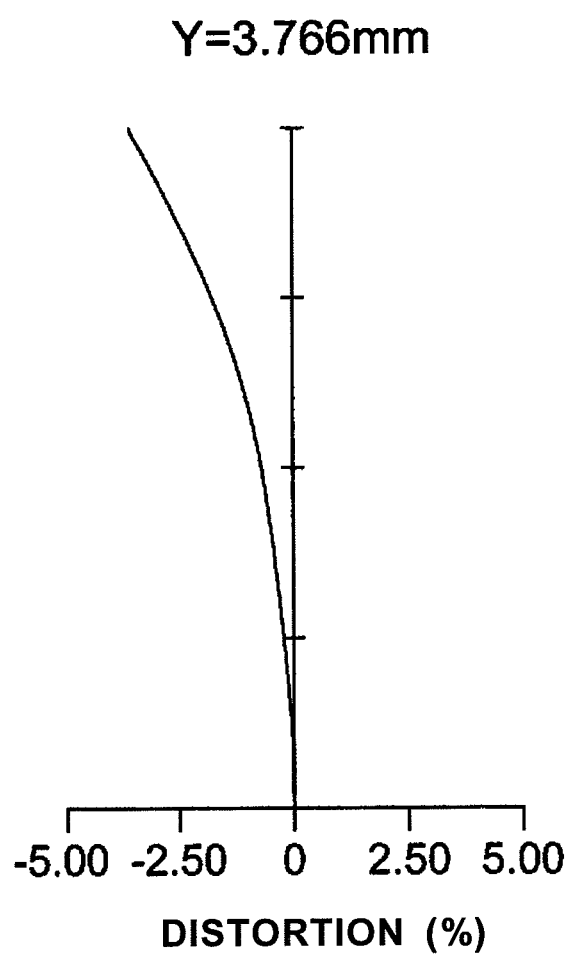
FIG. 17C is a diagram of aberrations in the telescopic end of the zoom lens of Embodiment 4.

Furthermore, FIG. 14A, FIG. 14B and FIG. 14C are cross-sectional diagrams of the zoom lens according to Embodiment 4. FIG. 14A is a cross-sectional diagram of the wide-angle end. FIG. 14B is a cross-sectional diagram of the intermediate focal length. FIG. 14C is a cross-sectional diagram of the telescopic end. FIG. 15A, FIG. 15B and FIG. 15C are diagrams of aberrations in the wide-angle end. FIG. 16A, FIG. 16B and FIG. 16C are diagrams of aberrations in the intermediate focal length. FIG. 17A, FIG. 17 and FIG. 17C are diagrams of aberrations in the telescopic end. Furthermore, in the diagrams of spherical aberrations shown in FIG. 15A, FIG. 16A and FIG. 17A, the solid line represents the d-line and the dotted line represents the g-line. Moreover, in the diagrams of astigmatisms shown in FIG. 15B, FIG. 16B and FIG. 17B, the solid line represents an aberration in the sagittal image plane, and the dotted line represents an aberration in the meridional image plane.

Embodiment 5

The parameters of the zoom lens of Embodiment 5 are shown below.

f: 5.06 to 10.92 to 24.01

F: 3.36 to 5.03 to 6.3

Zoom ratio: 4.75

Lens surface data are shown below.

| Surface no. | R(mm) | D(mm) | Nd | vd | Effective radius (mm) |
|---|---|---|---|---|---|
| 1 | 1693.883 | 0.50 | 1.72920 | 54.7 | 6.67 |
| 2 | 20.951 | 1.10 |  |  | 6.14 |
| 3 | ∞ | 10.13 | 1.84670 | 23.8 | 6.06 |
| 4 | ∞ | 1.24 |  |  | 3.81 |
| 5 | −11.649 | 0.50 | 1.72920 | 54.7 | 3.50 |
| 6 | 16.848 | 0.82 | 1.94590 | 18.0 | 3.43 |
| 7 | 46.543 | d1 |  |  | 3.39 |
| 8(diaphragm) | ∞ | 0.00 |  |  | 2.64 |
| 9 | 12.721 | 1.12 | 1.65840 | 50.9 | 2.71 |
| 10 | −28.903 | 2.35 |  |  | 2.75 |
| 11 | 8.299 | 1.60 | 1.49700 | 81.6 | 2.84 |
| 12 | −13.053 | 0.50 | 1.90370 | 31.3 | 2.76 |
| 13 | 16.454 | 3.58 |  |  | 2.73 |
| 14(*) | 9.999 | 1.71 | 1.54470 | 56.2 | 3.13 |
| 15(*) | −17.735 | d2 |  |  | 3.09 |
| 16(*) | −8.174 | 0.78 | 1.54470 | 56.2 | 2.35 |
| 17(*) | 10.465 | d3 |  |  | 2.37 |
| 18(*) | 19.887 | 2.97 | 1.54470 | 56.2 | 4.52 |
| 19(*) | −10.198 | 1.00 |  |  | 4.53 |
| 20 | ∞ | 0.30 | 1.54880 | 66.9 | 4.36 |
| 21 | ∞ | 0.30 | 1.56100 | 56.1 | 4.34 |
| 22 | ∞ | 1.00 |  |  | 4.32 |
| 23 | ∞ | 0.50 | 1.51680 | 64.2 | 4.21 |
| 24 | ∞ |  |  |  | 4.18 |

The aspherical coefficients are shown below.

Fourteenth Surface

K=0.00000E+00, A4=−0.39904E−03, A6=0.36968E−04, A8=−0.44048E−05, A10=0.27150E−06, A12=−0.54860E−08

Fifteenth Surface

K=0.00000E+00, A4=0.51376E−04, A6=0.47903E−04, A8=−0.64974E−05, A10=0.44374E−06, A12=−0.10733E−07

Sixteenth Surface

K=0.00000E+00, A4=0.37459E−02, A6=0.13227E−02, A8=−0.77282E−03, A10=0.18740E−03, A12=−0.23029E−04, A14=0.11541E−05

Seventeenth Surface

K=0.00000E+00, A4=0.32818E−02, A6=0.17269E−02, A8=−0.90911E−03, A10=0.21573E−03, A12=−0.26235E−04, A14=0.13043E−05

Eighteenth Surface

K=0.00000E+00, A4=0.52623E−03, A6=−0.60186E−05, A8=−0.88181E−06, A10=0.71497E−07, A12=−0.12160E−08

Nineteenth Surface

K=0.00000E+00, A4=0.13057E−02, A6=−0.30208E−04, A8=−0.16106E−05, A10=0.14222E−06, A12=−0.24740E−08

Various data from instances of magnification variation are shown below.

|     | Wide angle | Intermediate | Telephoto |
| --- | --- | --- | --- |
| f | 5.06 | 10.92 | 24.01 |
| Fno | 3.36 | 5.03 | 6.30 |
| fB | 7.13 | 7.07 | 7.25 |
| ΔfB(+30° C.) | 0.04 | 0.07 | 0.64 |
| 2ω | 75.4 | 39.4 | 18.5 |
| 2Y | 6.25 | 7.557 | 8.051 |
| L | 55.00 | 54.97 | 55.04 |
| d1 | 17.31 | 8.66 | 0.30 |
| d2 | 2.75 | 4.37 | 13.27 |
| d3 | 1.58 | 8.61 | 8.07 |

Lens group data are shown below.

| Group | Starting surface | Focal length (mm) |
| --- | --- | --- |
| 1 | 1 | −8.04 |
| 2 | 8 | 10.33 |
| 3 | 16 | −8.30 |
| 4 | 18 | 12.82 |

Values corresponding to each conditional expression described above are shown below.

|f2L−f3|=1.445
f2L/f2=1.162
m4T=0.630
m2T/m2W=3.545
|f1a/fW|=5.755

In the zoom lens of Embodiment 5, when changing the magnification from the wide-angle end to the telescopic end, the second lens group Gr2 moves along the direction of the optical axis to the object side, and the third lens group Gr3 moves along the direction of the optical axis. As a result, the intervals of the lens groups Gr1 through Gr4 change, and the magnification is changed. Furthermore, when changing the magnification, the lens groups Gr1 and Gr4 do not move. Moreover, by causing the third lens group Gr3 to move, it is possible to perform focusing from the infinity to a finite distance. Furthermore, the seventh lens L7, the eighth lens L8 and the ninth lens L9 are formed from a plastic material, and the other lenses are polished lenses formed from a glass material.

The fourth lens group Gr4 is configured to be movable in a plane perpendicular to the direction of the optical axis. As a result, it is possible to correct blurs in the image formation in the image plane, and corrections of blurring are realized.

Moreover, in Embodiment 5, in the wide-angle end, alignment using the seventh lens L7 is performed.

Figure 18A:
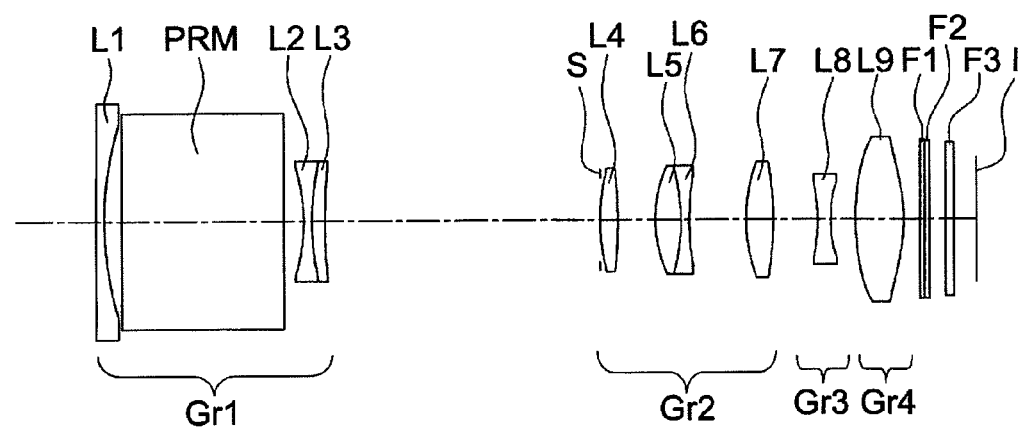
FIG. 18A is a cross-sectional diagram of the zoom lens of Embodiment 5.
Figure 18B:
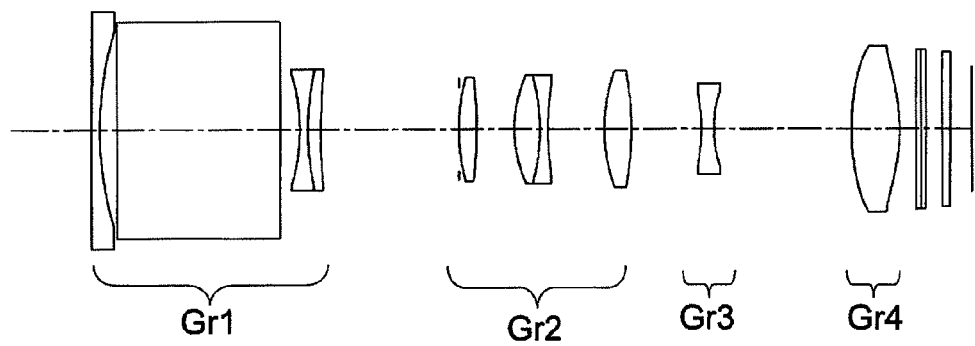
FIG. 18B is a cross-sectional diagram of the zoom lens of Embodiment 5.
Figure 18C:
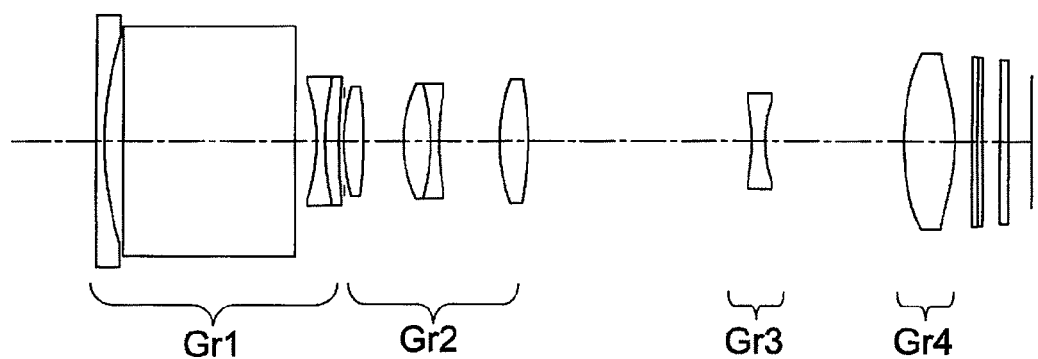
FIG. 18C is a cross-sectional diagram of the zoom lens of Embodiment 5.
Figure 19A:
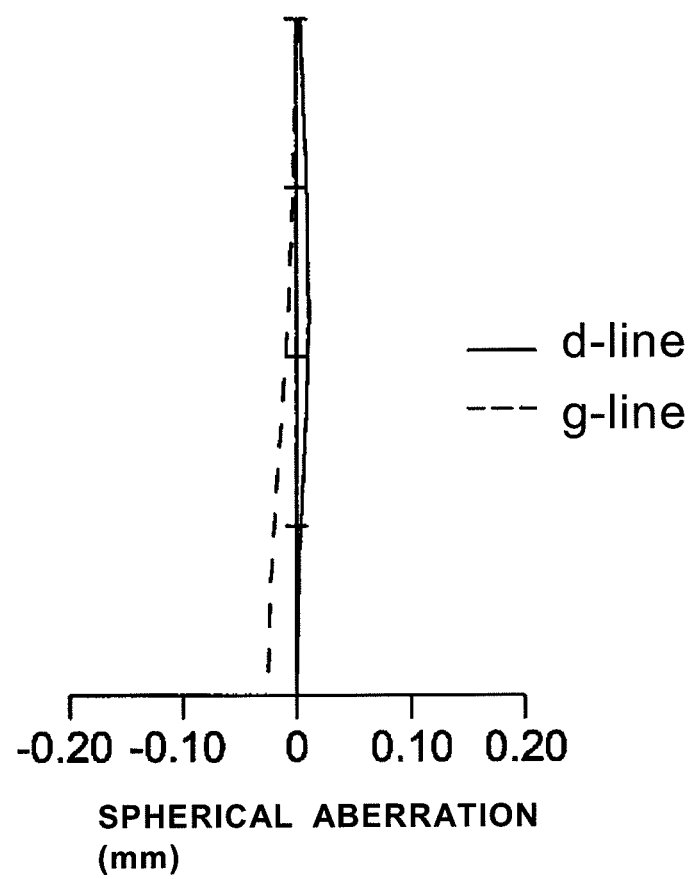
FIG. 19A is a diagram of aberrations in the wide-angle end of the zoom lens of Embodiment 5.
Figure 19B:
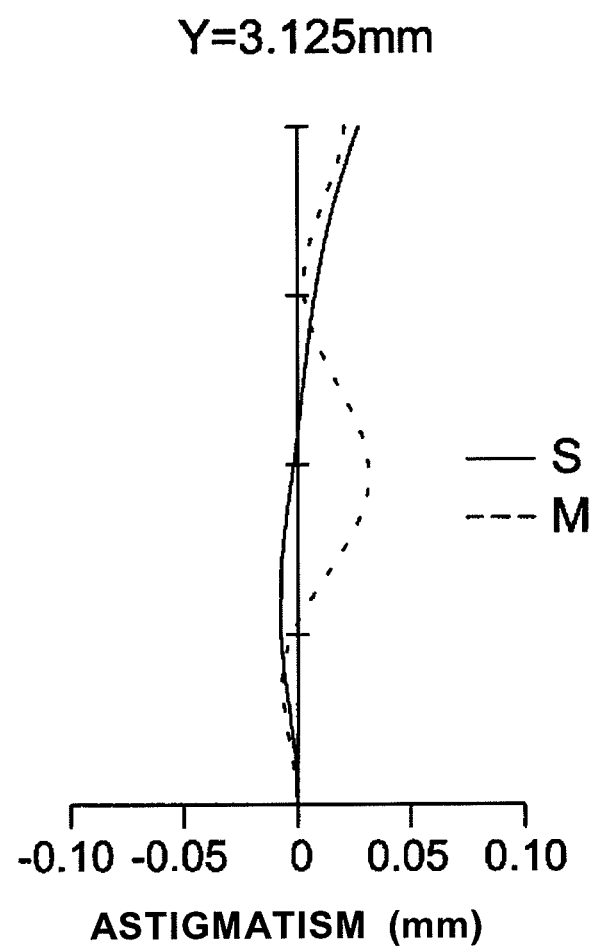
FIG. 19B is a diagram of aberrations in the wide-angle end of the zoom lens of Embodiment 5.
Figure 19C:
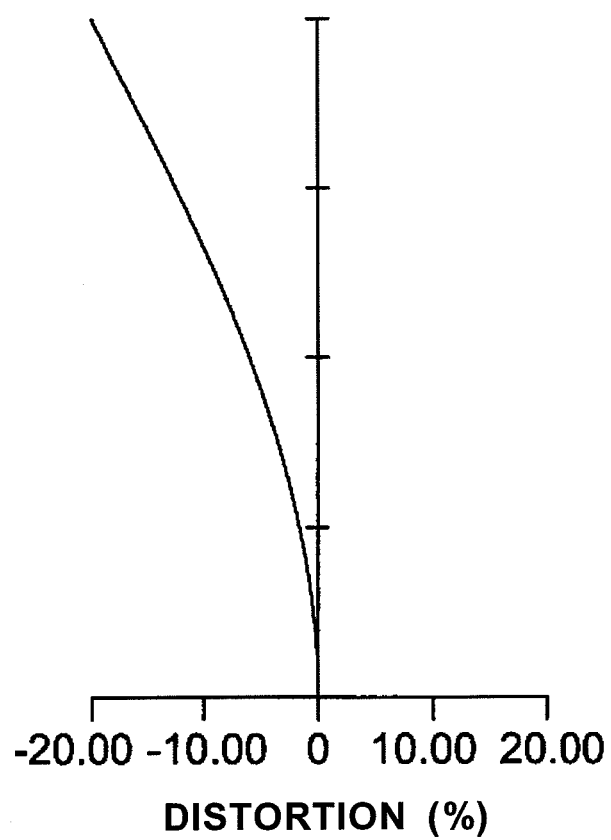
FIG. 19C is a diagram of aberrations in the wide-angle end of the zoom lens of Embodiment 5.
Figure 20A:
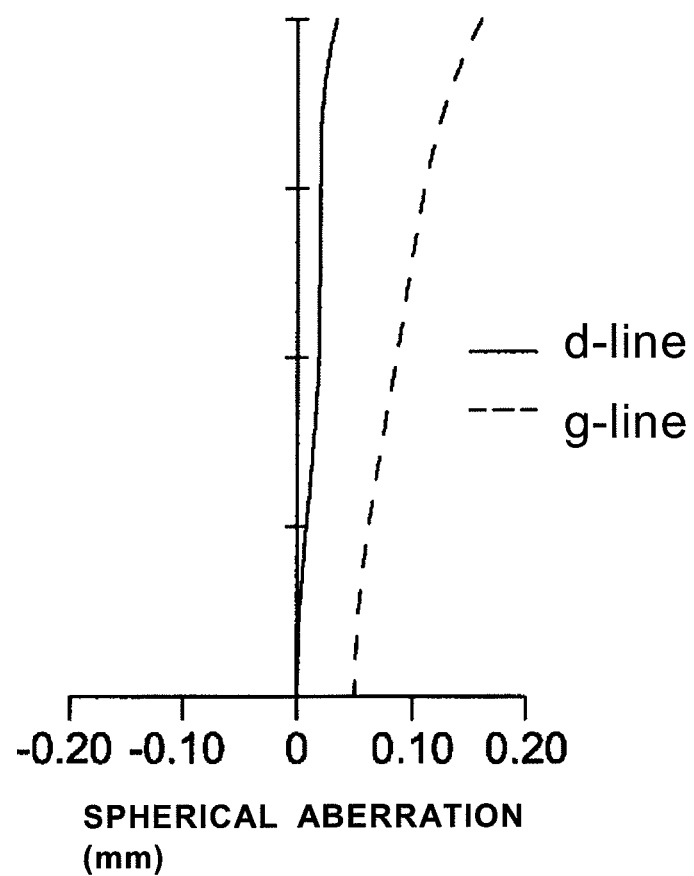
FIG. 20A is a diagram of aberrations in the intermediate focal length of the zoom lens of Embodiment 5.
Figure 20C:
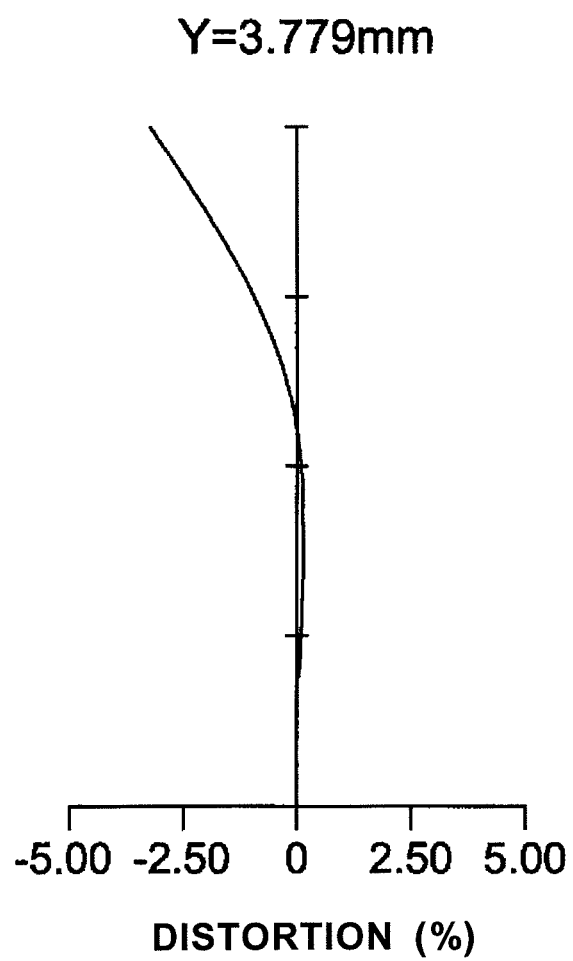
FIG. 20C is a diagram of aberrations in the intermediate focal length of the zoom lens of Embodiment 5.
Figure 21A:
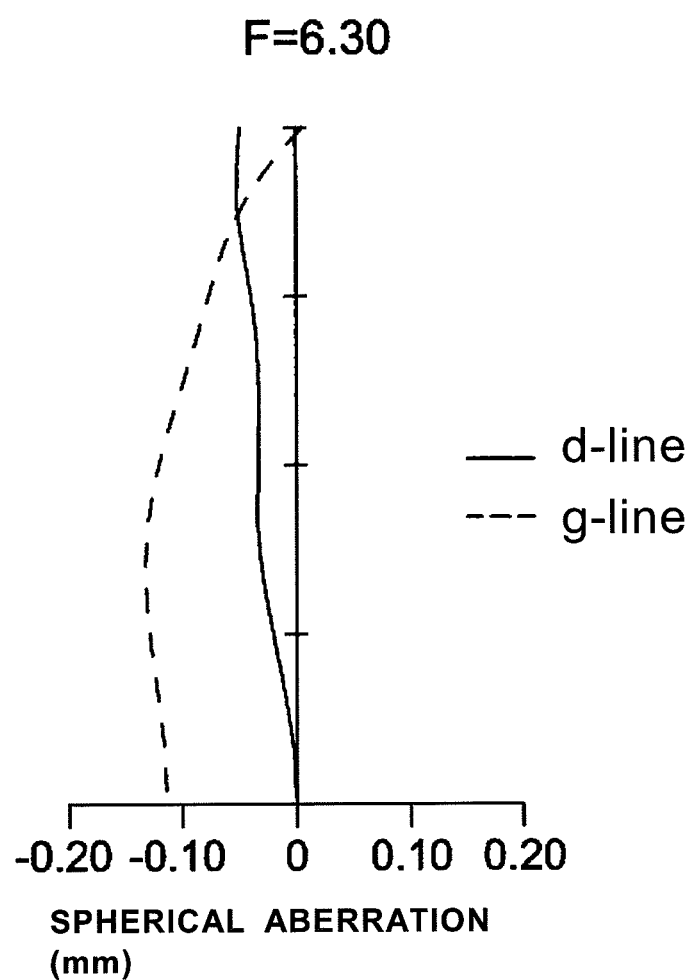
FIG. 21A is a diagram of aberrations in the telescopic end of the zoom lens of Embodiment 5.
Figure 21B:
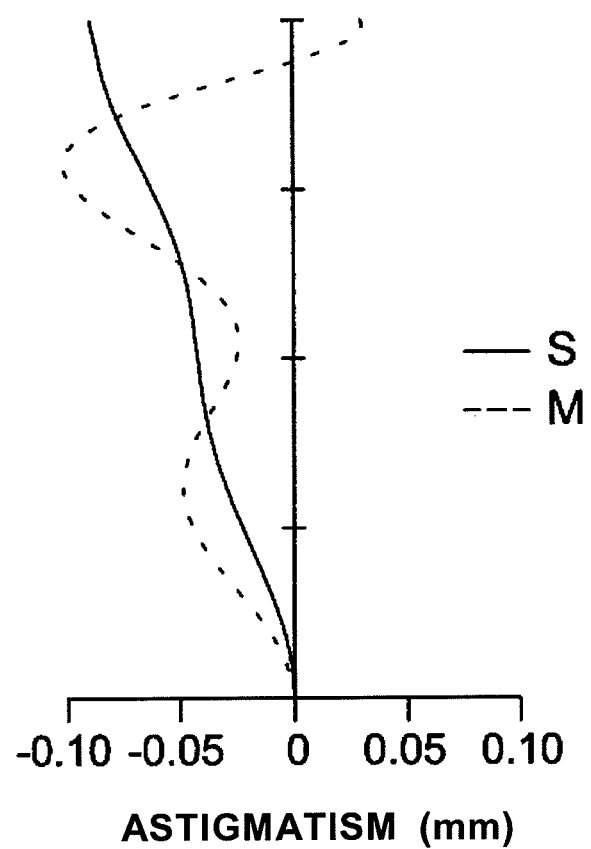
FIG. 21B is a diagram of aberrations in the telescopic end of the zoom lens of Embodiment 5.
Figure 21C:
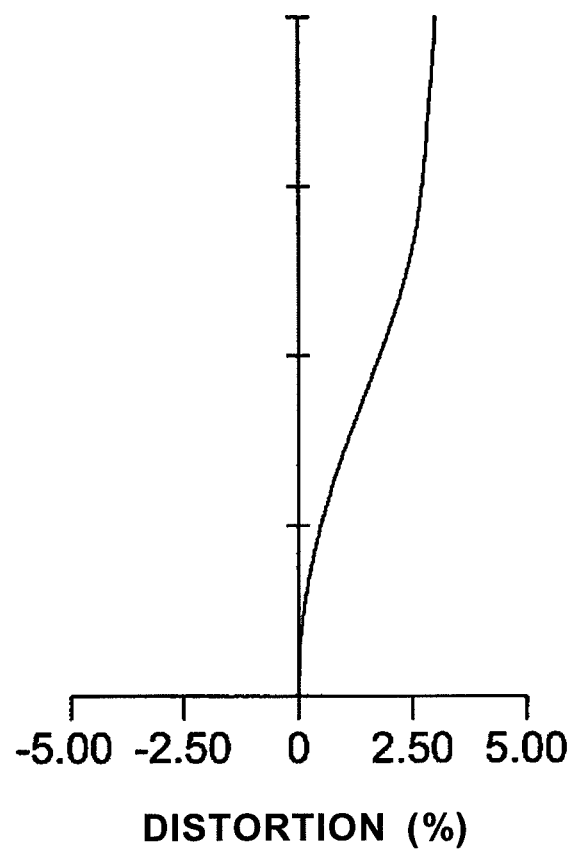
FIG. 21C is a diagram of aberrations in the telescopic end of the zoom lens of Embodiment 5.

Furthermore, FIG. 18A, FIG. 18B and FIG. 18C are cross-sectional diagrams of the zoom lens according to Embodiment 5. FIG. 18A is a cross-sectional diagram of the wide-angle end. FIG. 18B is a cross-sectional diagram of the intermediate focal length. FIG. 18C is a cross-sectional diagram of the telescopic end. FIG. 19A, FIG. 19B and FIG. 19C are diagrams of aberrations in the wide-angle end. FIG. 20A, FIG. 20B and FIG. 20C are diagrams of aberrations in the intermediate focal length. FIG. 21A, FIG. 21B and FIG. 21C are diagrams of aberrations in the telescopic end. Furthermore, in the diagrams of spherical aberrations shown in FIG. 19A, FIG. 20A and FIG. 21A, the solid line represents the d-line and the dotted line represents the g-line. Moreover, in the diagrams of astigmatisms shown in FIG. 19B, FIG. 20B and FIG. 21B, the solid line represents an aberration in the sagittal image plane, and the dotted line represents an aberration in the meridional image plane.

Embodiment 6

The parameters of the zoom lens of Embodiment 6 are shown below.

f: 4.86 to 10.43 to 23.11

F: 3.35 to 4.87 to 6.3

Zoom ratio: 4.75

Lens surface data are shown below.

| Surface no. | R(mm) | D(mm) | Nd | vd | Effective radius (mm) |
| --- | --- | --- | --- | --- | --- |
| 1 | 3767450 | 0.50 | 1.83480 | 42.7 | 6.36 |
| 2 | 19.237 | 1.10 | | | 5.84 |
| 3 | ∞ | 9.68 | 1.84670 | 23.8 | 5.77 |
| 4 | ∞ | 1.15 | | | 3.78 |
| 5 | −13.546 | 0.50 | 1.72920 | 54.7 | 3.50 |
| 6 | 13.405 | 0.90 | 1.94590 | 18.0 | 3.42 |
| 7 | 35.488 | d1 | | | 3.37 |
| 8(diaphragm) | ∞ | 0.00 | | | 2.65 |
| 9 | 11.298 | 1.09 | 1.60310 | 60.7 | 2.73 |
| 10 | −63.753 | 3.21 | | | 2.76 |
| 11 | 8.964 | 1.61 | 1.49700 | 81.6 | 3.00 |
| 12 | −14.362 | 0.50 | 1.90370 | 31.3 | 2.95 |
| 13 | 22.708 | 1.59 | | | 2.93 |
| 14(*) | 10.245 | 1.68 | 1.54470 | 56.2 | 3.12 |
| 15(*) | −17.012 | d2 | | | 3.09 |
| 16(*) | −8.660 | 0.82 | 1.54470 | 56.2 | 2.30 |
| 17(*) | 8.678 | d3 | | | 2.33 |
| 18(*) | 12.003 | 4.00 | 1.54470 | 56.2 | 4.72 |
| 19(*) | −14.766 | 1.00 | | | 4.60 |
| 20 | ∞ | 0.30 | 1.54880 | 66.9 | 4.45 |
| 21 | ∞ | 0.30 | 1.56100 | 56.1 | 4.43 |
| 22 | ∞ | 1.00 | | | 4.41 |
| 23 | ∞ | 0.50 | 1.51680 | 64.2 | 4.30 |
| 24 | ∞ | | | | 4.27 |

The aspherical coefficients are shown below.

Fourteenth Surface

K=0.00000E+00, A4=−0.39349E−03, A6=0.31276E−04, A8=−0.41338E−05, A10=0.26890E−06, A12=−0.58550E−08

Fifteenth Surface

K=0.00000E+00, A4=0.18143E−03, A6=0.36427E−04, A8=−0.52913E−05, A10=0.36518E−06, A12=−0.87910E−08

Sixteenth Surface

K=0.00000E+00, A4=0.38406E−02, A6=0.86616E−03, A8=−0.66408E−03, A10=0.17948E−03, A12=−0.23029E−04, A14=0.11541E−05

Seventeenth Surface

K=0.00000E+00, A4=0.34570E−02, A6=0.11587E−02, A8=−0.78469E−03, A10=0.20701E−03, A12=−0.26235E−04, A14=0.13043E−05

Eighteenth Surface

K=0.00000E+00, A4=0.43920E−03, A6=0.13633E−04, A8=−0.20435E−05, A10=0.91939E−07, A12=−0.13630E−08

Nineteenth Surface

K=0.00000E+00, A4=0.91457E−03, A6=0.36012E−04, A8=−0.54337E−05, A10=0.23903E−06, A12=−0.36000E−08

Various data from instances of magnification variation are shown below.

|  | Wide angle | Intermediate | Telephoto |
|---|---|---|---|
| f | 4.87 | 10.43 | 23.11 |
| Fno | 3.35 | 4.87 | 6.30 |
| fB | 12.32 | 12.26 | 12.32 |
| ΔfB(+30° C.) | 0.05 | 0.15 | 0.64 |
| 2ω | 77.5 | 41.1 | 19.2 |
| 2Y | 6.248 | 7.55 | 8.047 |
| L | 55.00 | 54.99 | 55.01 |
| d1 | 17.19 | 8.11 | 0.30 |
| d2 | 2.75 | 4.81 | 13.40 |
| d3 | 1.44 | 8.47 | 7.68 |

Lens group data are shown below.

| Group | Starting surface | Focal length (mm) |
|---|---|---|
| 1 | 1 | −7.69 |
| 2 | 8 | 9.67 |
| 3 | 16 | −7.83 |
| 4 | 18 | 12.83 |

Values corresponding to each conditional expression described above are shown below.

|f2L−f3|=1.533
f2L/f2=1.241
m4T=0.501
m2T/m2W=3.755
|f1a/fW|=4.737

In the zoom lens of Embodiment 6, when changing the magnification from the wide-angle end to the telescopic end, the second lens group Gr2 moves along the direction of the optical axis to the object side, and the third lens group Gr3 moves along the direction of the optical axis. As a result, the intervals of the lens groups Gr1 through Gr4 change, and the magnification is changed. Furthermore, when changing the magnification, the lens groups Gr1 and Gr4 do not move. Moreover, by causing the third lens group Gr3 to move, it is possible to perform focusing from the infinity to a finite distance. Furthermore, the seventh lens L7, the eighth lens L8 and the ninth lens L9 are formed from a plastic material, and the other lenses are polished lenses formed from a glass material.

The fourth lens group Gr4 is configured to be movable in a plane perpendicular to the direction of the optical axis. As a result, it is possible to correct blurs in the image formation in the image plane, and corrections of blurring are realized.

Moreover, in Embodiment 6, in the wide-angle end, alignment using the seventh lens L7 is performed.

Figure 22A:
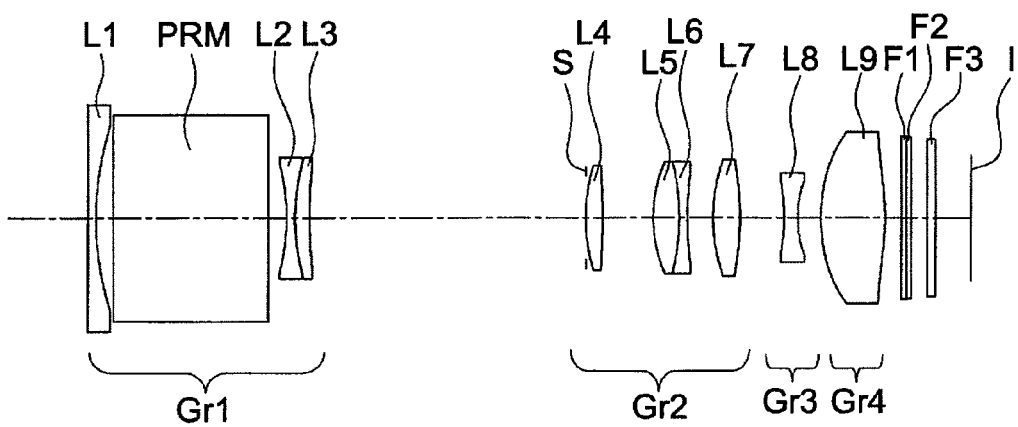
FIG. 22A is a cross-sectional diagram of the zoom lens of Embodiment 6.
Figure 22B:
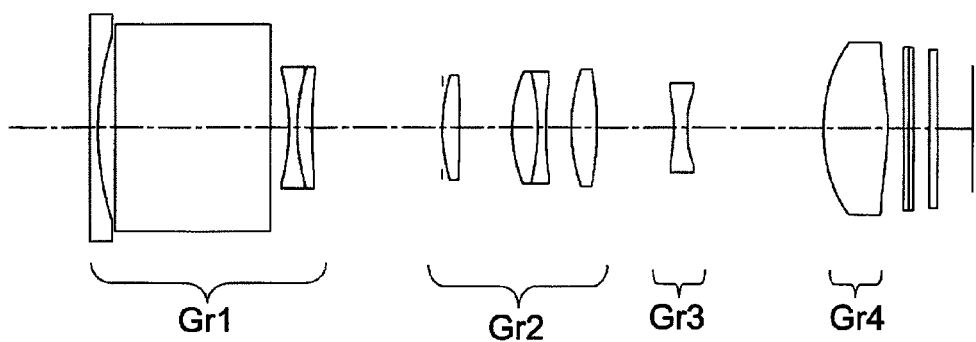
FIG. 22B is a cross-sectional diagram of the zoom lens of Embodiment 6.
Figure 22C:
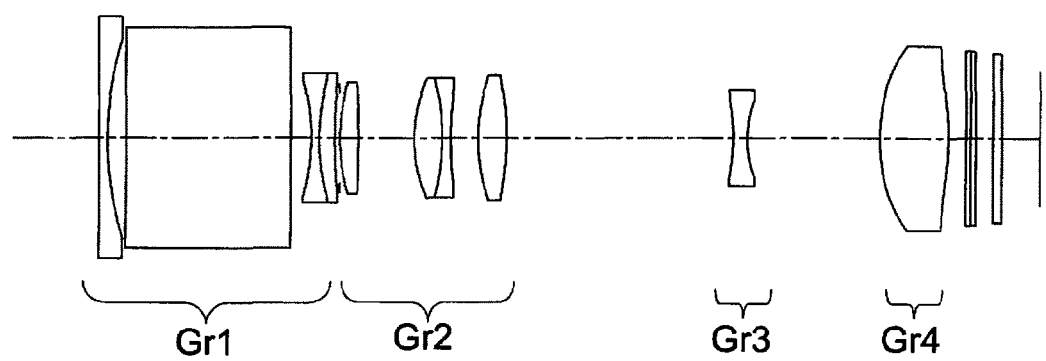
FIG. 22C is a cross-sectional diagram of the zoom lens of Embodiment 6.
Figure 23A:
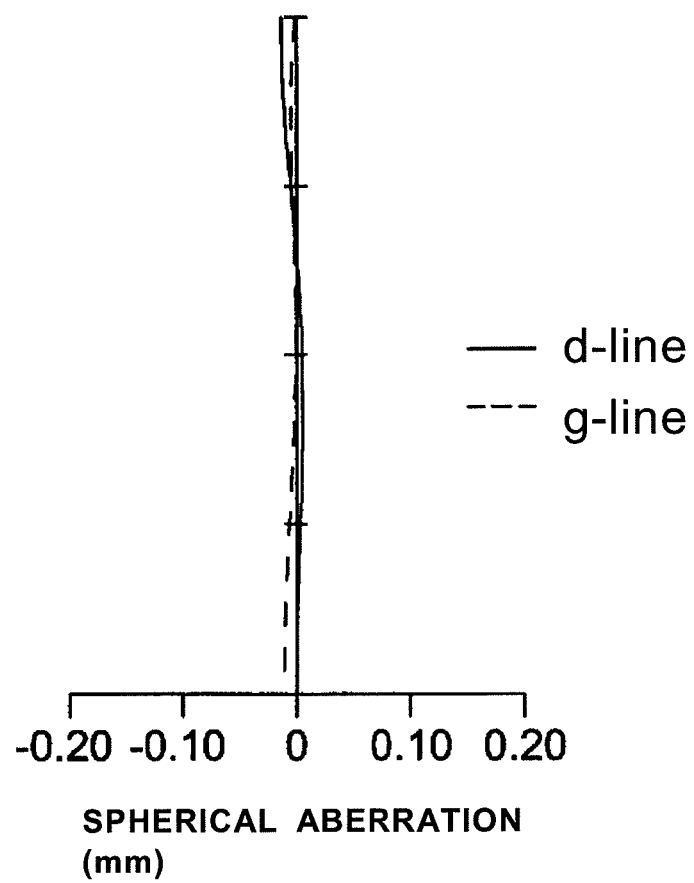
FIG. 23A is a diagram of aberrations in the wide-angle end of the zoom lens of Embodiment 6.
Figure 23B:
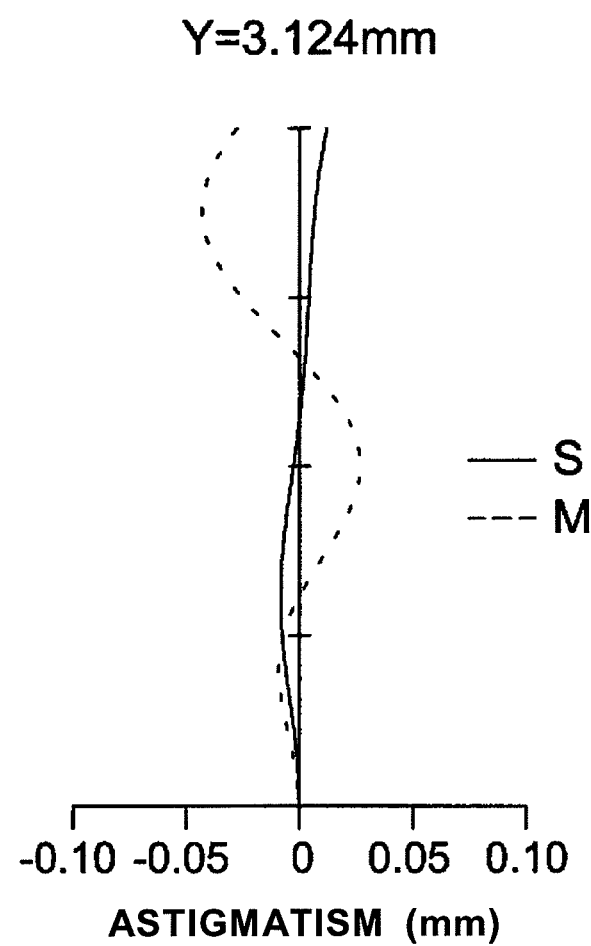
FIG. 23B is a diagram of aberrations in the wide-angle end of the zoom lens of Embodiment 6.
Figure 24A:
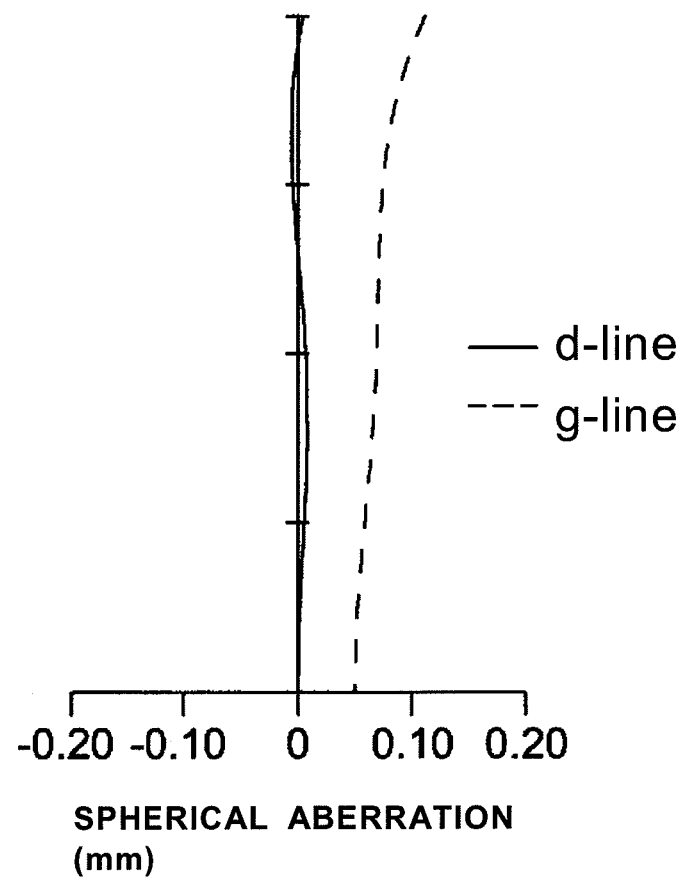
FIG. 24A is a diagram of aberrations in the intermediate focal length of the zoom lens of Embodiment 6.
Figure 24B:
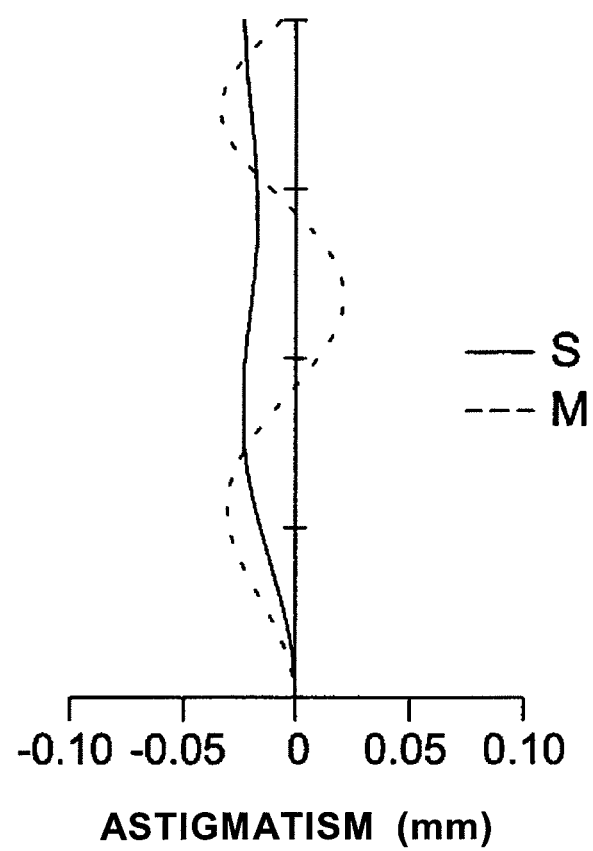
FIG. 24B is a diagram of aberrations in the intermediate focal length of the zoom lens of Embodiment 6.
Figure 25A:
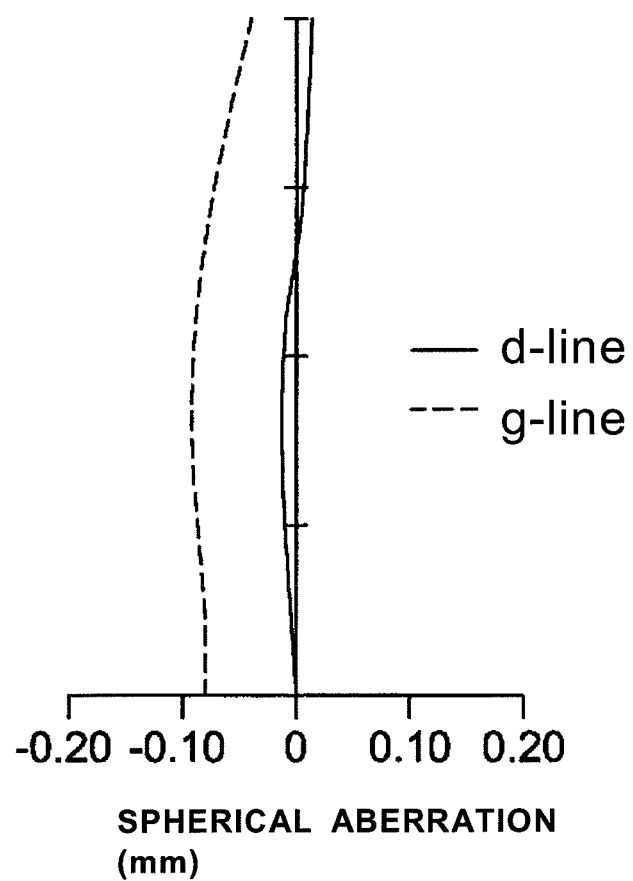
FIG. 25A is a diagram of aberrations in the telescopic end of the zoom lens of Embodiment 6.
Figure 25B:
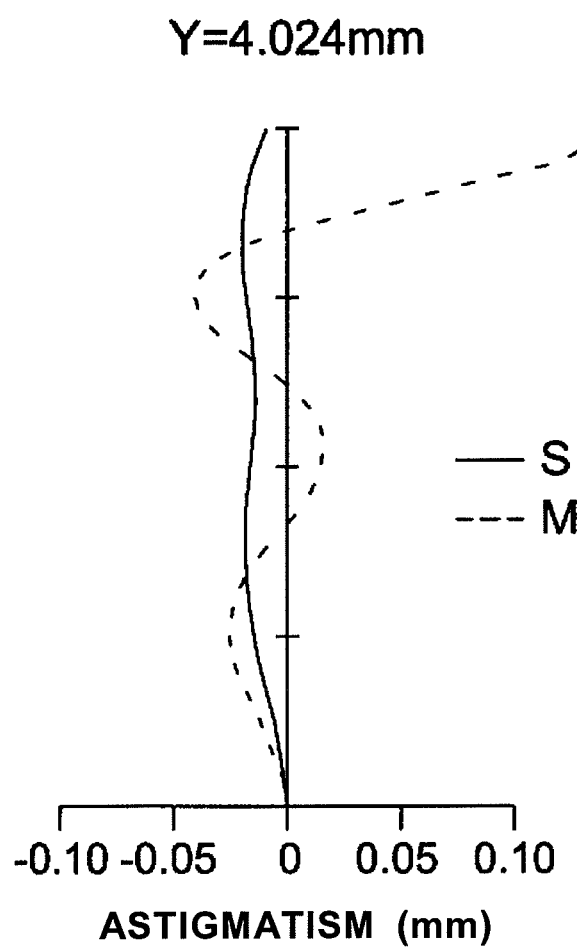
FIG. 25B is a diagram of aberrations in the telescopic end of the zoom lens of Embodiment 6.
Figure 25C:
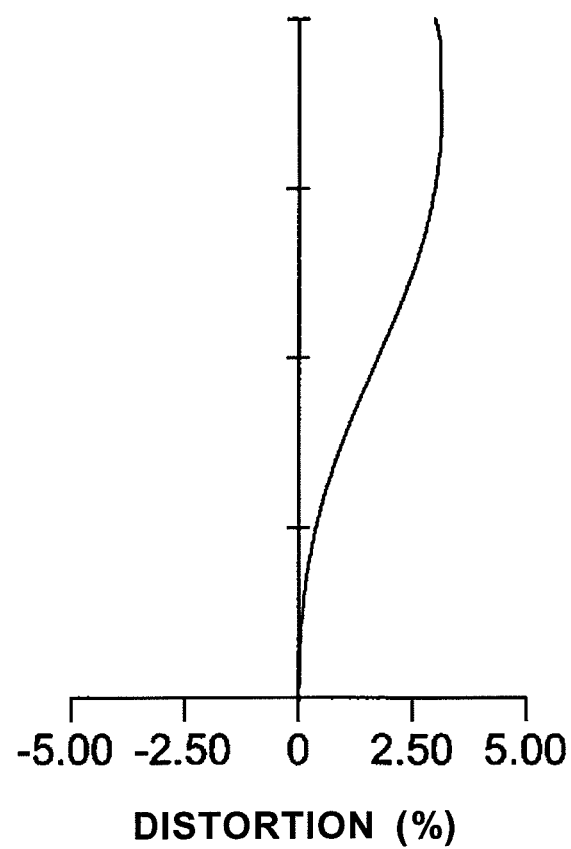
FIG. 25C is a diagram of aberrations in the telescopic end of the zoom lens of Embodiment 6.

Furthermore, FIG. 22A, FIG. 22B and FIG. 22C are cross-sectional diagrams of the zoom lens according to Embodiment 6. FIG. 22A is a cross-sectional diagram of the wide-angle end. FIG. 22B is a cross-sectional diagram of the intermediate focal length. FIG. 22C is a cross-sectional diagram of the telescopic end. FIG. 23A, FIG. 23B and FIG. 23C are diagrams of aberrations in the wide-angle end. FIG. 24A, FIG. 24B and FIG. 24C are diagrams of aberrations in the intermediate focal length. FIG. 25A, FIG. 25B and FIG. 25C are diagrams of aberrations in the telescopic end. Furthermore, in the diagrams of spherical aberrations shown in FIG. 23A, FIG. 24A and FIG. 25A, the solid line represents the d-line and the dotted line represents the g-line. Moreover, in the diagrams of astigmatisms shown in FIG. 23B, FIG. 24B and FIG. 25B, the solid line represents an aberration in the sagittal image plane, and the dotted line represents an aberration in the meridional image plane.

Embodiment 7

The parameters of the zoom lens of Embodiment 7 are shown below.

f: 4.51 to 8.64 to 16.93

Fno: 3.23 to 4.56 to 6.08

Zoom ratio: 3.75

Lens surface data are shown below.

| Surface no. | R(mm) | D(mm) | Nd | vd | Effective radius (mm) |
|---|---|---|---|---|---|
| 1 | 108.039 | 0.50 | 1.69680 | 55.5 | 5.85 |
| 2 | 7.562 | 2.31 |  |  | 4.89 |
| 3 | ∞ | 8.19 | 1.84670 | 23.8 | 4.78 |
| 4 | ∞ | 0.58 |  |  | 3.82 |
| 5 | −328.844 | 0.50 | 1.49700 | 81.6 | 3.70 |
| 6 | 7.844 | 1.08 | 1.90370 | 31.3 | 3.60 |
| 7 | 13.733 | d1 |  |  | 3.49 |
| 8(diaphragm) | ∞ | 0.00 |  |  | 2.36 |
| 9 | 7.533 | 1.91 | 1.72920 | 54.7 | 2.43 |
| 10 | −46.194 | 1.02 |  |  | 2.36 |
| 11 | ∞ | 1.00 |  |  | 2.25 |
| 12 | −13.486 | 0.50 | 1.84670 | 23.8 | 2.20 |
| 13 | 17.819 | 1.60 |  |  | 2.23 |
| 14(*) | 7.366 | 1.67 | 1.54470 | 56.2 | 2.59 |
| 15(*) | −14.033 | d2 |  |  | 2.60 |
| 16(*) | −36.376 | 0.59 | 1.54470 | 56.2 | 2.58 |
| 17(*) | 9.345 | d3 |  |  | 2.58 |
| 18(*) | 13.258 | 5.00 | 1.54470 | 56.2 | 4.59 |
| 19(*) | −22.830 | 1.00 |  |  | 4.41 |
| 20 | ∞ | 0.30 | 1.54880 | 66.9 | 4.26 |
| 21 | ∞ | 0.30 | 1.56100 | 56.1 | 4.24 |
| 22 | ∞ | 1.00 |  |  | 4.22 |
| 23 | ∞ | 0.50 | 1.51680 | 64.2 | 4.10 |
| 24 | ∞ |  |  |  | 4.06 |

The aspherical coefficients are shown below.

Fourteenth Surface

K=0.00000E+00, A4=−0.83224E−03, A6=0.68667E−04, A8=−0.18127E−04, A10=0.18876E−05, A12=−0.96237E−07

Fifteenth Surface

K=0.00000E+00, A4=0.36712E−03, A6=0.83065E−04, A8=−0.21542E−04, A10=0.23700E−05, A12=−0.12204E−06

Sixteenth Surface

K=0.00000E+00, A4=−0.16204E−02, A6=0.13631 E−02, A8=−0.66756E−03, A10=0.17710E−03, A12=−0.23029E−04, A14=0.11541E−05

Seventeenth Surface

K=0.00000E+00, A4=−0.18588E−02, A6=0.17297E−02, A8=−0.82643E−03, A10=0.21171E−03, A12=−0.26699E−04, A14=0.13043E−05

Eighteenth Surface

K=0.00000E+00, A4=0.20635E−03, A6=0.92406E−05, A8=−0.10873E−05, A10=0.43956E−07, A12=−0.57600E−09

Nineteenth Surface

K=0.00000E+00, A4=0.51248E−03, A6=0.56502E−05, A8=−0.13996E−05, A10=0.51424E−07, A12=−0.48000E−09

Various data from instances of magnification variation are shown below.

|  | Wide angle | Intermediate | Telephoto |
|---|---|---|---|
| f | 4.51 | 8.64 | 16.93 |
| Fno | 3.23 | 4.56 | 6.08 |
| fB | 10.32 | 10.21 | 10.26 |
| ΔfB(+30° C.) | 0.07 | 0.13 | 0.42 |
| 2ω | 81.7 | 48.6 | 26.0 |
| 2Y | 6.246 | 7.333 | 7.754 |
| L | 50.02 | 49.98 | 50.00 |
| d1 | 15.42 | 7.45 | 0.30 |
| d2 | 2.01 | 2.70 | 7.61 |
| d3 | 1.43 | 8.71 | 10.95 |

Lens group data are shown below.

| Group | Starting surface | Focal length (mm) |
|---|---|---|
| 1 | 1 | −9.00 |
| 2 | 8 | 9.90 |
| 3 | 16 | −13.59 |
| 4 | 18 | 16.19 |

Values corresponding to each conditional expression described above are shown below.

|f2L−f3|=0.671
f2L/f2=0.921
m4T=0.601
m2T/m2W=2.774
|f1a/fW|=2.590

In the zoom lens of Embodiment 7, when changing the magnification from the wide-angle end to the telescopic end, the second lens group Gr2 moves along the direction of the optical axis to the object side, and the third lens group Gr3 moves along the direction of the optical axis. As a result, the intervals of the lens groups Gr1 through Gr4 change, and the magnification is changed. Furthermore, when changing the magnification, the lens groups Gr1 and Gr4 do not move. Moreover, by causing the third lens group Gr3 to move, it is possible to perform focusing from the infinity to a finite distance. Furthermore, the sixth lens L6, the seventh lens L7 and the eighth lens L8 are formed from a plastic material, and the other lenses are polished lenses formed from a glass material.

The fourth lens group Gr4 is configured to be movable in a plane perpendicular to the direction of the optical axis. As a result, it is possible to correct blurs in the image formation in the image plane, and corrections of blurring are realized.

Moreover, in Embodiment 7, in the wide-angle end, alignment using the fourth lens L4 is performed.

Figure 26A:
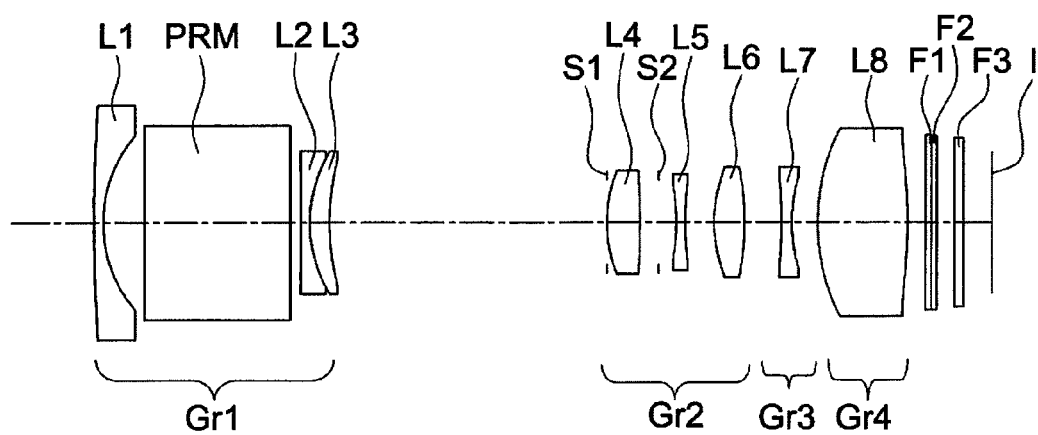
FIG. 26A is a cross-sectional diagram of the zoom lens of Embodiment 7.
Figure 26B:
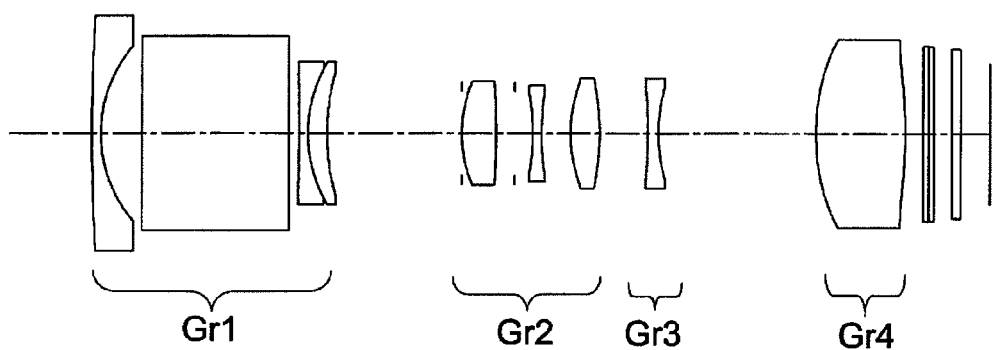
FIG. 26B is a cross-sectional diagram of the zoom lens of Embodiment 7.
Figure 26C:
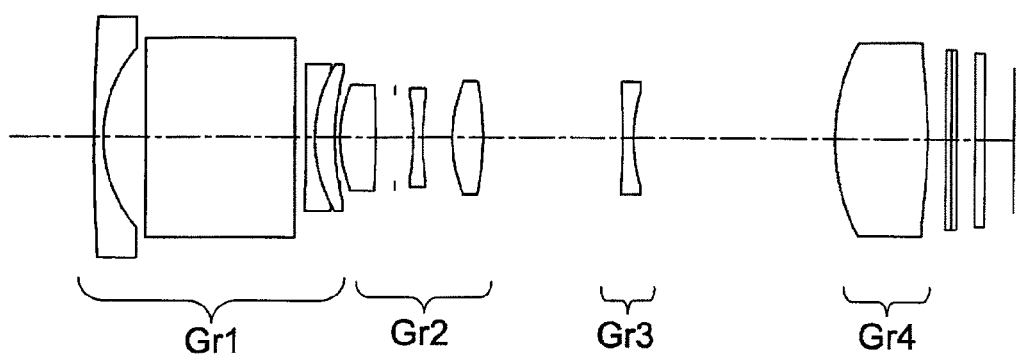
FIG. 26C is a cross-sectional diagram of the zoom lens of Embodiment 7.
Figure 27A:
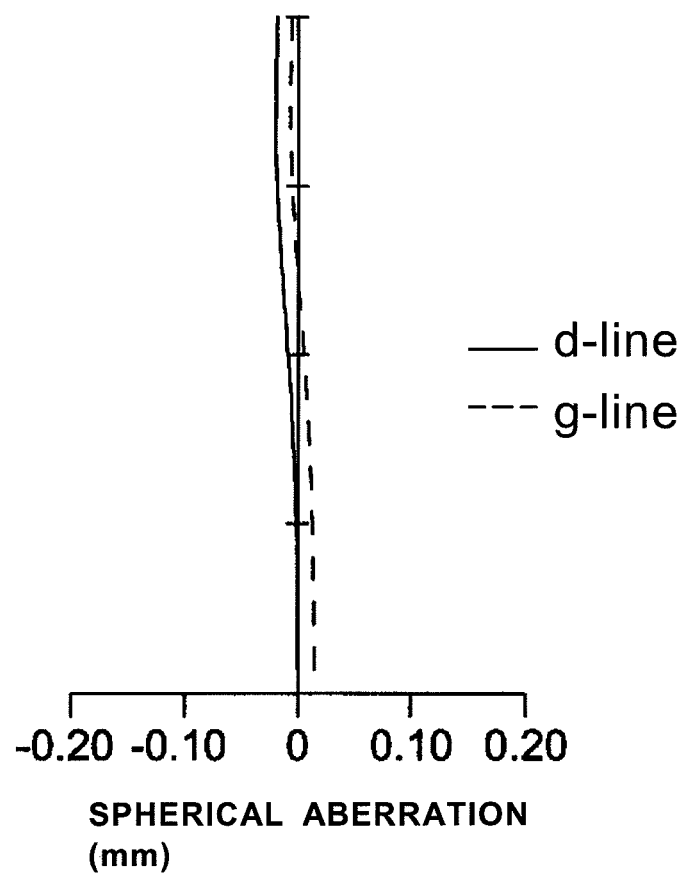
FIG. 27A is a diagram of aberrations in the wide-angle end of the zoom lens of Embodiment 7.
Figure 27B:
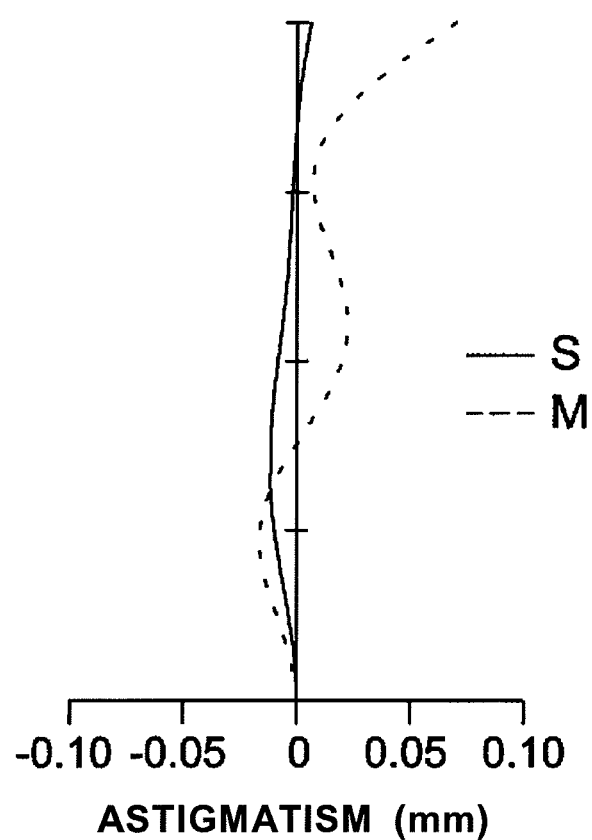
FIG. 27B is a diagram of aberrations in the wide-angle end of the zoom lens of Embodiment 7.
Figure 27C:
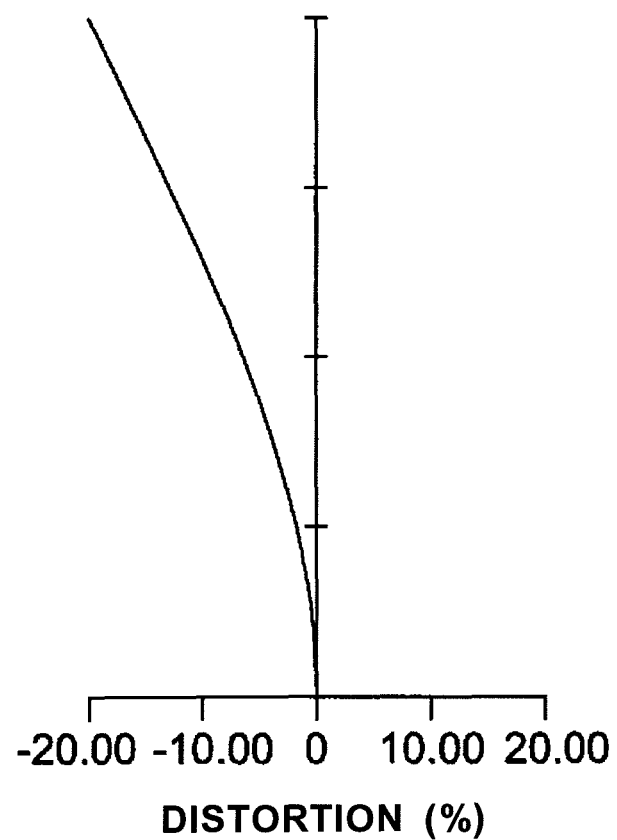
FIG. 27C is a diagram of aberrations in the wide-angle end of the zoom lens of Embodiment 7.
Figure 28A:
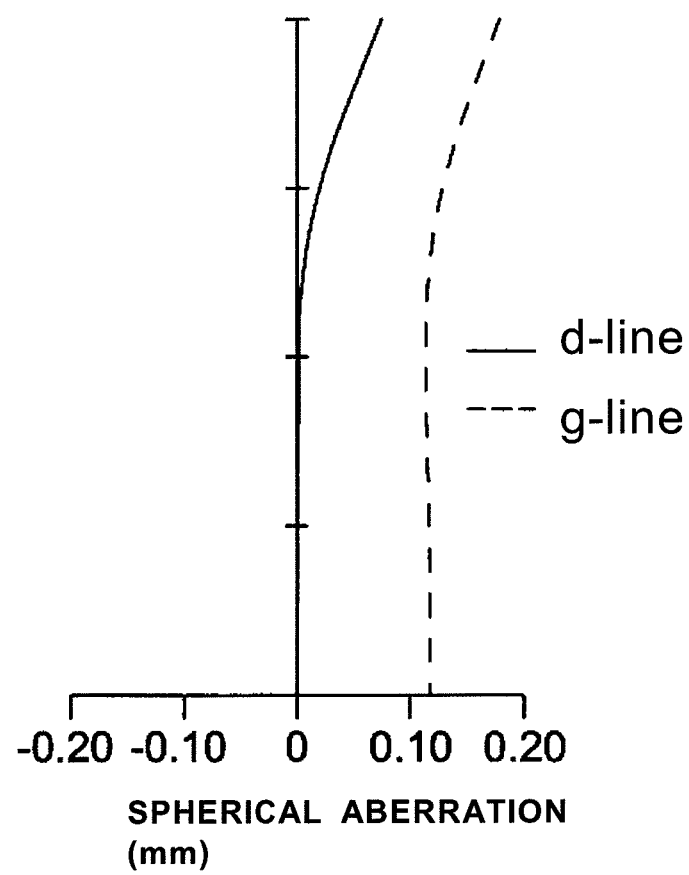
FIG. 28A is a diagram of aberrations in the intermediate focal length of the zoom lens of Embodiment 7.
Figure 28B:
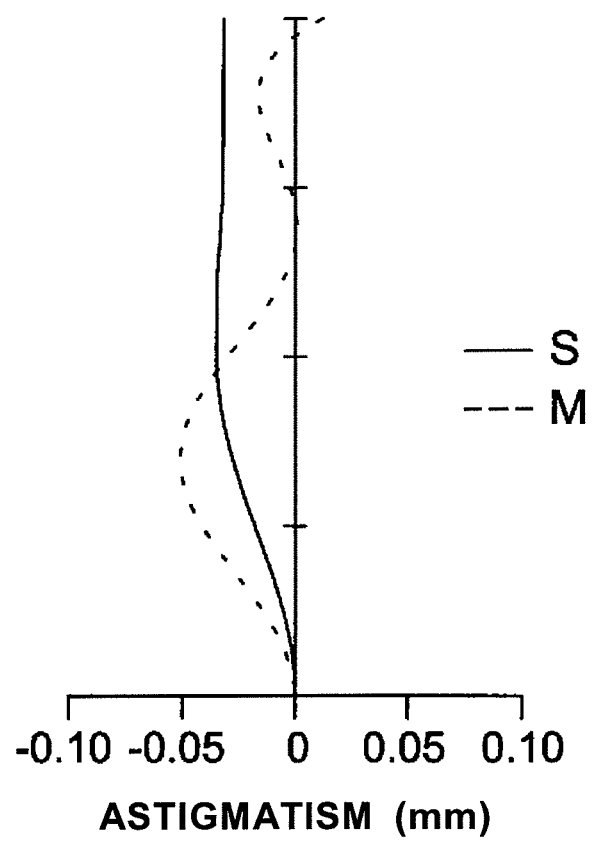
FIG. 28B is a diagram of aberrations in the intermediate focal length of the zoom lens of Embodiment 7.
Figure 28C:
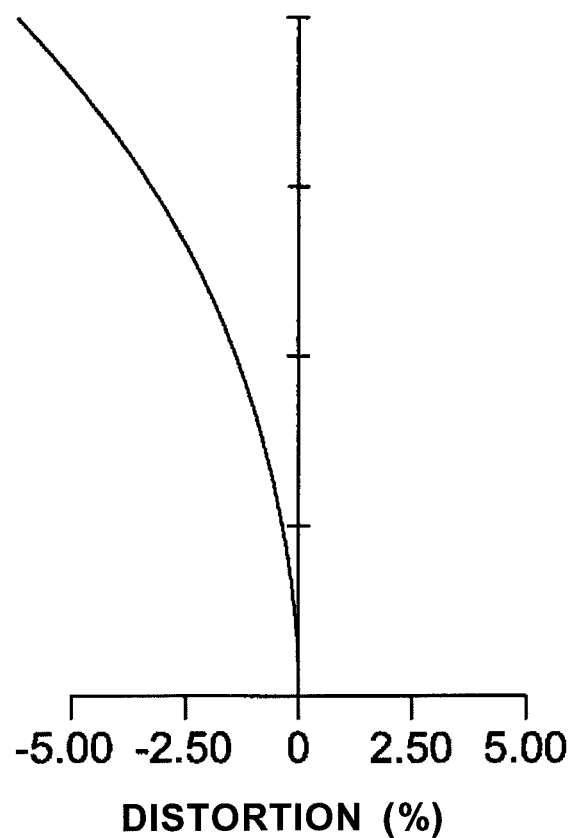
FIG. 28C is a diagram of aberrations in the intermediate focal length of the zoom lens of Embodiment 7.
Figure 29A:
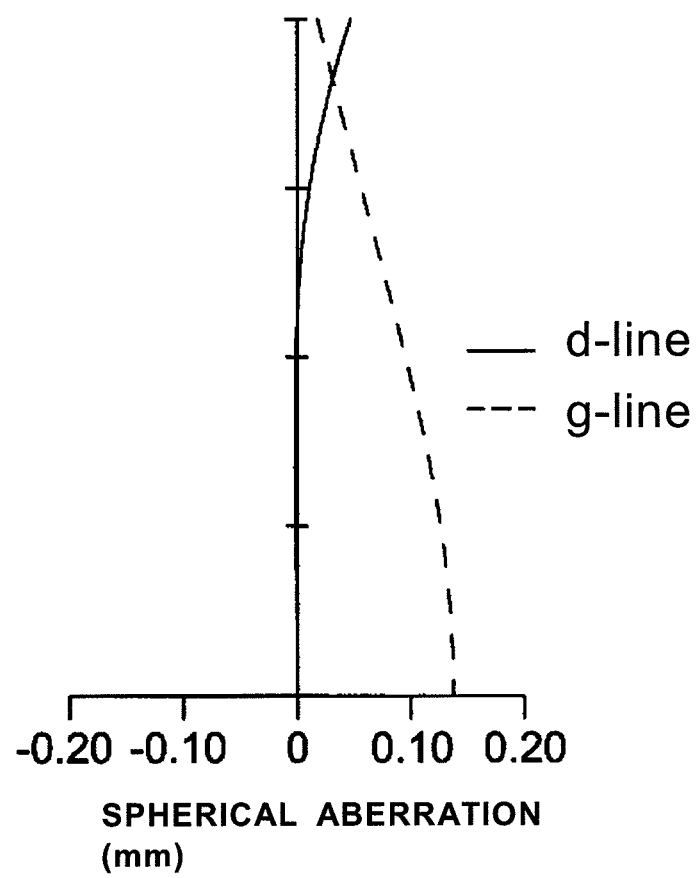
FIG. 29A is a diagram of aberrations in the telescopic end of the zoom lens of Embodiment 7.
Figure 29B:
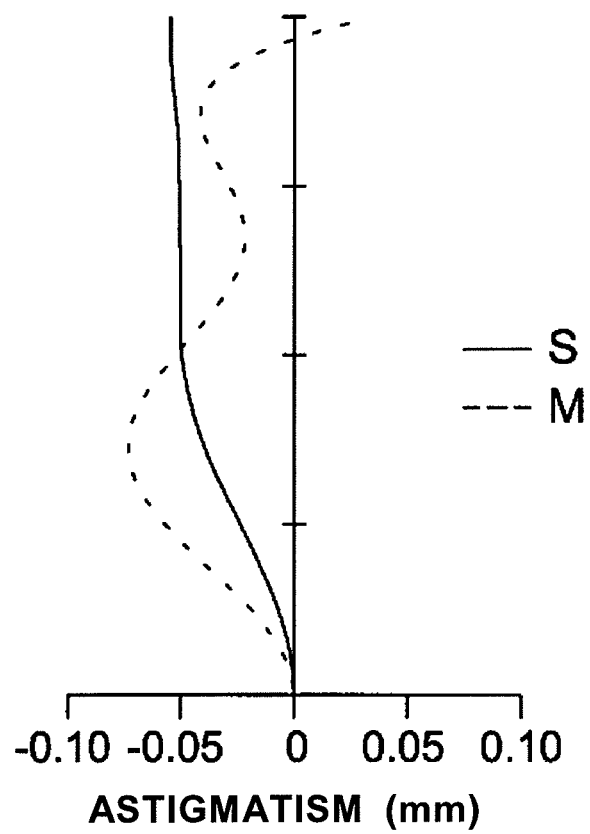
FIG. 29B is a diagram of aberrations in the telescopic end of the zoom lens of Embodiment 7.
Figure 29C:
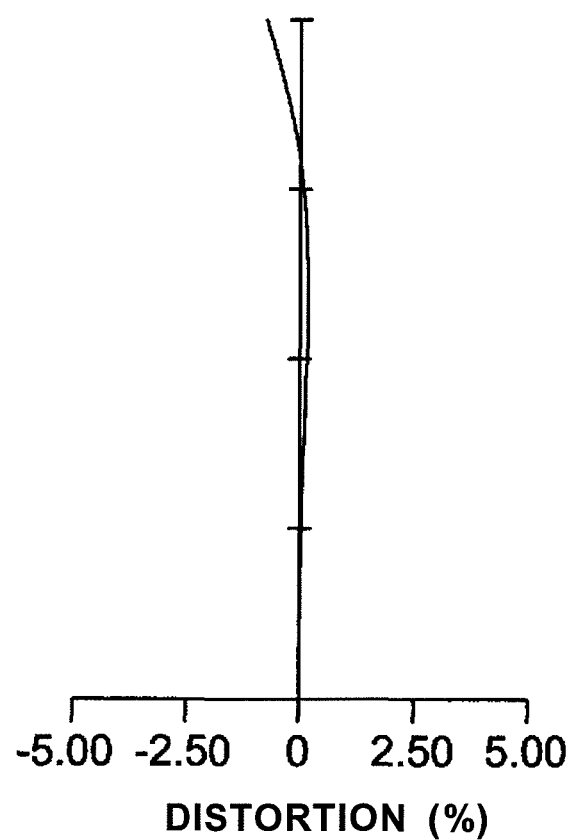
FIG. 29C is a diagram of aberrations in the telescopic end of the zoom lens of Embodiment 7.

Furthermore, FIG. 26A, FIG. 26B and FIG. 26C are cross-sectional diagrams of the zoom lens according to Embodiment 7. FIG. 26A is a cross-sectional diagram of the wide-angle end. FIG. 26B is a cross-sectional diagram of the intermediate focal length. FIG. 26C is a cross-sectional diagram of the telescopic end. FIG. 27A, FIG. 27B and FIG. 27C are diagrams of aberrations in the wide-angle end. FIG. 28A, FIG. 28B and FIG. 28C are diagrams of aberrations in the intermediate focal length. FIG. 29A, FIG. 29B and FIG. 29C are diagrams of aberrations in the telescopic end. Furthermore, in the diagrams of spherical aberrations shown in FIG. 27A, FIG. 28A and FIG. 29A, the solid line represents the d-line and the dotted line represents the g-line. Moreover, in the diagrams of astigmatisms shown in FIG. 27B, FIG. 28B and FIG. 29B, the solid line represents an aberration in the sagittal image plane, and the dotted line represents an aberration in the meridional image plane.

[Variations]

Variations of the above illustrative embodiment will now be described.

In recent years, it has become known that by mixing inorganic particles into plastic materials, it is possible to reduce temperature changes in the plastic materials. In other words, when fine particles are mixed into plastic materials, which are generally transparent, because scattering of light occurs and transmissivity is reduced, the materials become difficult to be used as optical materials, but by making the size of the fine particles smaller than the wavelength of the passing luminous flux, scattering can practically be prevented. The refractive index of the plastic material decreases as the temperature increases, but the refractive index of the inorganic particles increases as the temperature increases. Therefore, by using these temperature dependencies so that the changes in refractive index act to cancel each other out, it is possible to obtain a configuration in which the refractive index of the mixture hardly changes. Specifically, by dispersing inorganic particles with a maximum length of 20 nanometers or less in a plastic material acting as a base material, it is possible to obtain a plastic material in which the temperature dependency of the refractive index is very low. For example, by dispersing fine particles of niobium oxide ($Nb_2O_5$) in acrylic, it is possible to make the changes in refractive index caused by temperature changes small. In the above illustrative embodiment, by forming the sixth lens L6, the seventh lens L7 and the eighth lens L8 with a plastic material in which such inorganic particles have been dispersed, it becomes possible to keep variations in the image point position of the overall imaging lens system caused by temperature changes small.

Moreover, in recent years, there has been demand for technologies for implementing imaging devices at low cost and in large amounts. As an example, a technology has been disclosed for mounting electronic parts (IC chips, etc.) and optical elements on a substrate on which solder has been potted in advance, performing a reflow process (heat treatment) in that state to melt the solder, and thereby simultaneously mounting the electronic parts and the optical elements on the substrate.

However, to perform mounting using a reflow process, it is necessary to heat both the electronic parts and the optical elements to approximately 200 to 260 degrees (Celsius). When a lens using thermoplastic resin is placed under such a high temperature, heat distortion and discoloration occur, and the optical performance of the lens is reduced.

As a method of resolving such problems, it is possible to adopt glass mold lenses with excellent heat resistance to achieve both optical performance under high-temperature environments as well as miniaturization. However, compared to lenses using thermoplastic resin, glass mold lenses are costly, leaving the problem that demand for cost reduction for imaging devices is not met.

To resolve these problems, an energy-curable resin is used as the lens material. Compared to lenses composed of thermoplastic resins such as polycarbonate or polyolefin, with energy-curable resins, the reduction in optical performance when exposed to high temperatures is small. Consequently, such resins are useful for the reflow process. Moreover, by using an energy-curable resin, it is possible to obtain lenses that are easier to manufacture and cheaper than glass mold lenses. In this way, by installing lenses composed of energy-curable resins into the imaging device, it is possible to acquire an imaging device that is excellent in all areas of cost, mass productivity, and optical performance. Furthermore, energy-curable resins are resins that harden upon receiving a predetermined energy. Energy-curable resins include at least thermosetting resins and ultraviolet curable resins.

It is also possible to form the plastic lenses of the above illustrative embodiment using such energy-curable resins.

EXPLANATION OF THE SYMBOLS

Gr1 First lens group
Gr2 Second lens group
Gr3 Third lens group
Gr4 Fourth lens group
L1 First lens
L2 Second lens
L3 Third lens
L4 Fourth lens
L5 Fifth lens
L6 Sixth lens
L7 Seventh lens
L8 Eighth lens
L9 Ninth lens
PRM Reflective optical element
S Diaphragm
F1, F2, F3 Parallel plates
I Imaging area

The invention claimed is:

1. A zoom lens that comprises a first lens group having a negative refractive power, a second lens group having a positive refractive power, a third lens group having a negative refractive power, and a fourth lens group having a positive refractive power, which are arranged in sequence from the object side to the image side, and that changes the magnification by changing the intervals between these lens groups, wherein when changing the magnification from the wide-angle end to the telescopic end, the interval between said first lens group and said second lens group is reduced, said first lens group includes a reflective optical element that reflects a light ray and changes its direction of travel, said second lens group includes at least two lenses, and the lens nearest to the image side is a single lens composed of plastic that has a positive refractive power, said third lens group is configured by a single negative lens composed of plastic, and when the focal length of the single lens positioned nearest to the image side in said second lens group is defined as f2L and the focal length of said third lens group is defined as f3, the conditional expression $0.60<|f2L/f3|<1.60$ is satisfied.

2. The zoom lens according to claim 1, wherein focusing is performed by causing said third lens group to move.

3. The zoom lens according to claim 1, wherein when the focal length of the single lens positioned nearest to the image side in said second lens group is defined as f2L and the focal length of said second lens group is defined as f2, the conditional expression $0.80<f2L/f2<1.50$ is satisfied.

4. The zoom lens according to claim 1, wherein the lenses included in said fourth lens group are plastic, and at least one surface thereof is an aspheric surface.

5. The zoom lens according to claim 1, wherein
said fourth lens group is movable in a plane perpendicular to the direction of the optical axis, and
when the lateral magnification in the telescopic end of said fourth lens group is defined as m4T, the conditional expression $0.4<m4T<0.7$ is satisfied.

6. The zoom lens according to claim 1, wherein when the lateral magnification in telescopic end of said second lens group is defined as m2T, and the lateral magnification in the wide-angle end of said second lens group is defined as m2W, the conditional expression $2.0<m2T/m2W<5.0$ is satisfied.

7. The zoom lens according to claim 1, wherein
the lens positioned nearest to the object side in said first lens group has a negative refractive power, and
when the focal length of this lens is defined as f1a, and the focal length of the overall system in the wide-angle end is defined as fW, the conditional expression $2.0<|f1a/fW|<9.0$ is satisfied.

8. The zoom lens according to claim 1, wherein at least one surface of the single lens positioned nearest to the image side in said second lens group is an aspheric surface.

9. The zoom lens according to claim 1, wherein at least one surface of said negative lens of said third lens group is an aspheric surface.

10. The zoom lens according to claim 1, wherein during changes in magnification and during focusing, the position of said fourth lens group is fixed.

11. An imaging device equipped with the zoom lens according to claim 1.

* * * * *